(12) United States Patent
Axelsson et al.

(10) Patent No.: US 12,427,093 B2
(45) Date of Patent: Sep. 30, 2025

(54) DELIVERY DEVICE FOR DRUG PELLETS

(71) Applicant: ONDOSIS AB, Gothenburg (SE)

(72) Inventors: Robert Axelsson, Granna (SE); Ronny Brakhya, Huskvarna (SE); Lubomir Petrov Gradinarsky, Molnlycke (SE); John Charles Price Hayman, Gothenburg (SE); Per Magnus Karemyr, Vastra Frolunda (SE); Martin Olovsson, Gothenburg (SE); Anders Jimgren, Kungsbacka (SE); Philip-Jan Alfons Constant Flebus, Gothenburg (SE); Oscar Emil Nilsson, Gothenburg (SE); Emelie Margareta Svensson, Vastra Frolunda (SE)

(73) Assignee: Ondosis AB, Molndal (SE)

( * ) Notice: Subject to any disclaimer, the term of this patent is extended or adjusted under 35 U.S.C. 154(b) by 0 days.

(21) Appl. No.: 16/772,460

(22) PCT Filed: Dec. 17, 2018

(86) PCT No.: PCT/EP2018/085320
§ 371 (c)(1),
(2) Date: Jun. 12, 2020

(87) PCT Pub. No.: WO2019/115832
PCT Pub. Date: Jun. 20, 2019

(65) Prior Publication Data
US 2020/0397662 A1 Dec. 24, 2020

(30) Foreign Application Priority Data
Dec. 15, 2017 (GB) ..................... 1721065

(51) Int. Cl.
*A61J 7/00* (2006.01)
*B65D 83/00* (2006.01)
*B65D 83/762* (2025.01)

(52) U.S. Cl.
CPC .......... *A61J 7/0084* (2013.01); *B65D 83/762* (2025.01); *B65D 2583/049* (2013.01)

(58) Field of Classification Search
CPC .............. A61J 7/0084; B65D 83/0011; B65D 83/0016; B65D 2583/04; B65D 2583/049
See application file for complete search history.

(56) References Cited

U.S. PATENT DOCUMENTS 3,804,298 A * 4/1974 Ricciardi ............... B65G 65/46
222/413
4,084,726 A * 4/1978 Nicol ...................... A01C 7/02
221/266

(Continued)

FOREIGN PATENT DOCUMENTS

AU         749461 B2 * 6/2002
CN     101946164 B    6/2012

(Continued)

OTHER PUBLICATIONS

Office action for CN201880079675.6 dated Oct. 29, 2021.

(Continued)

*Primary Examiner* — Gene O Crawford
*Assistant Examiner* — Kelvin L Randall, Jr.
(74) *Attorney, Agent, or Firm* — Getz Balich LLC

(57) ABSTRACT

There is provided a device for dispensing one or more drugs in pellet form, including a cartridge including a chamber for containing a plurality of drugs in pellet form, a screw pump configured to receive pellets from the chamber and, upon rotation of the screw pump, transport the pellets from the chamber to be dispensed from the device via the screw (Continued)

pump, and a rotating member extending through the cartridge and configured to rotate the screw pump so as to dispense pellets therefrom.

16 Claims, 52 Drawing Sheets

(56) References Cited

U.S. PATENT DOCUMENTS

| | | | | |
|---|---|---|---|---|
| 4,324,494 | A | * | 4/1982 | Pryor .................. B01F 35/75 366/156.1 |
| 4,544,083 | A | * | 10/1985 | Schroeder ................ A47J 9/00 401/175 |
| 5,542,570 | A | * | 8/1996 | Nottingham ........... G07F 11/44 221/277 |
| 5,634,531 | A | * | 6/1997 | Graf ....................... F16N 29/00 184/7.4 |
| 6,129,241 | A | * | 10/2000 | Rai .................... A46B 15/0055 222/93 |
| 6,553,987 | B1 | | 4/2003 | Davies |
| 8,191,738 | B2 | | 6/2012 | Esteve |
| 8,905,964 | B2 | | 12/2014 | Poutiatine |
| 10,994,920 | B2 | * | 5/2021 | Yeo .................... B65D 83/0409 |
| 11,180,307 | B2 | * | 11/2021 | Savoye ............. B65D 83/0409 |
| 11,499,673 | B2 | * | 11/2022 | Wawrzola .............. F16N 29/04 |
| 11,731,827 | B1 | * | 8/2023 | Phipps ............... B65D 83/0022 222/386 |
| 11,898,698 | B2 | * | 2/2024 | Yang ....................... F16H 25/20 |
| 2001/0020147 | A1 | | 9/2001 | Staniforth |
| 2001/0030107 | A1 | * | 10/2001 | Simpson ................ B65G 33/22 198/670 |
| 2005/0232731 | A1 | * | 10/2005 | Lund .................. B65B 69/0041 414/288 |
| 2006/0086592 | A1 | * | 4/2006 | Olds .................... B65G 65/463 198/658 |
| 2007/0080179 | A1 | * | 4/2007 | Brinz ....................... B65B 1/12 222/412 |
| 2007/0256676 | A1 | | 11/2007 | Orvis |
| 2008/0066486 | A1 | | 3/2008 | Halterman |
| 2009/0285887 | A1 | * | 11/2009 | Abu-Baker ............... A61P 7/00 514/235.5 |
| 2010/0147866 | A1 | * | 6/2010 | Witkowski ............ E21B 33/068 221/1 |
| 2010/0236419 | A1 | * | 9/2010 | Righetti ................ G01F 13/005 99/289 R |
| 2010/0327020 | A1 | * | 12/2010 | Higuchi ................. B65D 88/68 222/241 |
| 2011/0024441 | A1 | * | 2/2011 | Marin ..................... G07F 11/42 221/2 |
| 2011/0036870 | A1 | | 2/2011 | Luechinger |
| 2011/0106064 | A1 | * | 5/2011 | Zou .................. A61M 5/14276 604/891.1 |
| 2012/0041379 | A1 | | 2/2012 | MacArthur |
| 2013/0327774 | A1 | * | 12/2013 | Farias, Jr. .............. B65D 83/06 220/288 |
| 2014/0058559 | A1 | * | 2/2014 | Haynes ................. A01K 15/02 119/57.7 |
| 2014/0314464 | A1 | | 10/2014 | Huang |
| 2014/0353327 | A1 | | 12/2014 | Bae |
| 2015/0151899 | A1 | | 6/2015 | Reinhold |
| 2016/0207691 | A1 | * | 7/2016 | Benouali ................ B65D 51/30 |
| 2017/0057730 | A1 | * | 3/2017 | Wang ..................... B05B 7/145 |
| 2017/0183143 | A1 | | 6/2017 | Yeo |
| 2018/0369070 | A1 | | 12/2018 | Gielen |
| 2021/0102664 | A1 | * | 4/2021 | Wawrzola ............... F16N 11/08 |
| 2022/0324169 | A1 | * | 10/2022 | Guillory ............... B29B 13/045 |

FOREIGN PATENT DOCUMENTS

| | | |
|---|---|---|
| CN | 102065930 B | 5/2013 |
| CN | 104290935 A | 1/2015 |
| CN | 204737871 U | 11/2015 |
| CN | 206580081 U | 10/2017 |
| DE | 10008412 A1 | 8/2001 |
| EP | 2088404 A1 | 8/2009 |
| FR | 2752227 B1 | 10/1998 |
| GB | 2297318 B | 12/1998 |
| GB | 2430665 A | 4/2007 |
| JP | 2001002225 A | 1/2001 |
| JP | 2011524775 A | 9/2011 |
| KR | 1020110076853 | 7/2011 |
| KR | 1020170134833 | 12/2017 |
| RU | 2304761 C1 | 8/2007 |
| WO | 9708977 W | 3/1997 |
| WO | 2017134103 A1 | 8/2017 |

OTHER PUBLICATIONS

Indian Office Action for IN202047024188 dated Mar. 28, 2022.
Taiwan office action for TW11120678380 dated Jul. 12, 2022.
Chinese Office Action for CN201880079675.6 dated Apr. 18, 2022.
Russian Office Action from RU2020117229 dated Feb. 10, 2022.
Chinese office action for CN201880079675.7 dated Nov. 22, 2022.
Japanese office action for JP2020-552137 dated Oct. 4, 2022.
Office action for RU2020117229/14 dated Mar. 23, 2023.
Office action for JP2020-552137 dated Apr. 12, 2023.
CN Office Action for CN Application No. 201880079675.6 dated Nov. 23, 2023.
MX Office Action for MX Application No. MX/a/2020/006111 dated Nov. 27, 2023.
Korean Office Action for KR Application No. 10-2020-7017698 dated Feb. 23, 2024.

* cited by examiner

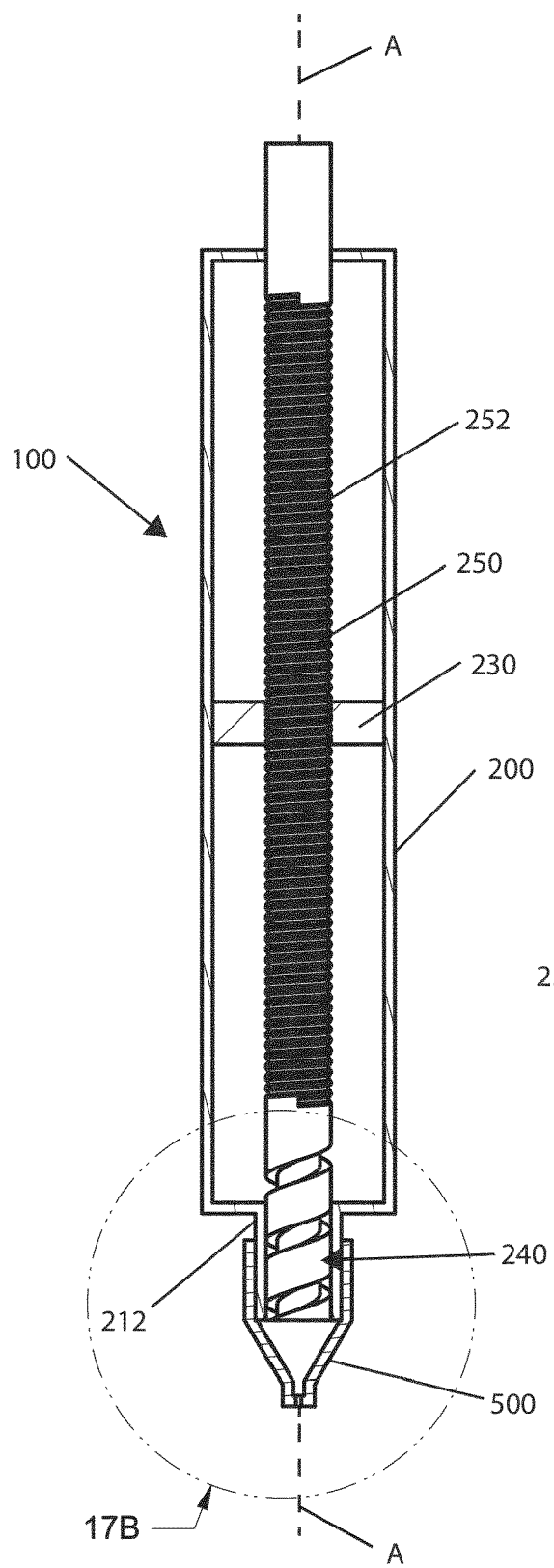
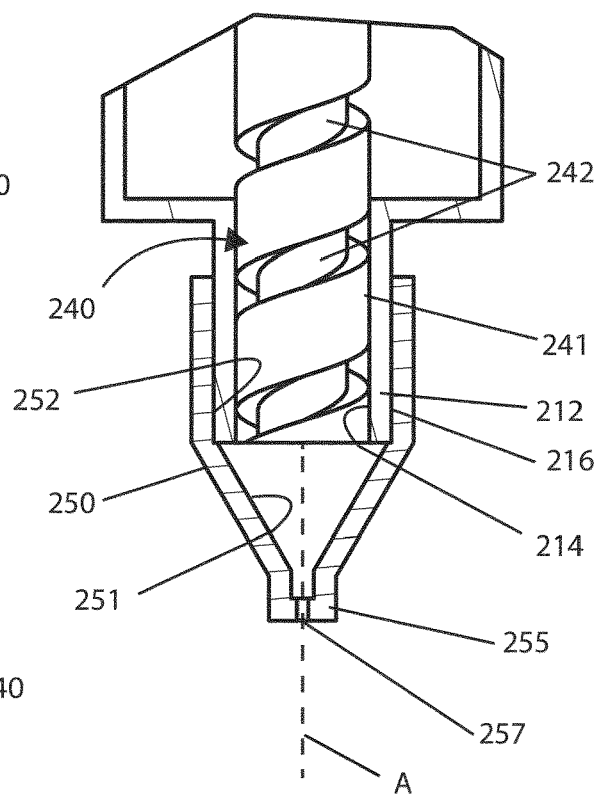
Figure 17A
Figure 17B

DELIVERY DEVICE FOR DRUG PELLETS

This application is entitled to the benefit of, and incorporates by reference essential subject matter disclosed in PCT Application No. PCT/EP2018/085320 filed on Dec. 17, 2018, which claims priority GB Patent Appln. No. 1721065.9 filed Dec. 15, 2017, which are hereby incorporated by reference in their entireties.

BACKGROUND OF THE INVENTION

1. Technical Field

The present disclosure relates generally to delivery devices for drug pellets (e.g., a drug or medicament in pellet form) and various aspects of such devices relating, for example, to the dispensing of pellets from the device, the operation and mechanics of such devices and also certain aspects of the control systems for such devices.

2. Background Information

Solid oral dosage forms ("ODF") medications can be manufactured in, e.g., a tablet or pellet form. A tablet or pellet could contain different substances where the main ingredient(s) is/are the active pharmaceutical ingredient ("API"). Drug pellets could be administered to patients as prefilled capsules or compressed in a tablet with help filling materials. Dispensing mechanisms for various forms of ODF drugs are known, and can range from blister-pack type devices, wherein individual tablets can be retained within pockets and retained therein by the use of foil, to dispensing bottles. Various more complicated mechanisms are also known, in particular for other types of drug formulation, for example those in the form of pellets, which may typically be less than 10% of a particular dosage per unit. The advantage of dispensing drugs in pellet form can be that the dose can be varied using the same dispensing device. Another advantage is that the pellets could be easy to swallow by patients having difficulty swallowing, who are currently crushing the tablets in order to swallow. Crushing or dividing of tablets is also used today by patients to get, e.g., half a dose from a prescribed drug, a process which is not recommended and can be avoided if a device can dispense different flexible amounts of pellets. Variable dosing of pellets allows for a more exact tuning of the dose than what may be achieved using larger dosage forms such as tablets or capsules. Furthermore, for modified release formulations, pellets are often more robust against food interactions than larger dosage forms such as tablets.

It is desired to improve the mechanism by which drugs in pellet form are dispensed, for example in case of pediatric medicine; antibiotics for easier swallowing, in case of geriatric medicine; chronic medication for easier swallowing, in the case of certain controlled substances such as stimulants for ADHD or pain medications such as opioids; for improved control over the dispensed dose or limit the risk for overdosing, or for medications that require titration at initiation or flexible adjustments as a result of disease variability or as a result of achieved outcomes, for example in case of immunosuppression after organ transplant, for psychiatric disorders such as depression or for neurological disorders such as epilepsy.

SUMMARY OF THE INVENTION

Herewith will be described various aspects and embodiments of a dispensing device that may be used in the present invention, and in relation to any of the aspects and embodiments of the invention described herein insofar as they are suitable therefor. As will be appreciated, all of the devices operate on similar principles.

In an aspect of the present invention, there is provided a device for dispensing pellets (e.g., a drug or medicament in pellet form). As described below, a largest dimension (e.g., width or diameter) of the pellets may be between about 150 μm and about 1200 μm (or even about 1500 μm), optionally between about 200 μm and about 300 μm, between about 300 μm and about 500 μm, between about 500 μm and about 700 μm. In various embodiments the largest dimension (e.g., width or diameter) of the pellets may be between about 700 μm and about 900 μm or between about 800 μm and about 1100 μm.

The device comprises: a cartridge comprising a chamber for containing or holding a plurality of pellets; a screw pump, e.g., an Archimedes screw, configured to receive pellets from the chamber and, upon rotation of the screw pump, transport the pellets from the chamber to be dispensed from the device (and, e.g., the cartridge and/or chamber) via the screw pump; a rotating member extending through the cartridge and configured to rotate the screw pump so as to dispense pellets therefrom.

The above device solves the problem of how to accurately and easily administer pellets that may provide an oral dosage form (especially, but not exclusively those having a size between about 150 μm and about 1200 μm or even about 1500 μm), in that the use of a screw pump allows a precise dose to be administered from the device in a simple manner. Previously (and as discussed above) pellet-type medicaments have been administered to patients as prefilled capsules or compressed in a tablet. The pellets may provide an oral dosage form and the oral dosage form may be a unit dose and/or a solid oral dosage form. It is envisaged that the pellets could in some cases comprise a hard, solid (or semi-solid, e.g., gelatin or cellulose) outer shell and a softer core, such as a gel or even a liquid core.

The chamber may extend from a first end of the device to a second, dispensing end of the device. The cartridge may extend from a first end to a second, dispensing end, and the screw pump may be located at the second, dispensing end of the cartridge.

The screw pump may be located at the second, dispensing end of the device.

The screw pump may be gravity fed. In other words, pellets held within the chamber may be moved towards the second, dispensing end at least partially by gravity, when the device is in a dispensing orientation (for example, with the dispensing end pointing downwards).

The device may be a hand-held and/or portable device. In other words, the device may be held and transported using one hand and/or operable using one hand. For example, the device (e.g., the entire device or the cartridge) may have a length (corresponding to its longest dimension) of no more than about 250 mm (such as less than about 200 mm, about 150 mm or about 100 mm), and a width or height (i.e., transverse to its length) of no more than about 50 mm, and optionally no more than about 40 mm (and in some embodiments less than 30 mm or even less than 20 mm). In order to optimize its hand-held nature, the device may have a length between about 180 mm and about 220 mm, a width (transverse to its length) between about 35 mm and about 45 mm, and a height (transverse to its width) of between about 22 mm and about 32 mm. The device (or cartridge) may weigh no more than about 500 g, about 400 g, about 300 g, about 200 g, or even about 100 g. This can ensure that the device is light enough to carry in one hand.

The cartridge (or cartridges) may have a length (corresponding to its longest dimension) of between about 90 mm and about 120 mm, a width (transverse to its length) between about 33 mm and about 43 mm, and a height (transverse to its width) of between about 15 mm and about 25 mm.

The screw pump may be or comprise part of the rotating member. For example, the screw pump may comprise one or more screw threads formed around the rotating member. The term "one or more" is used herein due to the possibility that the screw pump may comprise one or more screw starts, each forming a separate screw thread. Although the plural term is used hereinafter for brevity, it will be appreciated that the references to screw threads encompass a singular screw thread.

The screw threads may extend at least partially into the chamber for receiving pellets therefrom in use. The screw threads may extend into the chamber by about 1 or about 2 times, for example about 1.5 times, the inner diameter of the chamber or cartridge, or the width of the chamber or cartridge (e.g., the smallest or largest width that extends through and transversely to a longitudinal axis of the cartridge). This has been found to prevent certain undesired effects such as 'doming' of the pellets within the chamber.

The length of the screw section (e.g., along the longitudinal axis of the cartridge) may be defined by the length of the screw threads, which may be between about 10 mm and about 30 mm, for example between about 10 mm and 20 mm.

The device may be configured such that as the rotating member and screw pump are rotated in use, pellets travel along the screw threads of the screw pump from the portion of the screw threads extending into the chamber to the opposite end of the screw threads for dispensing from the screw pump.

The screw threads may cooperate with an inner cylindrical surface of the cartridge to form the screw pump, such that, as the rotating member rotates in use, the screw threads rotate within the inner cylindrical surface, causing pellets contained within the chamber to enter the screw threads, and travel down the screw threads for dispensing from the screw pumps. It should be noted that the cartridge may not itself be generally cylindrical. Rather, in order to form the screw pump the cartridge may comprise an inner cylindrical surface, although this should not be interpreted as necessarily meaning the cartridge itself is cylindrical in whole or in part.

The cartridge and/or chamber may be any suitable shape, for example cylindrical or cuboid. The cartridge and/or chamber thereof may be cylindrical at least in part, and the cylindrical portion of the cartridge and/or chamber may comprise the inner cylindrical surface of the screw pump as well as at least part of the chamber for holding pellets. In this embodiment the cartridge may be open at the second, dispensing end of the device, and the rotating member may comprise a screw section (forming part of the screw pump) having an outer diameter that substantially matches an inner diameter of the cartridge and/or chamber at the second, dispensing end of the device.

Alternatively, the cartridge may comprise an outlet or exit tube that extends from the chamber. The exit tube may have a width or diameter that is less than an inner diameter of the chamber. The rotating member may extend into the exit tube, such that the inner cylindrical surface of the exit tube forms the inner cylindrical surface of the screw pump. In these embodiments, the cartridge and/or chamber may comprise a frustoconical or tapered portion at the second, dispensing end of the cartridge and/or chamber that directs pellets contained in the chamber into the exit tube.

The screw threads may extend throughout the entire length of the exit tube. The screw threads may extend partially into the chamber by a distance between about 1-2 times a diameter of the rotating member within the exit tube, which has been found to prevent certain undesirable effects, such as 'doming' of the pellets. The screw threads may then stop at this distance, so that the remainder of the rotating member is absent of the screw threads that form part of the screw pump.

In various embodiments a majority of the length of the rotating member (e.g., within the cartridge) may be absent of the screw threads that forms the screw pump. For example, at least about 70%, 80%, 90% or even 95% of the length of the rotating member (e.g., within the cartridge) may be absent of the screw threads that forms the screw pump. This means that the screw threads only act on and collects pellets that are towards the second, dispensing end of the chamber, which can be beneficial for pellets that are located towards the first end in that the screw threads does not act on or otherwise interfere with the majority of the pellets.

Gravity (and/or a plunger device as described below) may be used to move pellets to the dispensing end of the chamber, at which point they may be collected by the screw threads and taken into the screw pump.

The device may further comprise a device (e.g., a plunger) configured to force to pellets contained within the chamber towards the screw pump. This device may act in addition to gravity, such that a combination of gravity and the force provided by the device moves pellets contained within the chamber towards the screw pump. For example, the device may be or comprise a plunger in the form of a weight that is configured to rest on top of pellets contained within the chamber when the device is in an orientation that permits dispensing of pellets.

The device may comprise a plunger configured to move along the rotating member automatically or as a result of the rotation of the rotating member. For example, a portion of the rotating member within the chamber may comprise a screw thread (e.g., a plunger screw thread, which may be distinct from any screw thread of the screw pump), and the plunger may form a nut around the rotating member that is configured to travel along the screw thread of the rotating member in use, such that, as the rotating member rotates, the plunger moves towards the screw pump so as to force pellets contained within the chamber towards the screw pump. The plunger may be configured to abut and/or contact an inner surface of the cartridge and/or chamber, and a friction fit may exist between the plunger and the inner surface of the cartridge and/or chamber, to help prevent the plunger rotating with the rotating member.

The screw thread associated with the plunger may extend along the length of the rotating member up to the screw threads that form the screw pump. In some embodiments the screw thread(s) that form(s) the screw pump may extend along the rotating member and form the screw thread associated with the plunger.

In various embodiments, the device may include certain features that provide a driving force to the plunger towards pellets located within the chamber, for example in addition to or other than relying on the weight of the plunger as described above. For example, a ratchet mechanism may be used to ensure that the plunger can only move in a single direction, namely towards the pellets located within the chamber. Alternatively, or additionally, a resilient member (e.g., a spring) may be provided (e.g., biased between a surface of the plunger and a portion of the cartridge) to force the plunger towards the pellets located within the chamber. Alternatively, or additionally, a source of pneumatic air may be provided, which may pressurize the plunger towards the pellets located within the chamber.

The device may comprise a deformable material press fitted between the rotating member and the cartridge, wherein the plunger is configured to push the deformable material along the longitudinal axis of the rotating member and the deformable material is configured to move pellets as it is pushed by the plunger (e.g., scrape one or more (or all of the) inner walls of the cartridge that form the chamber), so as to assist in moving pellets towards the screw pump.

The plunger may comprise one or more teeth or tines that extend from a main body of the plunger in an axial direction (relative to a longitudinal axis of the rotating member). The teeth may comprise a rail at a distal end (away from the main body) and configured to engage a screw thread on the rotating member, such that rotation of the rotating member causes the rails to travel along the screw thread and move the plunger along the axis. The teeth may be configured to flex in a radial direction, such that the rails can disengage from the screw thread.

The plunger may comprise one or more teeth or tines that extend from a main body of the plunger in an axial direction (relative to a longitudinal axis of the rotating member) and are biased towards the rotating member, so as to stabilize the plunger as it travels along the axis in use. The plunger may comprise a resilient device comprising a plurality of projections (e.g., teeth or tines as described above) and a resilient member configured to bias the projections radially inwards. The resilient member may be an elastic band that extends concentrically around the rotating member.

The plunger may taper from a first thickness adjacent to the rotating member to a second thickness at a perimeter of the plunger (in a radial direction), wherein the second thickness is smaller than the first thickness. The perimeter may be adjacent to the inner walls of the cartridge that form part of the chamber. The plunger may taper to a point edge at the periphery of the plunger. The plunger may be configured to flex at the perimeter in a resilient manner. This reduces the friction between the plunger and the cartridge, and also assists in moving pellets towards the screw pump.

The device may further comprise a valve connected to an outlet of the screw pump and configured to prevent pellets from being dispensed from the screw pump, for example outside of a dispensing operation when the screw pump is not being rotated or prior to use, and may permit pellets to be dispensed from the screw pump during a dispensing operation, e.g., upon rotation of the screw pump in use.

The valve may comprise a resilient portion, e.g., a rubber membrane, that is configured to flex open to allow pellets to be dispensed as the screw pump rotates in use, and then flex back when the screw pump is not turning, so as to stop pellets falling out of the screw pump and to help seal the cartridge.

The resilient membrane may be movable between a first position and a second position, wherein in the first position the membrane blocks the end of the screw pump to prevent pellets from being dispensed and in the second position the membrane moves to unblock the end of the screw pump and allow pellets to be dispensed. In various embodiments the membrane may be configured to move due to a force applied to the membrane by the pellets via and upon rotation of the screw pump.

The valve may comprise an umbrella valve.

The valve may comprise a frustoconical portion that extends from a first end of the valve that connects to an outlet of the screw pump, to a second end of the valve. The second end of the valve may comprise an outlet portion comprising an outlet for dispensing pellets therefrom. The valve may be configured such that pellets need to be forced out of the valve, through its outlet, upon rotation of the rotating member. For example, the size of the outlet may be adapted to the size of the pellets to be dispensed, such that a smallest dimension (e.g., width) may be substantially equal to a width or diameter of a pellet, and/or may be less than about 1.5, 1.4, 1.3, 1.2 or 1.1 times a width or diameter of a pellet.

The use of a screw pump to dispense a drug or medicament in pellet form is considered to be advantageous in its own right. Therefore, in an aspect of the present invention (that the Applicant reserves the right to claim independently), there is provided a device for dispensing a drug or medicament in pellet form, comprising a screw pump comprising a screw thread, wherein, as the screw pump is rotated in use, pellets are received into the screw thread, travel down the screw thread and are dispensed from the screw thread and device. In this aspect, the screw thread is configured such that a predetermined rotation of the screw pump causes a predetermined amount of pellets to be dispensed from the device.

The device may comprise one or more actuators configured to rotate the rotating member. The actuator may be a mechanical or electromechanical actuator. The actuator may be located at the first end of the device. The actuator may be configured to rotate the rotating member. This may cause (in relevant embodiments) a plunger to move down the screw portion of the rotating member, and/or the screw section to rotate, causing the pellets to be dispensed via the screw pump formed between the screw section and the exit tube (or, in relevant embodiments, the screw section and the cartridge).

The actuator may be an electromechanical actuator (e.g., one or more motors) or comprise an electromechanical actuating mechanism, so that the device may be able to dispense a precise amount of pellets repeatedly. The motors, and the control system may be powered by an integrated battery (which may be user replaceable), which may be held within the housing of the actuator.

The device may include a control system (e.g., as part of the actuator), which may be configured to dispense the dose within a predetermined time (e.g., less than 2, 3 or 5 seconds) after receiving an actuating signal from an input device or mechanism. The actuating signal may be initiated, for example, by a user pressing a suitable button or other input mechanism located on the device or optionally via a different control such as a wireless or wired, external control.

The actuator may comprise one or more electric (e.g., stepper) motors, which could be configured to rotate the rotating member by any suitable number of turns (e.g., steps) based on the situation at hand, e.g., based on the type of medicament within the cartridge, or the user. The control system may be provided in the form of a microcontroller, e.g., on a printed circuit board ("PCB"), which may be located within the housing of the device of within the actuator.

In an aspect of the present invention, there is provided a method of using a device as described above, comprising:
    rotating the screw pump, e.g., using the rotating member, by a predetermined amount of rotation to cause a predetermined amount of pellets to be dispensed from the device. The devices may relate to a disposable or relatively inexpensive device that aims to make the dispensing of short-term prescriptions, including but not limited to antibiotics, simpler and more convenient than e.g. existing blister pack medications and liquid formulations.

The method may further comprise filling the chamber with pellets providing an oral dosage form, determining an amount of rotation of the screw pump that will cause a predetermined amount of the pellets to be dispensed from the device, and rotating the screw pump by the predetermined amount to cause the predetermined amount of pellets to be dispensed from the device (100).

The devices may relate to a more robust and long-term dispenser in which a first portion of the device (e.g., the actuator 300, 300', and optionally the rotating members 250, 250', 250A, 250B described below) comprises relatively complex or expensive portions of the dispensing mechanism, and one or more second portions of the device (e.g., the cartridge or cartridges 200, 200', 200AB described below) comprise relatively simple or inexpensive portions of the dispensing mechanism and the drug or oral dosage form. The one or more second portions may be replaceable cartridges (or a replaceable, integrated cartridge such as cartridge 200AB described below) that can be inserted into the first portion, such that the first portion can be used with different cartridges, and varying types of medicament, drug and dosages (e.g., oral dosage forms). In some embodiments, the first portion may include a housing (see, e.g., housing 400 described below) that is configured to hold the cartridge or cartridges and the second portion may include the cartridge or cartridges, which can be inserted into the housing.

The present invention relates to the integration of a cartridge and dispensing mechanism. The pellets are dispensed using a screw pump, for example in the form of an "Archimedes" screw mechanism, which has been found to be advantageous due to its accuracy, simplicity and ease of use. In some embodiments the device may comprise means for applying a pressure on the pellets within the chamber in which they are held, e.g., using a plunger 230 as described below. Applying pressure on the pellets in this manner in order to pack them well can mean that the dosage is consistent over the lifetime of cartridge, ensuring the first dose is of similar volume or weight to the last. Furthermore, such operation can mean that the devices are able to operate in any orientation.

In some embodiments the devices also incorporate the use of a plunger mechanism, which separates the pellets from the actuating mechanisms of the devices.

Further technical effects will become apparent from the description provided below.

Definitions

Pellet—A single granule of an oral dosage form (e.g., a medicament, drug, medication, etc.), optionally having a dimension (e.g., a diameter) between about 150 μm and about 1200 μm (or even about 1500 μm, optionally between about 200 μm and about 300 μm, between about 300 μm and about 900 μm, or between about 500 μm and about 700 μm. By "diameter" it is meant that the pellets are assumed to be roughly spherical, although they could be irregular shaped. The diameter could correspond to a largest width of the pellets, if they are not assumed to be spherical. Pellets may or may not have a surface coating.

In various embodiments the pellets may have a dimension (e.g., a largest dimension, width or diameter) within one or more of the following ranges: 150-300 μm; 150-400 μm; 200-400 μm; 200-500 μm; 300-500 μm; 400-600 μm; 300-700 μm 500-700 μm; 200-800 μm 600-800 μm; 700-900 μm; 700-1200 μm; 800-1000 μm; 800-1100 μm; 900-1100 μm; 900-1200 μm; and 1000-1200 μm.

Dose—A single measurement (e.g., volume or weight) of pellets, for example totaling between about 0.05 ml to about 0.8 ml (such as about 0.1 ml to about 0.6 ml) by volume, for example about 0.3 ml by volume (although sometimes such pellets are measured by weight).

Dispensing Mechanism—A system, e.g., an electromechanical system that converts a user's action into the dispensing of a dose.

Cartridge—A component, e.g., a replaceable component used to store and dispense pellets, optionally containing features of the device such as a rotating member in the form of, e.g., a central threaded bar, a moving plunger and the pellets.

Plunger—A plate (although other types of plunger are envisaged) that can ensure the pellets stay packed together toward the dispensing end of the cartridge. The plate may be substantially rigid, but portions of the plate may be flexible, for example those portions that interact with other parts of the cartridge.

Dispensing Aperture—The open end of the cartridge that allows the pellets to be dispensed for consumption.

Cap—A container or tray that covers the delivery aperture, for collection of a dose and for protection of the stored pellets from humidity.

Press—An action performed by a user on the device when they wish to dispense their specified dosage, this could be rotary or linear motion.

It will be appreciated that references to "a" drug or medicament as referred to herein may be taken as "one or more" drugs or medicaments. For example, the pellets could comprise several drugs or medicaments in pellet form. This could be achieved by mixing pellets, each comprising a different drug or medicament, and/or mixing drugs or medicaments within each pellet.

BRIEF DESCRIPTION OF THE DRAWINGS

Various embodiments will now be described, by way of example only, and with reference to the accompanying drawings in which:

FIGS. 16 and 17A-17B show the embodiment of FIGS. 9-10 including a valve;

FIGS. 20-22B show the embodiment of FIGS. 9-10 including a cap;

FIGS. 26-28B show the embodiment of FIGS. 9-10 including a tapered portion at the dispensing end of the device.

DETAILED DESCRIPTION

Figure 1:
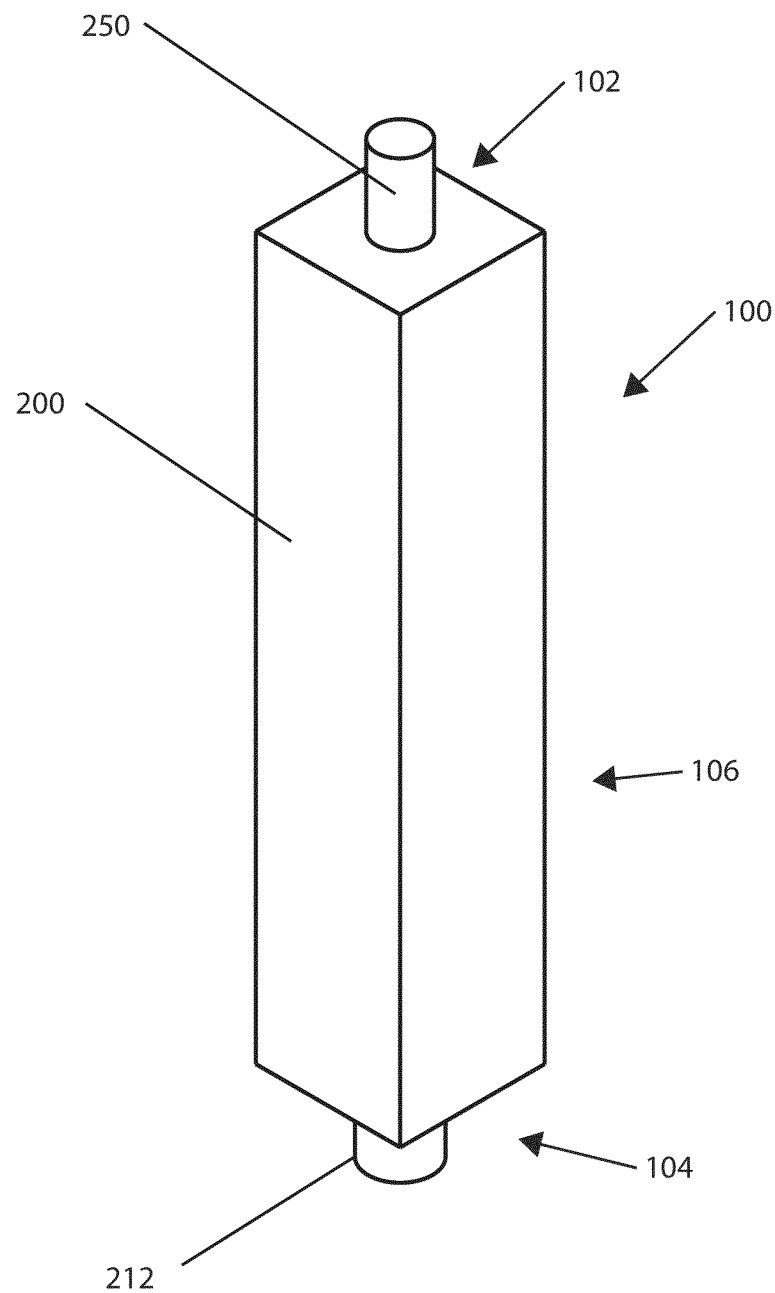
FIGS. 1-3 show a first embodiment of a dispensing device according to various aspects of the invention.

FIG. 1 shows a perspective view of a device 100 according to various aspects and embodiments of the invention, and is a delivery device capable of dispensing a drug or medicament (e.g., an oral dosage form) in pellet form. The device 100 has the aim of making the dispensing of repeat prescriptions simpler and more convenient than e.g., existing blister pack medications, and would enable changing the administered dose in a straight-forward way if desired for a certain treatment (e.g. for medications that would benefit from titrations or flexible adjustments). The device 100 also aims to deliver reliable doses of medications in pellet form. In various embodiments the device can deliver doses meeting regulatory standards such as +/−10% of a desired dose, or even within +/−5% of a desired dose.

FIG. 1 shows the device 100 in a part-assembled state, which comprises a first end 102 for connecting to an actuator or other driving mechanism (described later) configured to translate an action of a user into delivery of a dose of medication.

The device 100 comprises a second end 104, which is opposite the first end 102 and comprises the dispensing end of the device 100. In use, the medication will be dispensed in pellet form out of the second end 104 as a result of the action of a user to operate the driving arrangement.

A central portion 106 of the device 100 may form the main body of the device 100, and comprises a cartridge 200. The cartridge 200 attaches to an actuator or driving mechanism (described later) at the first end 102 of the device 100.

The device 100 comprises a rotating member 250 extending through the cartridge 200. As described in more detail below, at the first end 102 of the device 100 the rotating member 250 connects to a driving arrangement that rotates the rotating member 250 to cause pellets to be dispensed from the second end 104 of the device 100.

In the embodiment of FIG. 1, at the second end 104 of the device 100 there is an exit tube 212, through which drugs (medicament, etc.) are dispensed in pellet form as described herein.

Figure 2:
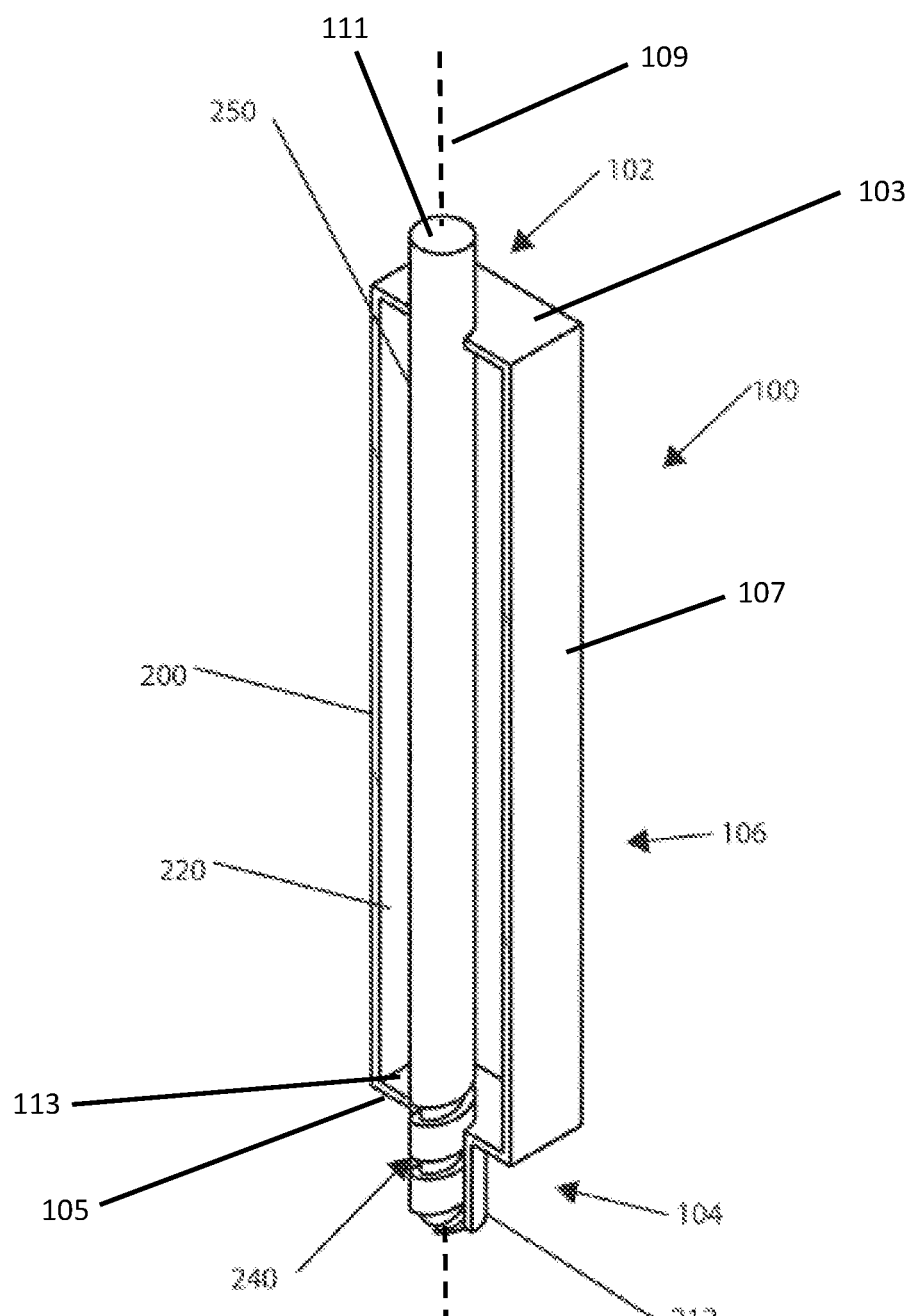

FIG. 2 shows a cutaway view of the device 100 shown in FIG. 1, which shows the interior of the cartridge 200 and some features of the rotating member 250 in more detail. The cartridge 200 is hollow and comprises a chamber 220 for holding drugs in pellet form, and through which the rotating member 250 extends from the first end 102 of the device 100 to the second end 104 of the device 100.

FIG. 2 shows a cutaway view of the device 100 shown in FIG. 1, which shows the interior of the cartridge 200 and some features of the rotating member 250 in more detail. The cartridge 200 is hollow and comprises a chamber 220 for holding drugs in pellet form. The cartridge 200 includes an end panel 105 disposed at a second end 104, and at least one side panel 107 that extends longitudinally between a first 102 and second end 104. In this embodiment, the chamber 220 is defined by the at least one side panel 107, and extends along a longitudinal axis 109 extending between the first and second ends 102, 104. In the cartridge 200 embodiment shown in FIGS. 2 and 3, the cartridge 200 includes a plurality (e.g., 4) side panels 107. In other embodiments like that described below and shown in FIG. 4, the cartridge 200 may be cylindrically shaped having a single circumferentially extending side panel 107. The rotating member 250 includes a first longitudinal end 111 and a second longitudinal end 113, and the rotating member 250 extends longitudinally between the first end 102 of the device 100 to the second end 104 of the device 100.

The rotating member 250 extends into the exit tube 212 at the second end 104 of the device 100, and comprises a screw section 240. Together, the exit tube 212 and screw section 240 form a type of screw pump configured to dispense pellets from the second end 104 of the device 100. That is, pellets will enter the screw thread of the screw section 240 and, upon rotation of the rotating member 250, will be forced out of the exit tube 212 and be dispensed from the device 100.

Figure 3:
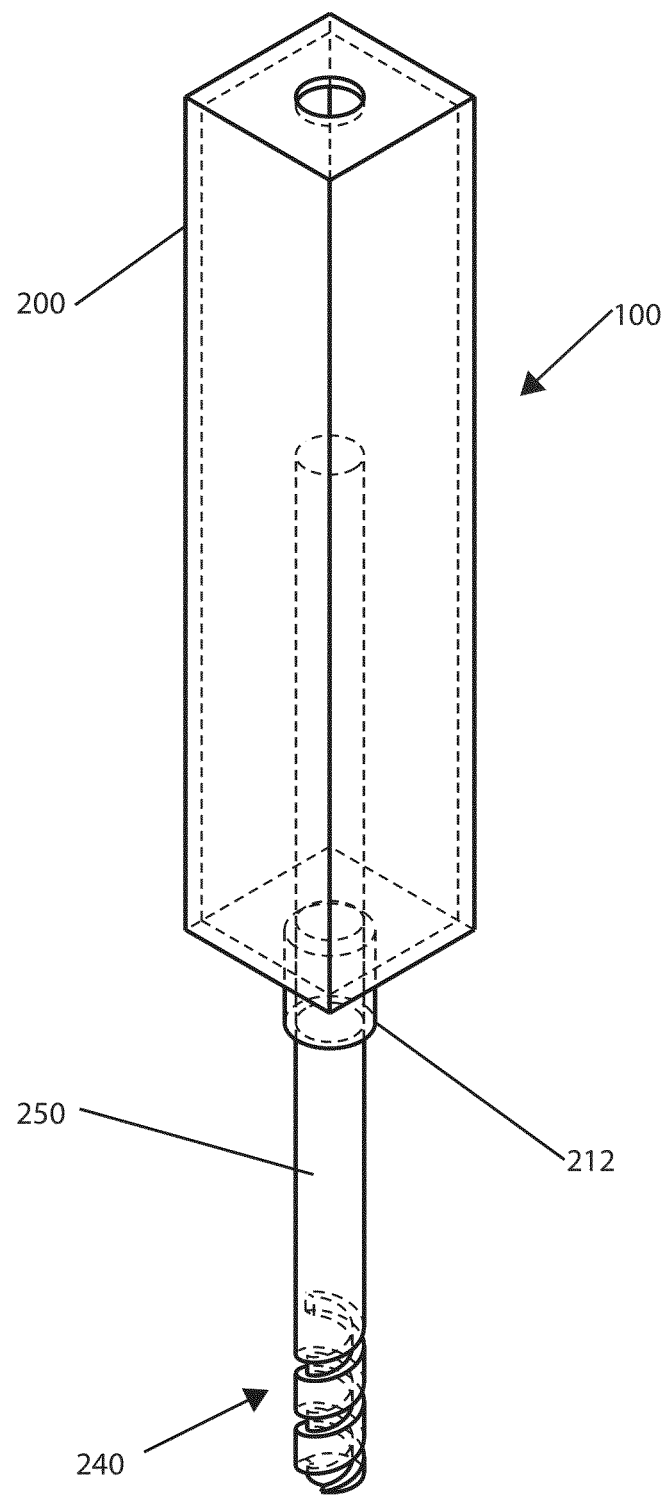

FIG. 3 shows an exploded view of the device 100 of FIGS. 1 and 2 in a part-assembled state. In this embodiment, the rotating member 250 and the cartridge 200 have a common longitudinal axis, which is also the axis of rotation of the rotating member 250. However, in various embodiments the longitudinal axis of the cartridge 200 may be offset from that of the rotating member 250 and/or the axis of rotation of the rotating member 250.

FIGS. 1 to 3 show the cartridge 200 having an oblong shape, although this is not essential, and the cartridge 200 could have any suitable shape.

Figure 4:
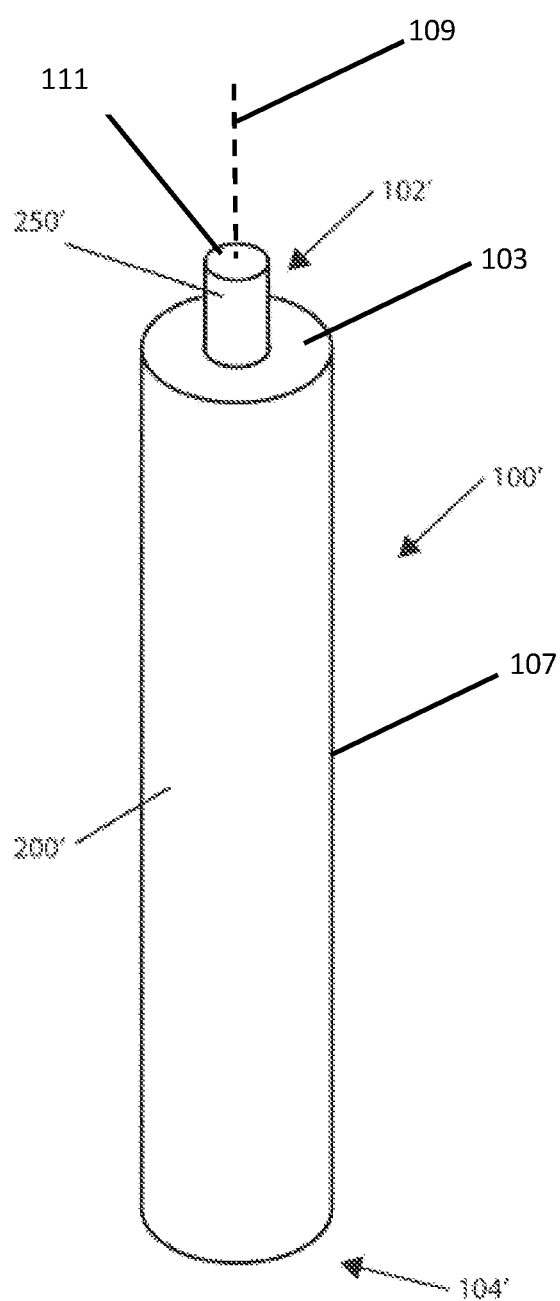
FIGS. 4-6 show a second embodiment of a dispensing device according to various aspects of the invention.
Figure 5:
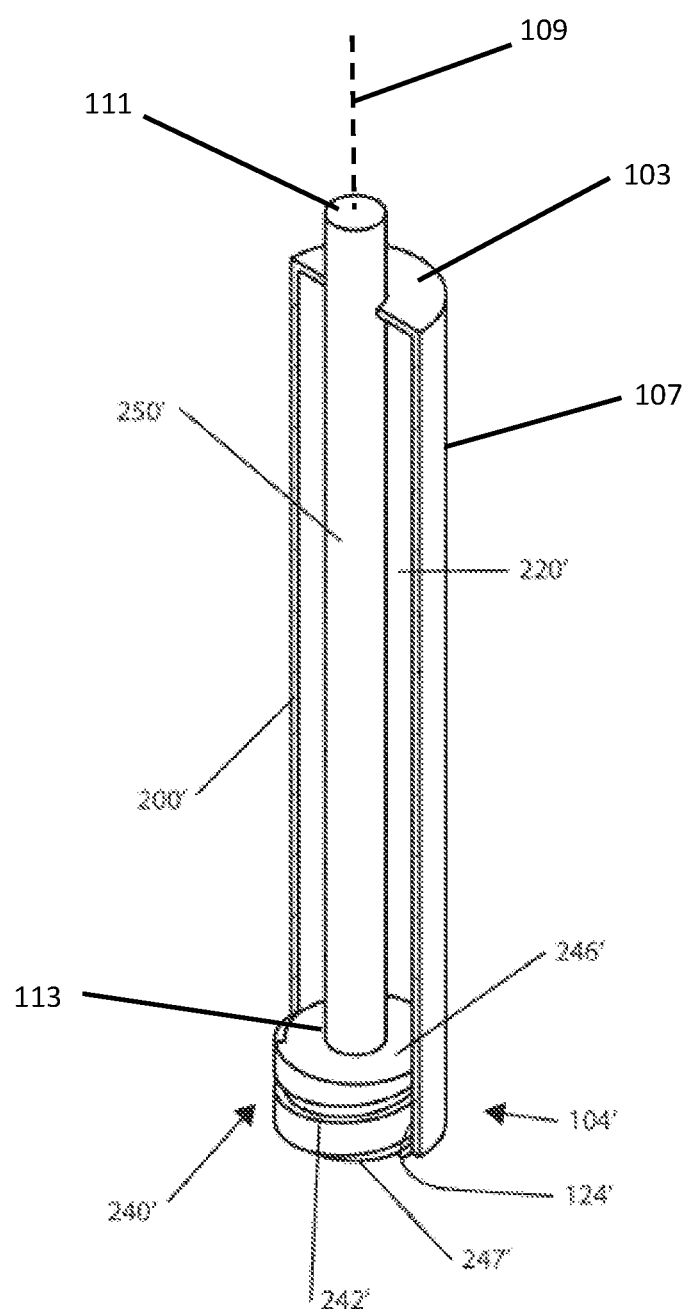

FIGS. 4 and 5 show an alternative device 100' that is similar to the device 100 of FIGS. 1 to 3, but comprises a cylindrical cartridge 200'. The device 100' comprises a first end 102' for connecting to a driving arrangement (not shown) and a second end 104' that comprises the dispensing end of the device 100'.

Furthermore, the device 100' does not comprise an exit tube 212 (like the device 100 of FIGS. 1 to 3), and instead the cartridge 200' is open at the second end 104' of the device 100' and the rotating member 250' comprises a screw section 240' having an outer diameter that substantially matches the inner diameter of the cartridge 200' at the second end 104'. That is, the surfaces of the screw section 240' and the cartridge 200' may substantially contact each other or abut (e.g., continuously or intermittently), but not to the extent that they have an interference or friction fit relative to each other, to ensure that they can move smoothly past each another and ensure reliable dispensing.

Together, the cartridge 200' at the second end 104' and the screw section 240' form a type of screw pump configured to dispense pellets from the second end 104' of the device 100'. That is, pellets will enter the screw thread of the screw section 240' and, upon rotation of the rotating member 250', will be forced out of the second end 104' and be dispensed from the device 100'.

Figure 6:
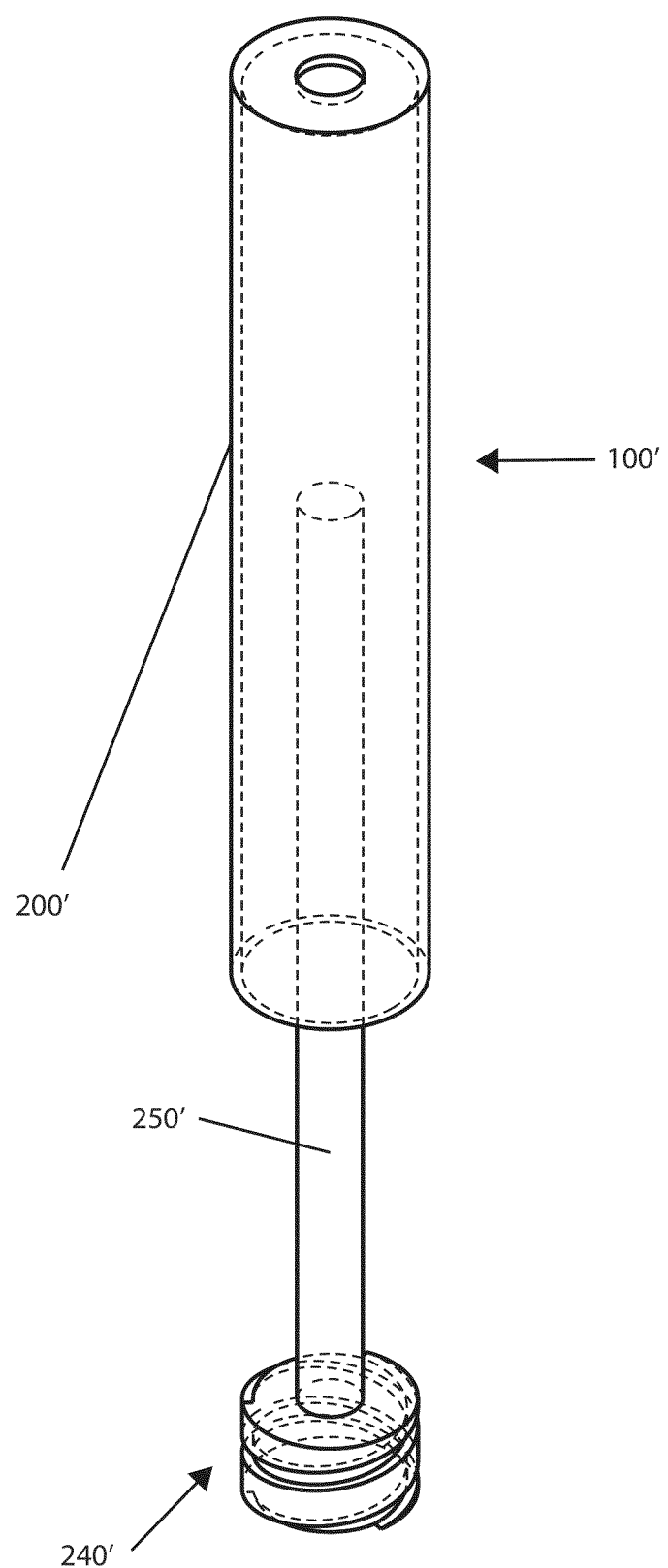

FIG. 6 shows an exploded view of the device 100' of FIGS. 4 and 5 in a part-assembled state. In this embodiment, the rotating member 250' and the cartridge 200' have a common longitudinal axis, which is also the axis of rotation of the rotating member 250'. However, in various embodiments the longitudinal axis of the cartridge 200' may be offset from that of the rotating member 250' and/or the axis of rotation of the rotating member 250'.

It should be appreciated that the principles described in respect of the cartridge 200 of FIGS. 1 to 3 are equally applicable to the cartridge 200' described in respect of FIGS. 4 to 6, insofar as they are compatible therewith. The main difference between the embodiments is that the screw pump of the second embodiment does not use the exit tube 212 of the former embodiment, but a larger diameter screw section 240' that cooperates with an inner radial surface 124' of the cartridge 200' at its second end 104'. In this embodiment, the inner diameter of the cartridge 200' may not substantially change along its length.

The screw section 240' of the rotating member 250' of this embodiment has a radially extending upper surface 246' (FIG. 5) and a radially extending lower surface 247' from which pellets are dispensed. The chamber 220' that holds a quantity of pellets is enclosed, at least in part by the upper surface 246' of the screw section 240', such that pellets held within the chamber 220' rest on the upper surface 246' in use. The screw section 240' comprises a screw thread 242' that extends around the outer circumference of the screw section 240', forming a helical path from the upper surface 246' to the lower surface 247'. Thus, in use (as the rotating member 250' is rotated) pellets enter the upper surface 246' from the chamber 220', travel down the screw thread 242' and exit the device 100' as they exit the screw thread 242' from the lower surface 247'.

Figure 7:
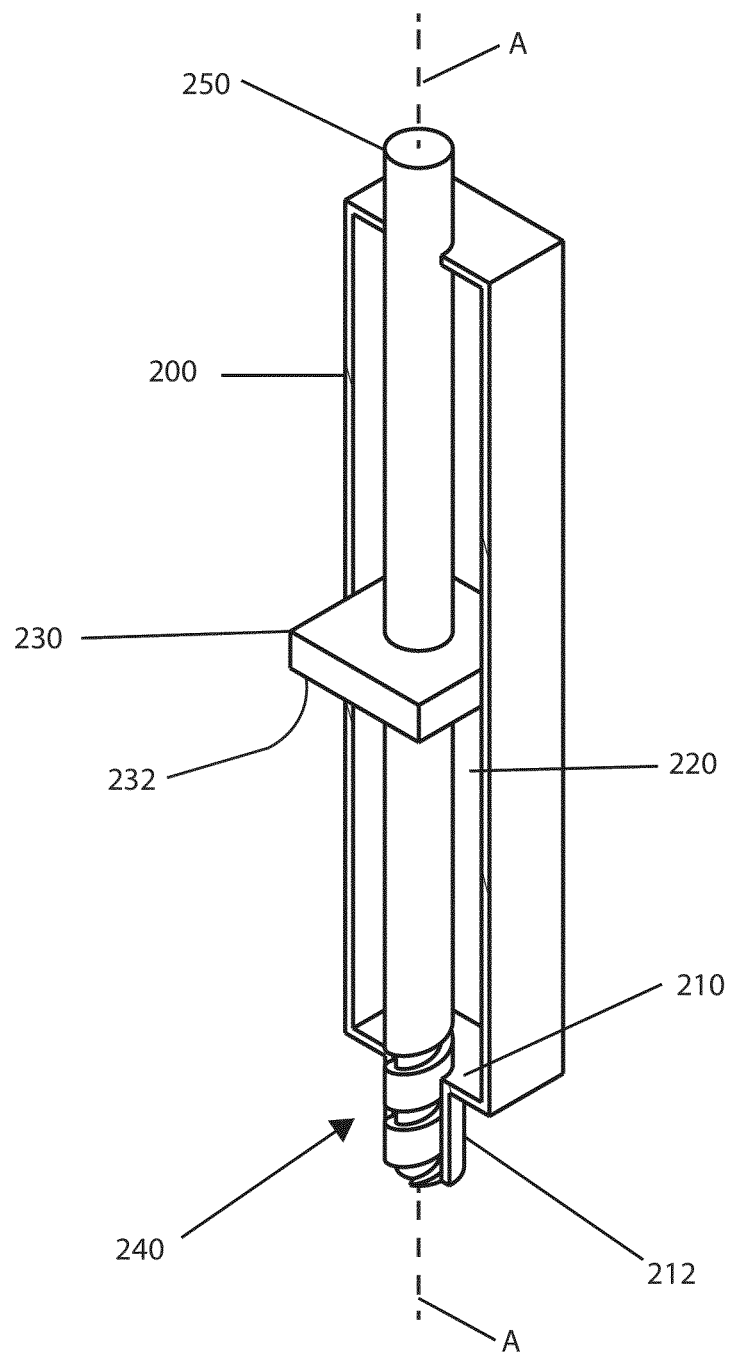
FIGS. 7 and 8A-8B show an embodiment of the device shown in FIGS. 1-3 including a gravity-driven plunger.

Referring back to the embodiment of FIGS. 1 to 3 (although the principles apply equally to the embodiment of FIGS. 4 to 6), FIG. 7 shows the cartridge 200 as containing a plunger 230 within it.

Each cartridge 200 holds pellets within the chamber 220 thereof, as described above. In embodiments involving a plunger 230, the volume of the chamber 220 varies during operation of the device 100 and throughout its lifetime by the action of the plunger 230, which will be described in more detail below.

At one end, the chamber 220 is enclosed at least in part by the plunger 230, and more specifically a radially extending surface 232 of the plunger 230 that faces the chamber 220. The other end of the chamber 220 is enclosed at least in part by a flat surface 210 of the cartridge 200. The rotating member 250 extends through the chamber 220 along the longitudinal axis A of the cartridge 200.

FIG. 8A shows a cross-sectional view of the cartridge 200 comprising the plunger 230. As the rotating member 250 is rotated in use, the plunger 230 rests on top of the pellets (not shown) located within the chamber 220 such that its weight packs the pellets into the chamber 220 during rotation of the rotating member 250 and dispensing of pellets from the device 100.

The device 100 may include certain features that provide a driving force to the plunger 230 that acts in a direction towards pellets located within the chamber 220, for example other than relying on the weight of the plunger 230 as described above. For example, a ratchet mechanism may be used to ensure that the plunger 230 can only move in a single direction, namely towards the pellets located within the chamber 220. A resilient member (e.g., a spring) may be provided to force the plunger 230 towards the pellets located within the chamber 220. A source of pneumatic air may be provided, which may pressurize the plunger 230 towards the pellets located within the chamber 220.

FIG. 8B shows in more detail the plunger 230 within the cartridge 200, and also the pellets are shown located within the chamber 220. As can be seen, the radially extending surface 232 of the plunger 230 presses onto the pellets and forces them towards the second, dispensing end 104 of the device 100, to pack them tightly within the chamber 220.

The radially extending surface 232 of the plunger 230 may be shaped so as to enhance the capture of pellets within the chamber 220 so that they can be dispensed therefrom. For example, the surface 232 may be a bottom or lower surface of the plunger and may fit precisely with the opposing surface 210 of the cartridge 200. In embodiments in which the opposing surface 210 is angled, then the surface 232 of the plunger 230 may be angled in a similar and cooperating manner.

Additionally, or alternatively a plate (e.g., a baffle) may be connected to the plunger 230 that is configured to sweep or move pellets inwards towards the central axis A of the rotating member 250, ultimately to be picked up by the screw section 240 and dispensed from the cartridge 200. The plate may extend downwards from a main body of the plunger and be configured to rotate with the plunger 230 and/or rotating member 250. This feature would be particularly applicable to embodiments involving a cylindrical cartridge 200, in which the plate may sweep around the inner surface of the cartridge 200.

Figure 9:
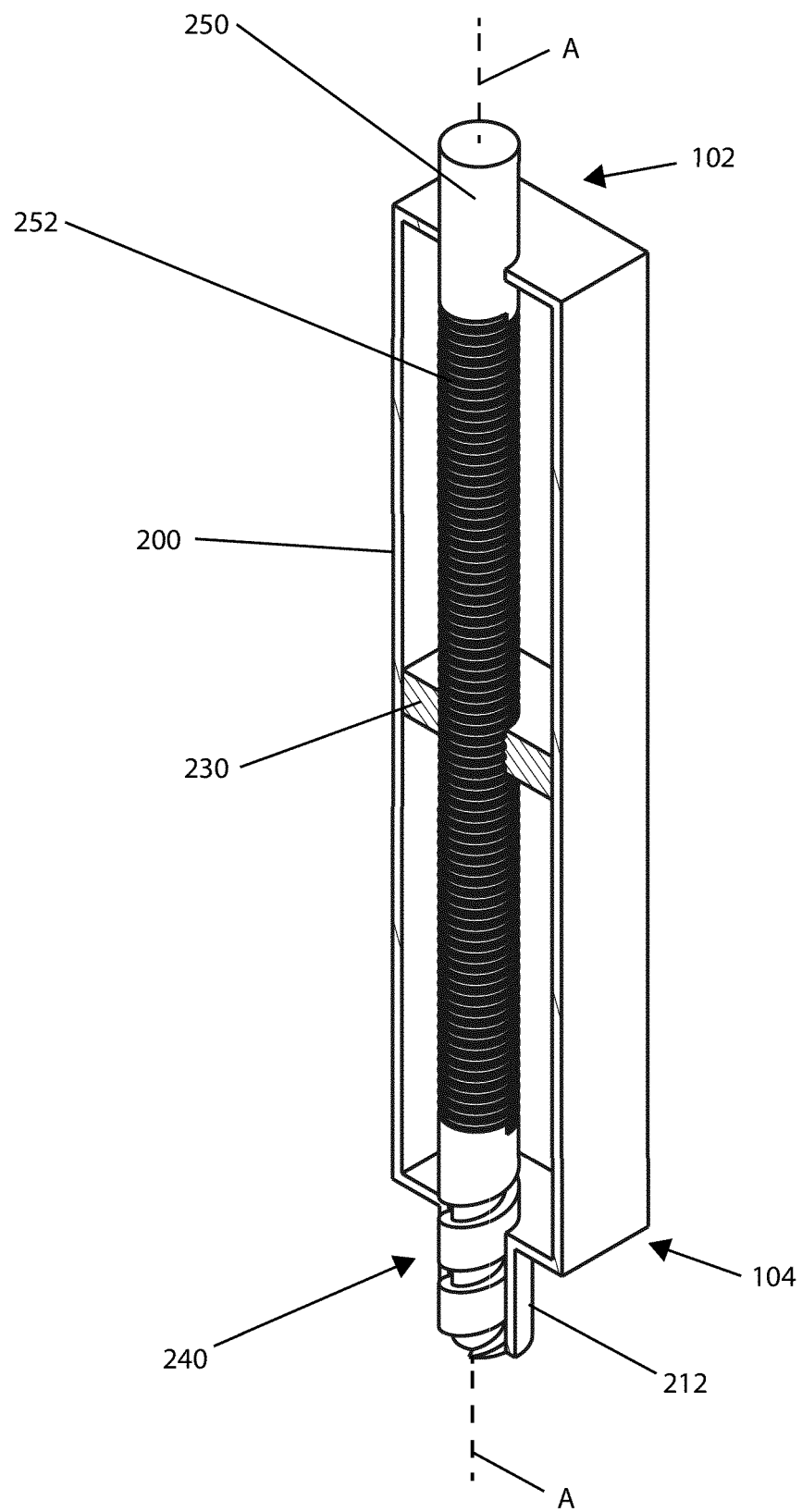
FIGS. 9 and 10A-10C show an embodiment of the device shown in FIGS. 1-3 including a screw-driven plunger.

FIG. 9 shows a further development of the embodiment of FIGS. 1 to 3. Again, the principles may apply equally to the embodiment of FIGS. 4 to 6. In this embodiment, the plunger 230 is operatively connected to the rotating member 250 such that rotation of the rotating member 250 directly causes the plunger 230 to move axially along the rotating member 250 (i.e., along the longitudinal axis A of the rotating member 250 and the cartridge 200). In other words, the plunger 230 can be regarded as a nut that translates along the rotating member 250 upon rotation thereof from the first end 102 of the cartridge 200 (i.e., the end to be inserted into the actuator—described below) to the second, dispensing end 104 of the cartridge 200.

Figure 8:
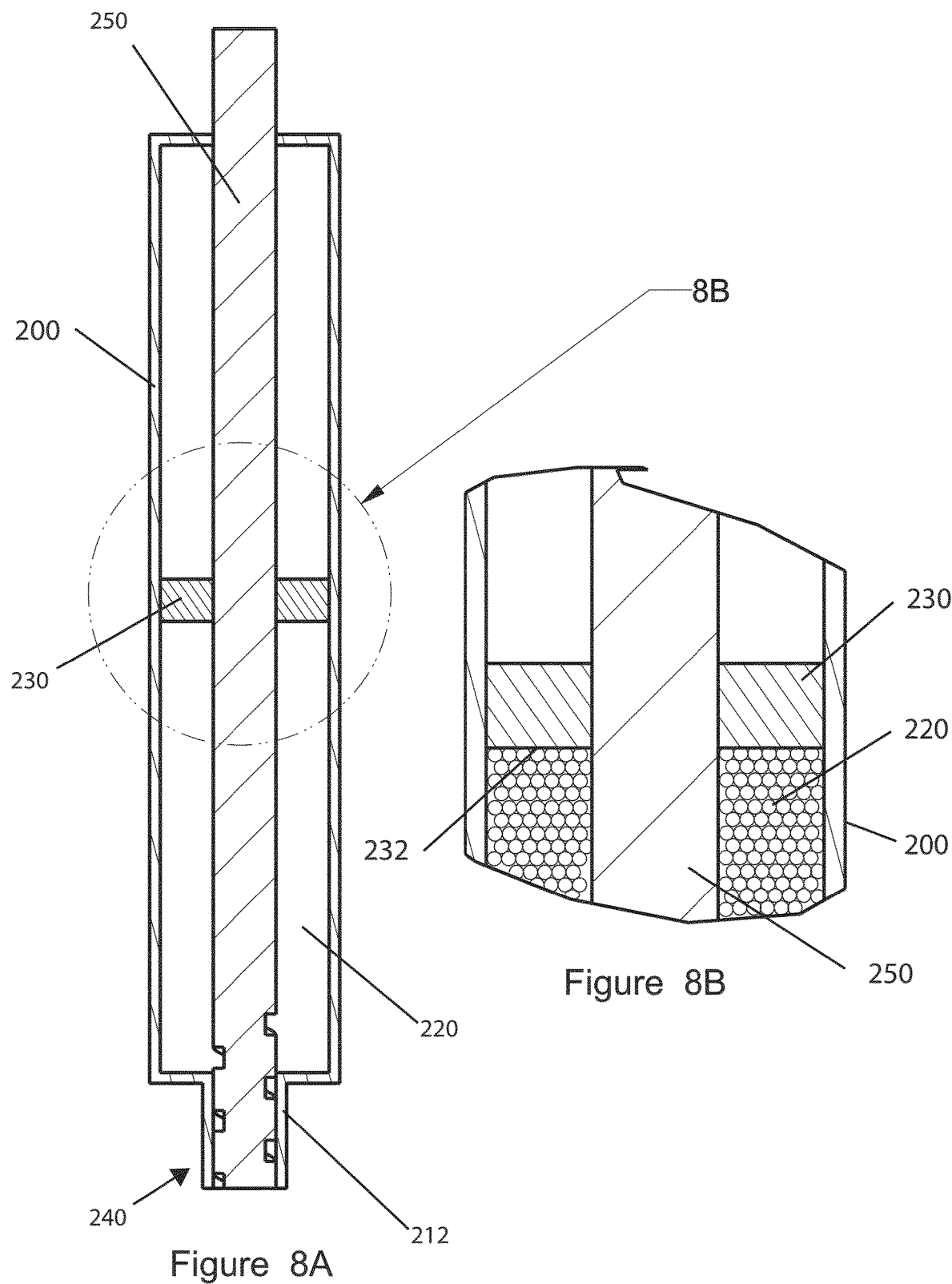

In this manner, and as with the embodiment of FIGS. 7-8B, as the plunger 230 translates along the rotating member 250, the volume of the chamber 220 gradually decreases. Furthermore, the pellets contained within the chamber 220 will be forced towards the second end 104 of the cartridge 200 by the plunger 230 throughout the operation and lifetime of the device 100. This is shown from a side cross-sectional view in FIG. 10A.

To effectuate the direct movement of the plunger 230, the rotating member 250 comprises a screw thread 252 that is configured to cooperate with a corresponding screw thread 233 (see FIG. 10B) on the plunger 230, in order to move it along the longitudinal axis A as aforesaid. At the second, dispensing end 104 of the cartridge 200 the rotating member 250 comprises the screw section 240, which is axially separated from the screw thread 252 that cooperates with the plunger 230.

In various embodiments the plunger 230 (or at least the screw thread 233 thereof) may be made from a thermoplastic elastomer ("TPE") or polybutylene terephthalate ("PBT") and/or may have a hardness of less than about 50 shore. In such embodiments, as the plunger 230 moves along the axis A the screw thread 233 may disengage with the screw thread 252 when the plunger 230 meets sufficient resistance, e.g., from meeting the pellets or the end of the cartridge 200. This permits rotation of the rotating member 250 once the plunger 230 contacts the pellets and limits the force applied to the pellets by the plunger 230. Once the pellets reduced in volume during dispensing, for example, the resistance will reduce and the screw thread 233 will at some point engage again with the screw thread 252 to continue to move the plunger 230 along the axis A.

In various embodiments the screw thread 233 may be removed and a tight, friction fit may be used to move the plunger along the screw thread 252 as the rotating member 250 rotates. For example, the plunger 230 could have two friction surfaces, a first on its outer periphery that faces the inner surface of the cartridge 200, and a second on the inner periphery that faces the rotating member 250. The friction between the first friction surface may prevent the plunger 230 from rotating but allow the plunger 230 to move axially (i.e., along the axis A). The hole in the center of the plunger 230 (through which the rotating member 250 extends) may be manufactured slightly smaller than the outer diameter of the screw thread 252. This means that the plunger 230 will move axially along the screw thread 252 as the rotating member 250 rotates, even though it does not comprise a cooperating screw thread itself. The plunger may be made of rubber to facilitate this embodiment. The second friction surface may be configured such that the plunger 230 will slip when the pellets are fully compressed, i.e., if the plunger 230 has forced the pellets down as far as they can go.

Figure 10A:
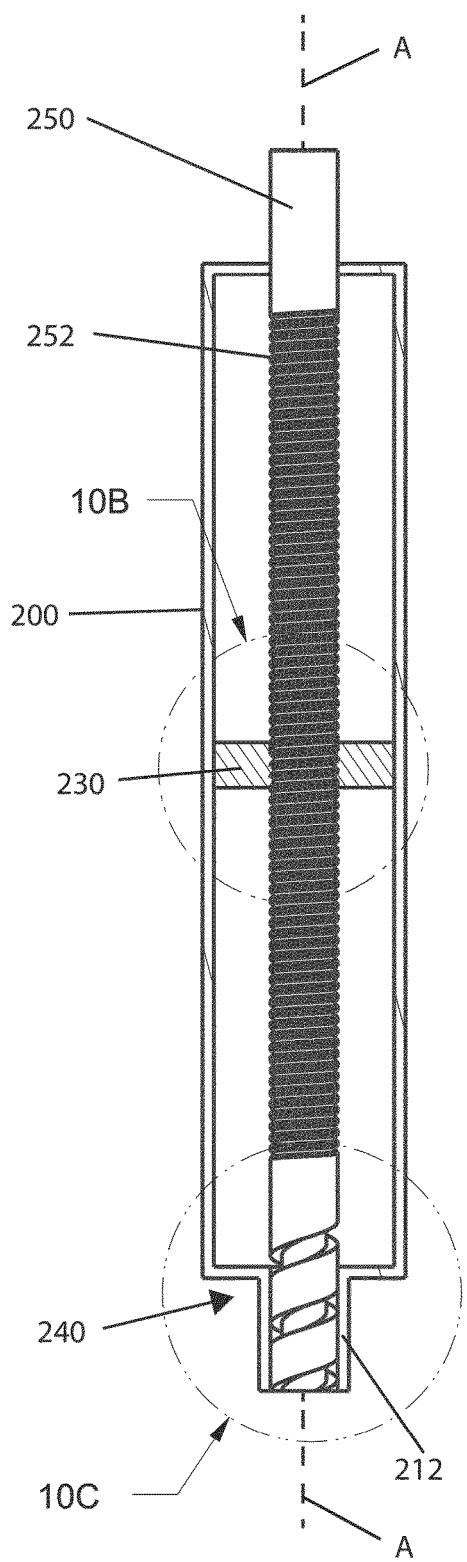
Figure 10B:
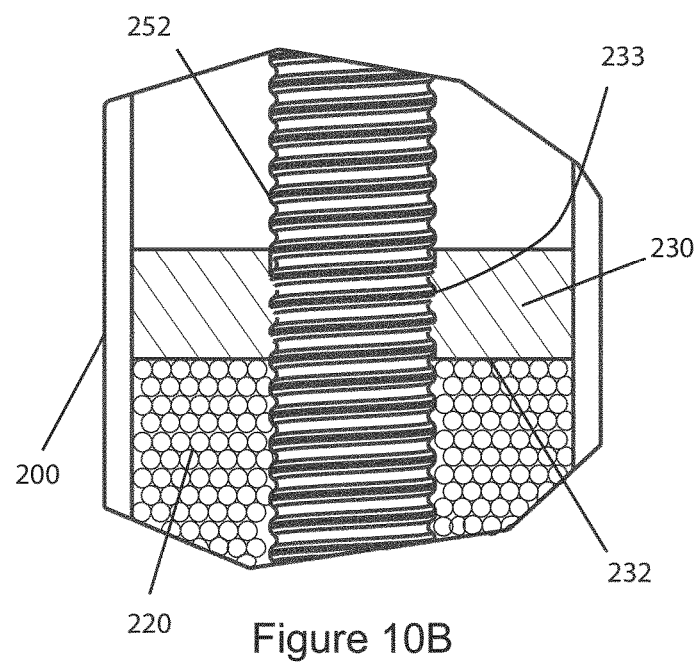
Figure 10C:
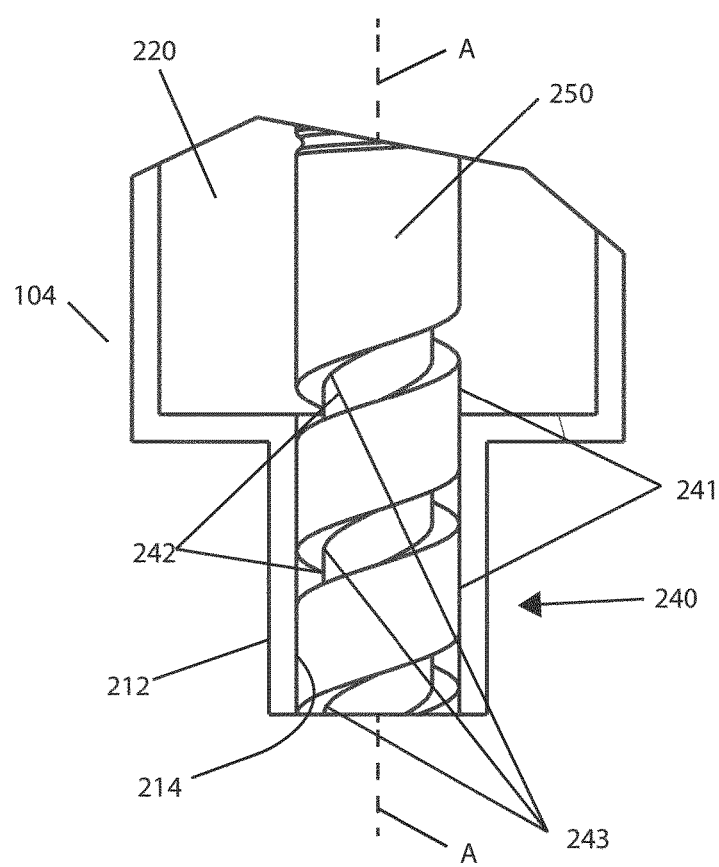

FIG. 10C shows the second, dispensing end 104 of the cartridge 200 in more detail, at which end there is located the exit tube 212, with the screw section 240 of the rotating member 250 extending through the exit tube 212 as discussed above.

A radially outer surface 241 of the screw section 240 may substantially contact (and/or abut) a radially inner surface 214 of the exit tube 212. That is, the outer surface 241 of the screw section 240 and the radially inner surface 214 of the exit tube 212 may substantially contact each other or abut (e.g., continuously or intermittently), but not to the extent that they have an interference or friction fit relative to each other, to ensure that they can move smoothly past each another and ensure reliable dispensing. It is envisioned that any tolerances between the outer surface 241 of the screw section 240 and the inner surface 214 of the exit tube 212 are as tight as possible whilst still allowing the screw section 240 to rotate within the exit tube 212.

For example, a small tolerance or gap may be present between the outer surface 241 of the screw section 240 and the inner surface 214 of the exit tube 212, e.g., due to manufacturing tolerances. If the surfaces are configured to contact each other (e.g., continuously or intermittently), the surfaces may be manufactured from friction free materials (e.g., a non-stick coating on or an additive applied to one or both of the opposing surfaces, using, e.g., Teflon), which may lead to a tight (e.g., contact fit) but without a friction or interference fit. In various embodiments (e.g., those including a cartridge containing pellets therein), a tolerance or gap between the outer surface 241 of the screw section 240 and the inner surface 214 of the exit tube 212 may be present, and may be large enough to allow free rotation of the shaft 250, but small enough to prevent any pellets (and/or pellet debris) from sliding between the gap, adding friction and inhibiting the free rotation.

The screw section 240 comprises a screw thread 242 configured to receive pellets contained within the chamber 220 and transport them, upon rotation of the rotating member 250, along the screw thread 242 to be dispensed out of the exit tube 212. The screw thread 242 consists of one or more starts, each forming a continuous helix that the pellets fill during operation of the device 100, for example due to the action of the plunger 230 pressing on the pellets within the chamber 220, which forces them into the screw thread 242.

The screw section 240 and the screw thread 242 thereof contact the inner radial surface of the exit tube 212 so as to form a screw pump (e.g., an "Archimedes" screw) with the exit tube 212 of the cartridge 200. That is, as the rotating member 250 rotates, the screw section 240 and screw thread 242 thereof will also rotate, causing pellets contained within the chamber 220 to enter the voids of the screw thread 242, travel down the screw thread 242 and exit the cartridge 200.

Figure 11:
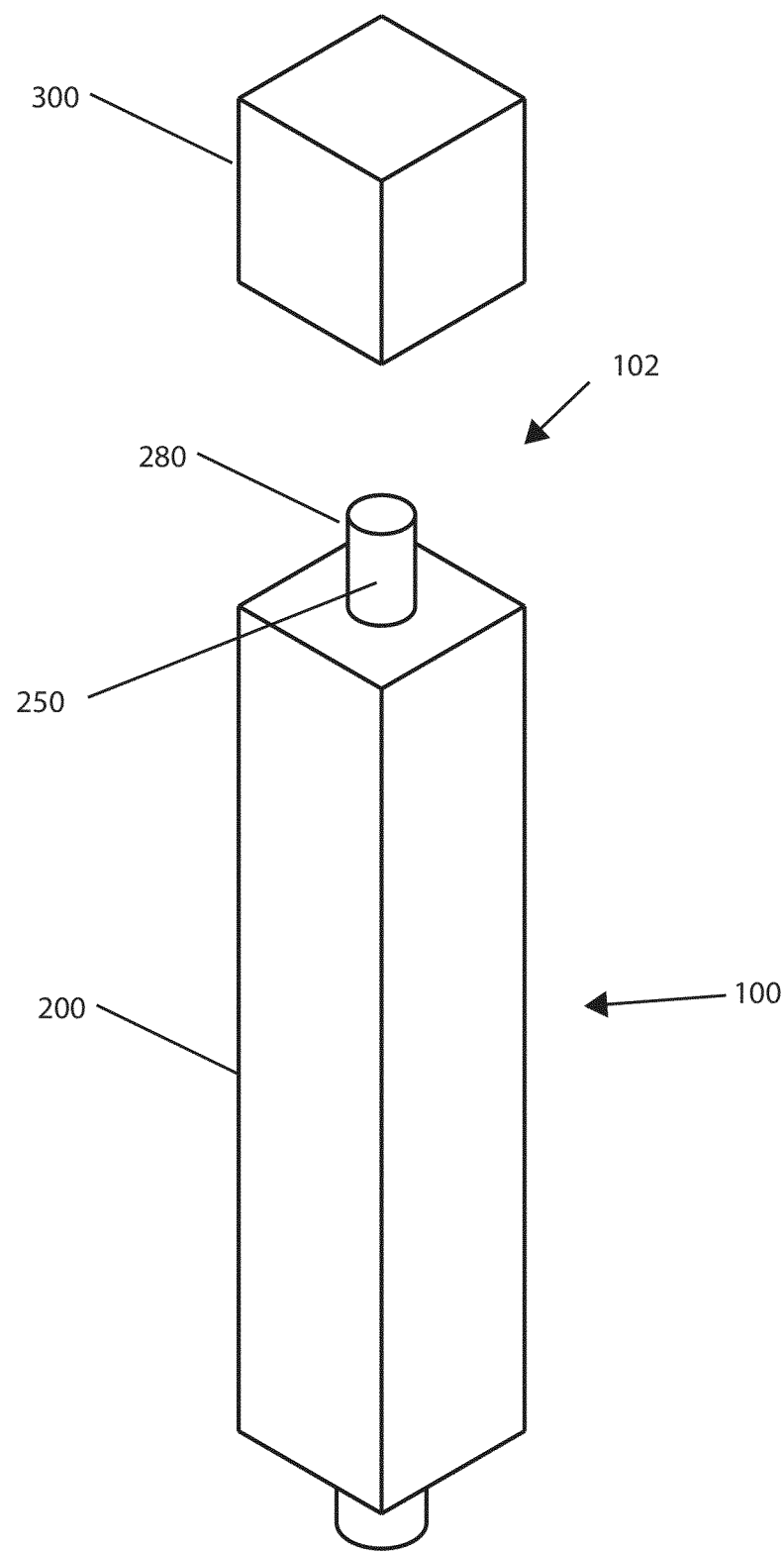
FIGS. 11, 12 and 13A-13B show the embodiments of FIGS. 9-10 including an actuator or driving mechanism.

FIG. 11 shows the device 100 comprising an actuator or driving mechanism 300 configured to rotate the rotating member 250. The actuator 300 connects to the rotating member 250 at the first end 102 of the device 100. The actuator 300 is configured to provide a rotary force to the rotating member 250, and, in turn, to the screw threads 242, 252 of the rotating member 250. The actuator 300 can be either mechanical (i.e., manually operated) or electromechanical (i.e., electrically operated, for example with an electric motor). The actuator 300 could be removable from the cartridge 200, so that different cartridges can be connected to the same actuator.

In order to operate the first device 100 manually, a user may rotate the actuator 300 (or a part thereof), causing the rotating member 250 to rotate, e.g., via a suitable gear arrangement, such that after a partial turn of the actuator 300, the rotating member 250 makes multiple (complete) rotations in order to move the screw section 240 to dispense pellets. In some embodiments, the actuator 300 may be configured such that a user presses a button (or similar), which causes a corresponding rotation of the rotating member 250. The device 100 may be configured such that a partial turn of the actuator 300 (e.g., a half-turn) causes multiple, e.g., at least 2 or 3 turns of the rotating member 250, and screw section 240, so as to ensure an efficient delivery of the pellets contained within chamber 220.

The cartridge 200 may be tamperproof, for example so that a user may not be able to access the chamber 220 without substantially breaking parts of the device 100 or spoiling the pellets. For example, a chemical may be contained within a pouch or other container within the chamber 220 that is configured to be released if the cartridge 200 is broken, or parts of the device 100 are separated from one another. The chemical may be a bitter and or other foul tasting chemical that spills on the pellets in such a situation, rendering them inedible.

In additional, alternative embodiments, the actuator 300 may be configured to prevent undesired use, for example the actuator 300 may comprise a mechanical or digital lock that prevents the rotating member 250 from rotating (and operating the device 100), for example upon a user trying to remove the actuator 300 or modify it so that it can dispense more pellets than a prescribed dosage.

Figure 12:
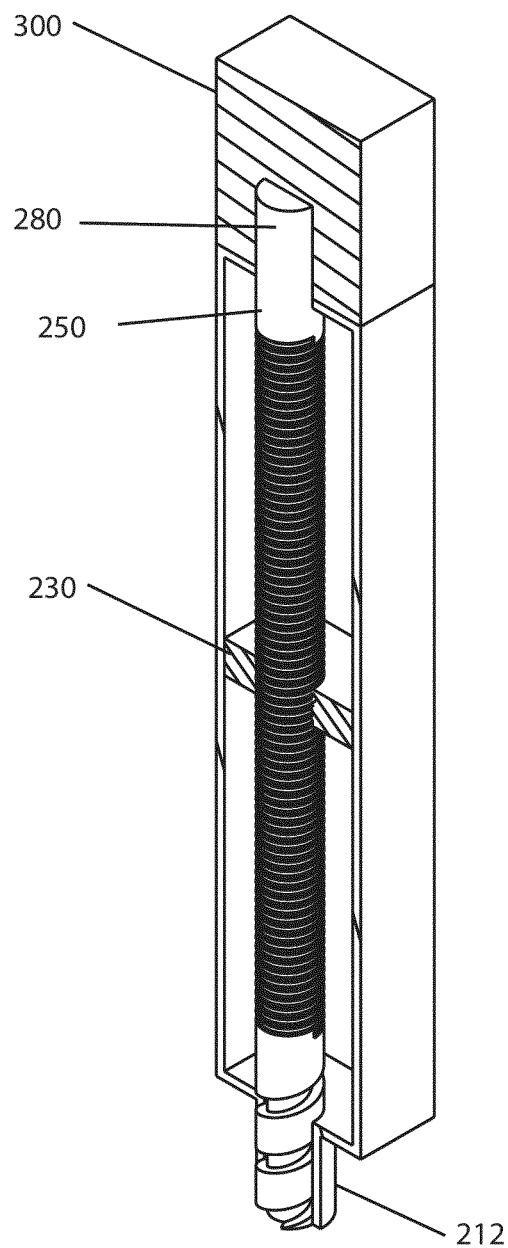
Figures 13A, 13B:
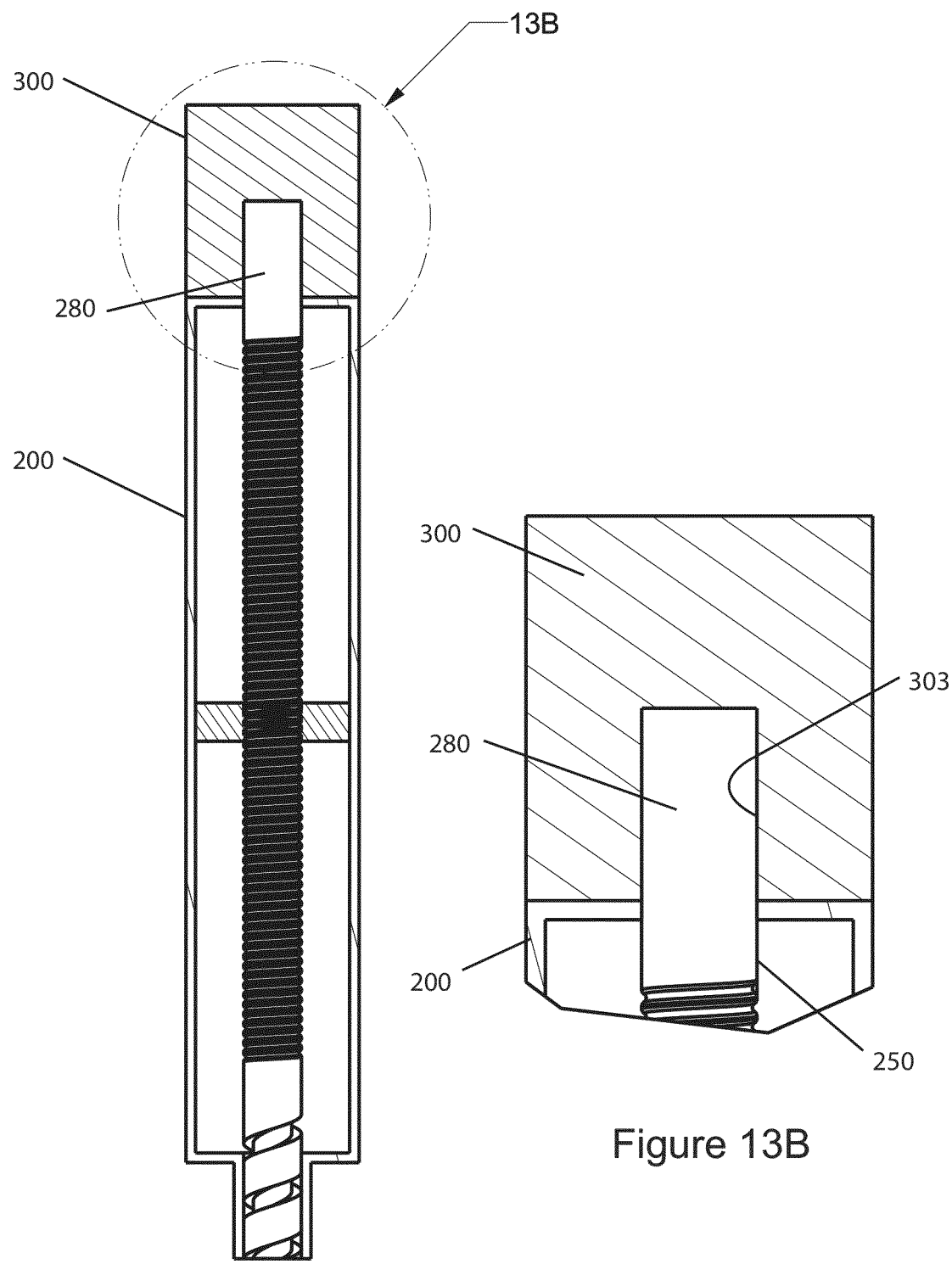

FIGS. 12, 13A and 13B show the actuator 300 in more detail. The rotary member 250 comprises a male connecting member 280 that interfaces with a female connecting portion 303 of the actuator 300. This allows the rotating member 250 to connect to the actuator 300 and a driving mechanism thereof to allow a rotary force to be transferred from the driving mechanism of the actuator 300 to the rotating member 250. The connection between the rotating member 250 and the actuator 300 may be made in any suitable manner, including, e.g., a key arrangement (for example a hexagonal key), a torx key or other standard screw driver interface, as well as by a friction fit, interference fit, another other type of friction arrangement (such as a friction clutch) or adhesive.

As will be appreciated, in order to dispense the pellets from either cartridge 200, the actuator 300 may rotate the rotating member 250. This causes (in relevant embodiments) the plunger 230 to move down the screw thread 252 of the rotating member 250, and/or the screw section 240 to rotate, causing the pellets to be dispensed via the screw pump formed between the screw section 240 and the exit tube 212 (or the screw section 240' and the cartridge 200').

By using an electromechanical actuating mechanism, the device 100 may be able to dispense a precise amount of pellets repeatedly. The motors, and the control system may be powered by an integrated battery (which may be user replaceable), which may be held within the housing of the actuator 300.

The device 100 may include the control system (e.g., as part of actuator 300), which may be configured to dispense the dose within a predetermined time (e.g., less than 2, 3 or 5 seconds) after receiving an actuating signal from an input device. The actuating signal may be initiated, for example, by a user pressing a suitable button or other input mechanism located on the device 100.

The actuator 300 may comprise one or more motors. The actuator 300 (e.g., the motor thereof) may be configured to rotate the rotating member 250 by an amount corresponding to a prescribed dose, or a portion of a dose. For example, the actuator may be configured to rotate the rotating member 250 in pulses, e.g., by operating for a certain period of time, e.g., 0.5 seconds. A dose may be made up of multiple pulses, so that different doses can be dispensed according to the number of pulses of the motor. For example, a 0.3 ml dose may correspond to about 3 seconds of motor rotation, and so the actuator may pulse the motor 6 times, which is 6 pulses at 0.5 seconds each.

The motors may be stepper motors, which could be configured to rotate the rotating member 250 by any suitable number of steps based on the situation at hand, e.g., based on the type of medicament within the cartridge 200, or the user. The control system may be provided in the form of a microcontroller, e.g., on a PCB, which may be located within the housing of the device 100 of within the actuator 300.

The following general features may be applied to any aspects or embodiments of the invention described herein, to the extent that they are applicable. For brevity, the reference numerals used are those of FIGS. 9 and 10A-10C, but this should not be interpreted as meaning that these features can only apply to this device.

The device 100 may comprise an output device, e.g., a speaker that is configured to provide audio feedback upon dose selection and dispensing. For example, the output device may provide a suitable output once the dose has been dispensed.

The device may be hand-held. For example, the device 100 (e.g., the entire device 100 or the cartridge 200) may have a length (corresponding to its longest dimension) of no more than about 250 mm (such as less than about 200 mm, about 150 mm or about 100 mm), and a width or height (i.e., transverse to its length) of no more than about 50 mm, and optionally no more than about 40 mm (and in some embodiments less than 30 mm or even less than 20 mm). In order to optimize its hand-held nature, the device may have a length between about 180 mm and about 220 mm, a width (transverse to its length) between about 35 mm and about 45 mm, and a height (transverse to its width) of between about 22 mm and about 32 mm. The device 100 (or cartridge 200) may weigh no more than about 300 g (such as about 200 g), optionally below about 100 g. This can ensure that the device is light enough to carry in one hand.

The cartridge 200 may be made from a rigid material, for example polycarbonate or polyamide, although any suitable material may be used. Portions of the cartridge 200, for example those contacting the rotating member 250 and/or plunger 230 may have a reduced friction surface (e.g., reduced relative to the other parts of the cartridge) to aid in relative movement therebetween. The inner diameter of the cartridge 200 (i.e., forming the chamber 220) may be between about 5 mm to about 200 mm, optionally about 10 mm to about 20 mm. The cartridge 200 may have a length (corresponding to its longest dimension) of between about 90 mm and about 120 mm, a width (transverse to its length) between about 33 mm and about 43 mm, and a height (transverse to its width) of between about 15 mm and about 25 mm.

The exit tube 212 may have an internal diameter that substantially equals the diameter of the rotating member 250, and specifically the screw section 240 thereof. This internal diameter may be less than 10 mm, for example less than about 6 mm. The length of the exit tube 212 along the longitudinal axis a of the device 100 may be less than about 20 mm (such as about 15 mm or about 10 mm).

The volume of the chamber 220 (i.e., prior to operation or a maximum volume) may be less than about 50 mL, for example less than 20 mL or approximately 11 mL.

The plunger 230 may be made from a low friction, rigid material, such as nylon, although other suitable materials may be used. Elastomeric materials (e.g. rubber and thermoplastic elastomers) may also be used for the plunger and are particularly interesting for the thread driven plunger concept. A friction fit around the screw thread 252 (e.g., the second friction surface described above) or a matching thread on the surface 233 in contact with the screw thread 252 would provide sufficient traction to move the plunger axially along the cartridge, pressing on the pellets. The surface of the plunger 230 opposing the screw thread 252 may be deformable, allowing the shaft to continue spinning whilst holding the plunger in place.

The plunger 230 may be configured to fill the gap between the rotating member 250 and the walls of the container 200, such that pellets contained within the chamber 220 cannot move past the plunger 230 as it moves down the rotating member 250 in use. In embodiments in which the container 200 is cylindrical, the plunger 230 will also be cylindrical, and it should be ensured that the friction between the plunger 230 and the walls of the container 200 is high enough to prevent the plunger 230 rotating with the rotating member 250 in use. Alternatively, the plunger 230 could comprise a notch that cooperates with a guide (e.g., one or more rails that are parallel with the longitudinal axis of the cartridge 200) located on the inner surface of the cartridge 200, such that the notch travels along the guide as the plunger 230 moves in use, wherein the cooperation of the notch and the guide constrains rotation of the plunger during such movement.

In various embodiments the size (and, e.g., perimeter) of the plunger 230 may be such that a small gap exists between the plunger 230 and the walls of the cartridge 200, to avoid substantial friction between the plunger 230 and the cartridge 200. This can mean that pellets could pass between the plunger 230 and the walls of the cartridge 200 through the gap. In order to avoid this, the size (e.g., width) of the gap may be configured such that it is less than the size (e.g., an average size or diameter) of the pellets. Additionally, or alternatively a material that is deformable and/or of lower friction than the plunger 230 may be provided adjacent to the plunger 230 that is configured to contact the walls of the cartridge 200 as the plunger 230 moves in use (e.g., a deformable material 234 as described below in respect of FIGS. 37A-C).

The cartridge 200 may comprise a tapered portion at the second end 104 of the device (an example is shown in FIGS. 26-28B, described below), which tapered portion may be configured to guide or direct pellets contained within the chamber 220 into the screw threads 242 of the screw section 240. In other words, the surface 210 may be angled such that it is not perpendicular to the longitudinal axis A, but is oriented at an angle with respect thereto, for example an angle of about 30°, 60° or more. In such embodiments, the lower surface 232 of the plunger 230 may have a matching geometry, such that when it reaches the end of its travel along the rotating member 250 the lower surface 232 of the plunger 230 contacts the tapered surface across its entire area. This will aid in dispensing as much of the pellets as possible, which minimizes waste. Since the screw thread 252 eventually gives way to the screw thread 242, it may be necessary to provide the screw thread on the plunger 230 away from its lower surface 232, so that a portion of the plunger 230 including the lower surface 232 extends below the screw thread of the plunger 230 (if present, but as described herein the plunger screw thread is not essential), allowing the surface 232 to contact, abut or at least move closer to the opposing surface 210 of the cartridge when the plunger 230 is at its lowest point (i.e., at the end of the screw thread 252). An example of such a tapered portion is described later in respect of FIGS. 26-28B.

The outer surface 241 of the screw section 240 may be made from a low friction material, for example nylon, polyethylene ("PE"), polyethylene terephthalate ("PET"), optionally containing friction reducing additives. The cartridge 200 and portions thereof that abut, oppose or contact the screw section 240, plunger 230 or other moving parts of the device 100 may also be made from a low friction material, for example nylon, polyethylene ("PE"), polyethylene terephthalate ("PET"), optionally containing friction reducing additives.

The screw section 240 may be configured such that the height of the screw thread 242 is such that the screw extends above the exit tube 212 (towards the chamber 220) by at least one complete turn. In various embodiments, the screw thread 242 extends into the chamber 220 by a distance between about 1 or 2 times the inner diameter of the cartridge 200 or a diameter of the rotating member 250, for example about 1, 1.5 or 2 times the inner diameter of the cartridge 200 (this is applicable to all aspects and embodiments disclosed herein) or a diameter of the rotating member 250. This has been found to prevent certain undesired effects such as 'doming' of the pellets within the chamber 220. The length of the screw section 240 may be defined by the length of the screw thread 242, which may be between about 10 mm and about 30 mm, for example between about 10 mm and 20 mm.

The exit tube 212 may have a length of between about 5 mm and about 20 mm (optionally between about 10 mm and about 15 mm), wherein the length of the screw thread 242 in a direction along the longitudinal axis A of the cartridge 200 may be at least the length of the exit tube 212 in the same direction, for example between about 1 and about 10 times the length of the exit tube 212, or about 1 to about 5 times the length of the exit tube 212, for example about 1.2, 1.3, 1.4, 1.5 or 2 times the length of the exit tube 212 (this is applicable to all aspects and embodiments including an exit tube 212).

The screw thread 242 may have a pitch of between about 1 mm to about 20 mm, and optionally about 4 mm to about 8 mm. Pitch has been found to have an impact on the precision of the dispensed does, especially in terms of pellet run-through (pellets running through the screw section even though the rotating member is not turning). This can cause the device to "leak" pellets in certain situations. A high pitch seems to increases the risk for pellets running through the screw section outside of a dispensing operation. As such, it has been found that a low pitch (e.g., less than about 15-30 times a diameter of the pellets as described below) has been found to increase the precision of a dispensed dosage of pellets, for example because it is easier to control an output rate of the pellets. A low pitch does appear to increase load, and the torque requirements for driving the rotating member, and this is the trade-off that led to this pitch range being considered important.

Figure 36:
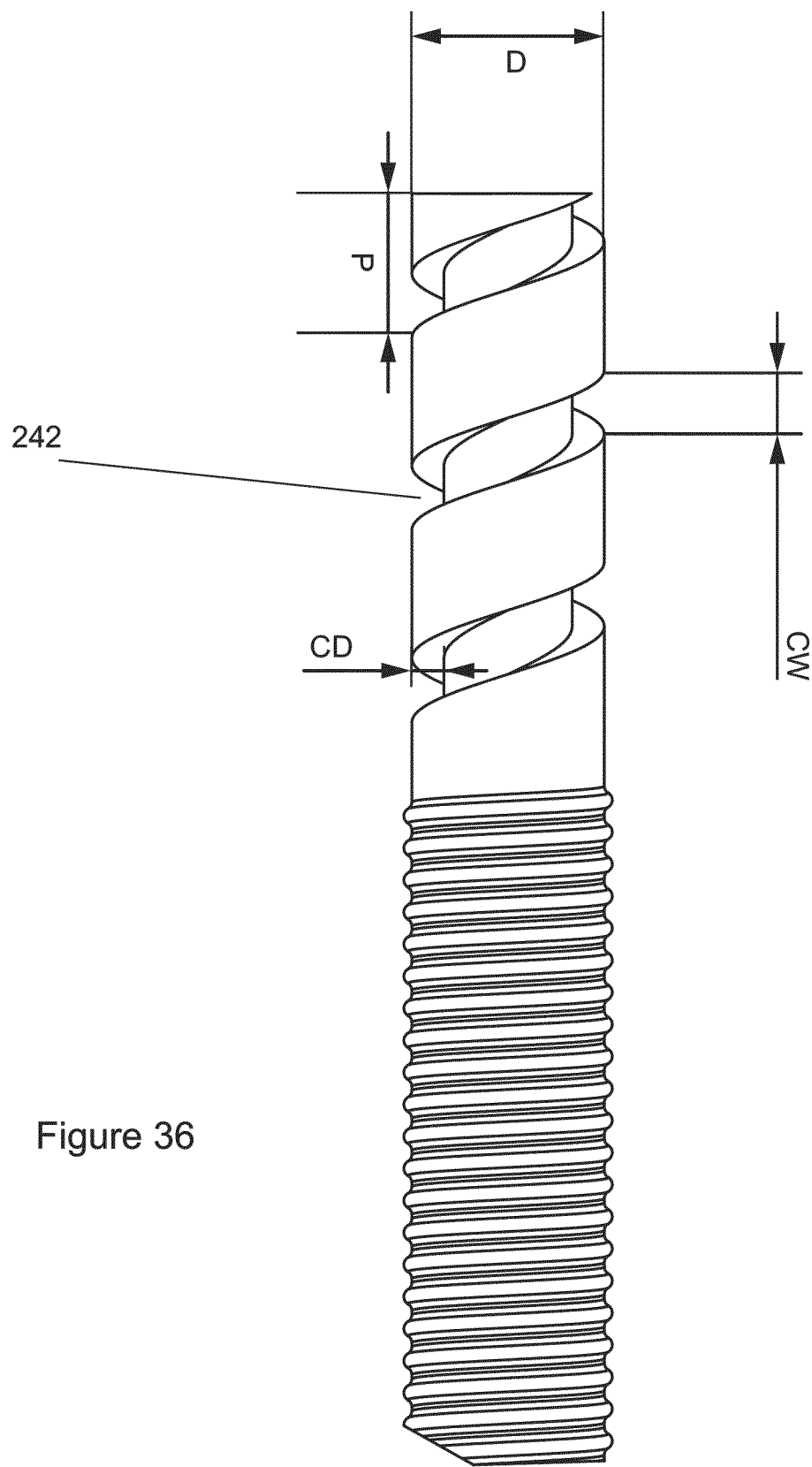
FIG. 36 illustrates various dimensions of the screw thread for use in any of the aspects and embodiments described herein.

FIG. 36 shows schematically an outline of the screw thread 242 and various dimensions that may be associated therewith. "D" represents an outer diameter of the screw, "CD" represents a depth of the feeding channel, "CW" represents a width of the feeding channel, and "P" represents a pitch of the screw thread 242, which may be defined as the distance between adjacent threads. The features of FIG. 36 could be applied to any of the aspects and embodiments described herein including the screw thread 242. In addition, the values given for the dimensions may be representative of the dimensions for the entire length of the screw thread 242 and/or screw section 240.

The following table provides some exemplary dimensions (in mm) of the screw thread, with reference to FIG. 36 and the dimensions shown therein and described above. In the embodiments in the table the pellet diameter was about 200-300 μm, although the same dimensions could be used for pellets having a larger diameter, for example up to about 900 μm. Typical dimensions (e.g., width or diameter) of the pellets may be between about 150 μm and about 1200 μm (or even 1500 μm), optionally between about 200 μm and about 300 μm, between about 300 μm and about 500 μm, between about 300 μm and about 700 μm, between about 500 μm and about 700 μm, between about 700 μm and about 900 μm or between about 800 μm and about 1100 μm. Values may be provided in terms of a multiple of the diameter of the pellets and these values should be taken as general and not limited to any particular size (or range of sizes) of pellet.

| Screw | Number of screw starts | Diameter [D] | Channel Depth [CD] | Channel Width [CW] | Pitch [P] |
|---|---|---|---|---|---|
| A | 1 | 6 | 1 | 2 | 3 |
| B | 1 | 7 | 2.4 | 3 | 4 |
| C | 1 | 7 | 1.6 | 4 | 5 |
| D | 2 | 6-14 | 1.5-5.5 | 2 | 6 |

The number of screw starts has been found to have an impact on the speed at which pellets are dispensed, wherein a higher number of screw starts naturally leads to a higher output per revolution. Up to this point, it has proved to be beneficial to have a relatively low output ratio in order to maximize the precision of the dispensed pellets, and using either one or two screw starts is seen as beneficial over using, say, three or more.

Looking at the relationship between channel depth/width and pellet size, this may be chosen such that there is room for multiple pellets between the screw and the surfaces of the screw thread. What may be important is that the pellets are allowed to flow freely without negatively interfering with each other, e.g., causing jams or blockages in the flow during a dispensing operation. In some embodiments, therefore, the dimensions are chosen so that there is enough room for at least 2-3 pellets to pass each other in the channel. Having a dosing sequence free from jams or blockages in the flow may be important in reaching high precision and repeatability between doses. Therefore in various embodiments the channel depth and/or width may be at least 2, 3 or 4 times a diameter of the pellets.

For example, for pellet diameters of between about 200-300 µm the channel depth and/or channel width may be between about 1-2 mm. For pellet diameters between 700 µm and about 900 µm the channel depth and/or channel width may be between about 1.4 mm and about 3.6 mm, and for pellet diameters between about 800 µm and about 1100 µm the channel depth and/or channel width may be between about 1.6 mm and about 4.4 mm.

The pitch has been found to have a large impact on the precision of the device, as discussed above. A high pitch seems to increase the risk for pellets running through the screw when the device is in an idle state, although a trade-off is present since decreasing the pitch increases the torque required to rotate the rotating member. In various embodiments the pitch may be limited to less than about 15-30 times a diameter of the pellets, and in some cases less than 10 times a diameter of the pellets. For example, for pellet diameters of between about 200-300 µm the pitch may be about 6 mm, and sometimes less than about 3, 4 or 5 mm.

The "flight width" is the thickness of the threads and is a result of choosing pitch and channel width. More specifically, the flight width is equal to the pitch minus the channel width. The flight width has been found to be an important factor in preventing the screw from jamming. With a smaller flight width, the contact area between the outside surface of the screw and the surfaces of the screw thread is decreased, which reduces the risk for small pellets, and/or dust from crushed pellets, getting stuck and causing the screw to stick.

Therefore in various embodiments the flight width may be limited to less than about 3, 5, or 10 times a diameter of the pellets. In particular for pellet diameters of between about 200-300 µm, the flight width may be less than about 1, 2 or 3 mm. For pellets up to about 900 µm, or between about 700 µm and about 900 µm or between about 800 µm and about 1100 µm, the flight width may be limited to less than about 1, 2 or 3 mm, for example about 1 mm.

A low flight width (i.e., less than about 1 mm) has been found to be beneficial for pellets up to about 900 µm due to it providing a more consistent dose. For smaller pellets (i.e., about 200-300 µm) it has been found that dust may be created as they travel through the screw section 240, which dust can become stuck between the outside of the screw section 240 and the exit tube 212. Limiting the flight width to less than about 1, 2 or 3 mm, and especially about 1 mm has been found to minimize this effect for these smaller pellets, in addition to the effect of a more consistent dose for larger pellets as described above.

In various embodiments, the rotating member 250 (e.g., at the screw section 240) will have an outer diameter of 6 mm, and two screw starts, each of height or channel width of about 2 mm, a channel depth of about 1 mm and a pitch of about 6 mm. The pellet diameter in these embodiments may be between 200-900 µm, for example about 200-300 µm.

Each of these parameters has an effect on mass output rate and required driving torque. The pitch is a set value and does not change as the diameter of the screw increases; however, the effective angle of the threads relative to the pellets does change. If the pitch stays at the same value and the diameter is increased, the pellet screw thread hits with the pellets at a decreased angle. This may have an effect on the dispensing rate and required torque.

The screw parameters may be adjusted or configured based on the size of the pellets to be dispensed. The screw thread 242 may be at least 1-3 times a largest pellet diameter.

The depth of the screw thread 242 may be between about 1 mm and about 3 mm. Alternatively, the depth of the screw thread 242 may be tailored to the diameter of the pellets, such that the depth of the screw thread 242 is at least the diameter of a pellet. Similarly, the height of the screw thread 242 can range from about 1 mm to about 10 mm, for example about 1 mm to about 4 mm. The screw thread 242 may comprise at least 2 screw starts.

The screw section 240 of the rotating member 250 may comprise a diameter that allows at least 1, 2, 3 or more screw starts to be incorporated into the screw thread 242. The pitch of each screw thread 242 may be increased accordingly.

The rotating member 250 may comprise a high stiffness and/or rigid material, for example polycarbonate or polyamide. The diameter of the rotating member 250 can vary from about 3 mm to about 10 mm, for example about 3 mm to about 6 mm. The diameter of the rotating member 250 may be equal to the diameter of the outer surface 241 of the screw section 240, e.g., along its entire length (along the longitudinal axis A).

The screw thread 252 that cooperates with the plunger 230 may run along at least about 80%, about 90% or more of the length of the rotating member 250 within the cartridge 200. The pitch of the screw thread 252 may be chosen so that the plunger 230 consistently applies pressure to the pellets stored within it.

The actuator 300, if provided with an electromechanical motor, may be configured to rotate the rotating member 250 at a rate of between about 0 rpm and about 1000 rpm, optionally between about 50 rpm and about 500 rpm, optionally between about 90 rpm and about 150 rpm.

The device 100 may comprise a cap (an example is shown in FIGS. 20-22B, described below) that fits over an end of the cartridge 200 at the second end 104 of the device 100. The cap may comprise an interference fit with an outer surface of the cartridge 200. Means may be provided for preventing the pellets from falling out of the exit tube 212 (or cartridge 200) unintentionally. The cap may comprise a marker that is configured to line up with a cooperating groove located on the cartridge 200, such that the marker lines up with a first end of the groove prior to twisting of the cap, moves along the groove during the twisting, and then reaches the end of the groove once a required or predetermined dose has been dispensed.

In various embodiments, the actuator 300 may be configured to rotate the rotating member 250 in a reverse direction after completing a dose. This can be useful in drawing pellets back into the chamber 220, which can reduce pellet loss (which may be due, in part, to pellet run-through). Such a change in rotation direction could also be useful to move a plug (see, e.g., plug of FIGS. 18-19B described below) into and out of contact with the exit tube 212 to seal the cartridge 200. This can be used to provide a hermetic seal as described elsewhere herein, and also avoid pellet loss. In various embodiments, the change in rotation can also be used to break the drive mechanism at the end of the life of the cartridge 200, to prevent refilling and re-use of the cartridge 200, e.g., by a user or third party. Various embodiments may include a latch that permanently locks the rotation of the rotating member 250 if its rotation is reversed from the direction required to drive the pellets.

Some more specific embodiments of the invention will now be described, although the features may be combined with any of the embodiments described above, to the extent that they are compatible therewith.

Figure 14:
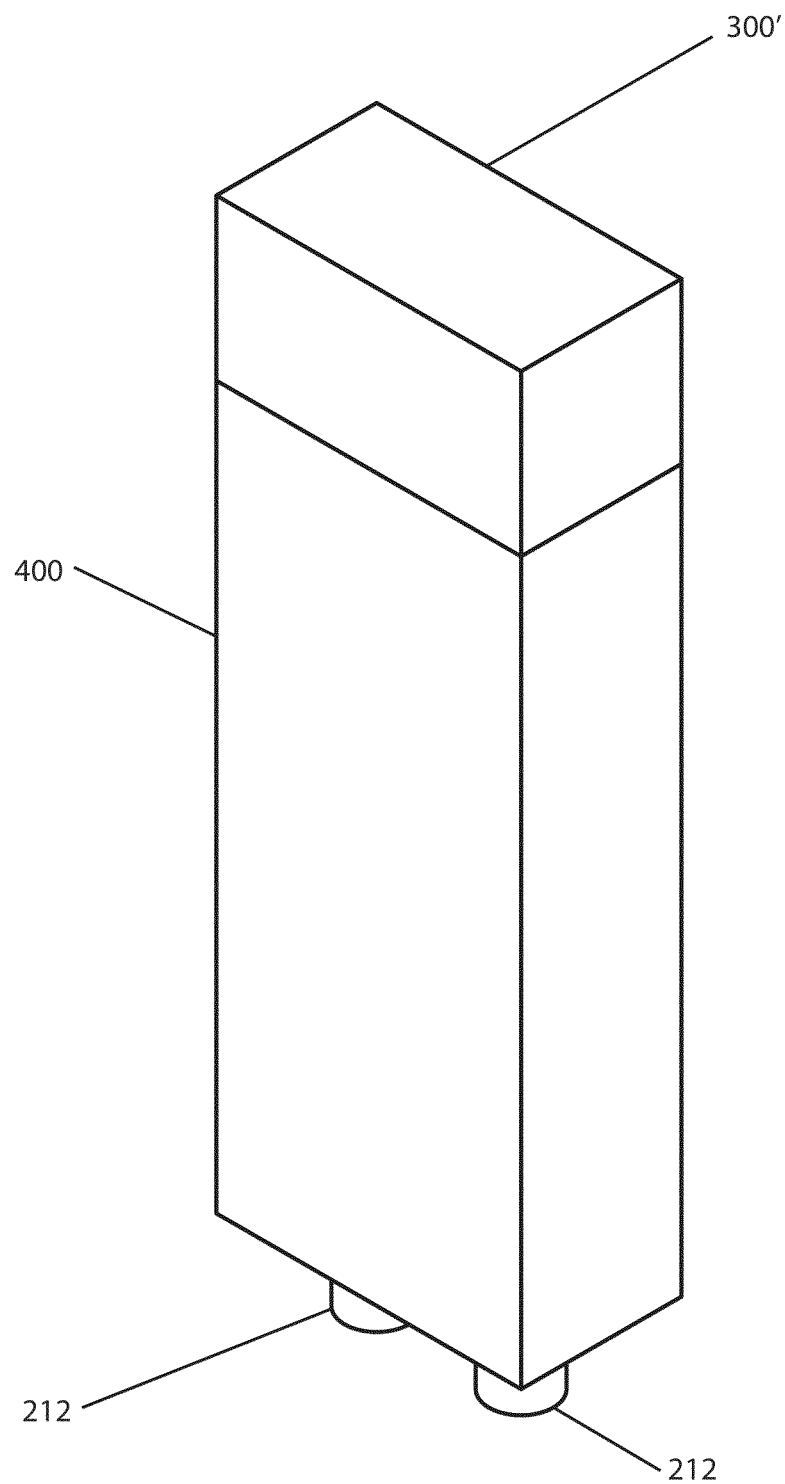
FIGS. 14 and 15 show an embodiment including two cartridges within a housing.
Figure 15:
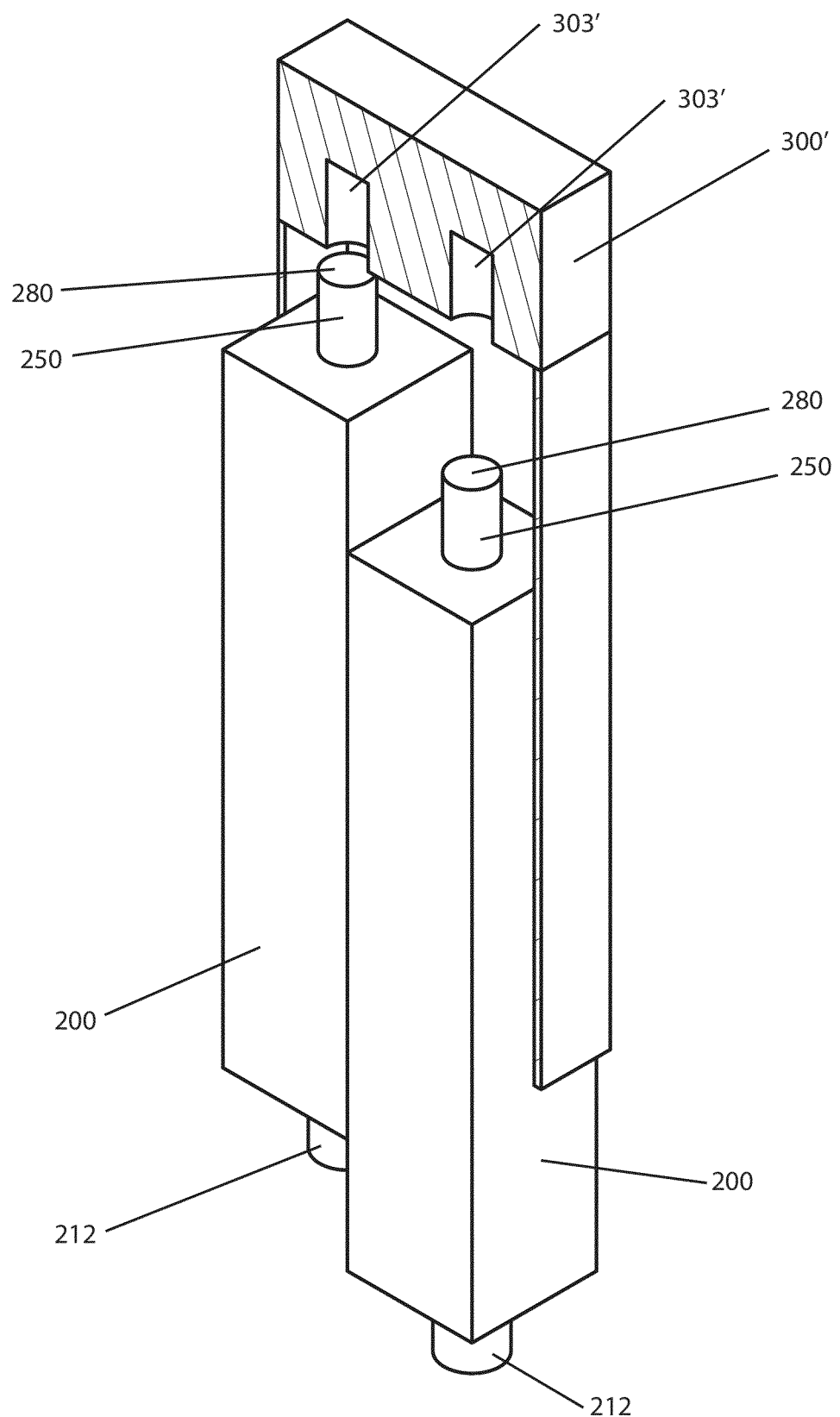

FIGS. 14 and 15 shows an embodiment including two cartridges 200 that are positioned side-by-side within a housing 400. The two cartridges 200 abut and may be operated by a common actuator 300'. The actuator 300' may comprise dual connecting portions 303' with each connecting portion 303' being configured to drive a respective connecting portion 280 of each respective rotating member 250 of each cartridge 200, and in a similar manner to that described above in respect of the single-cartridge actuator 300.

Figure 16:
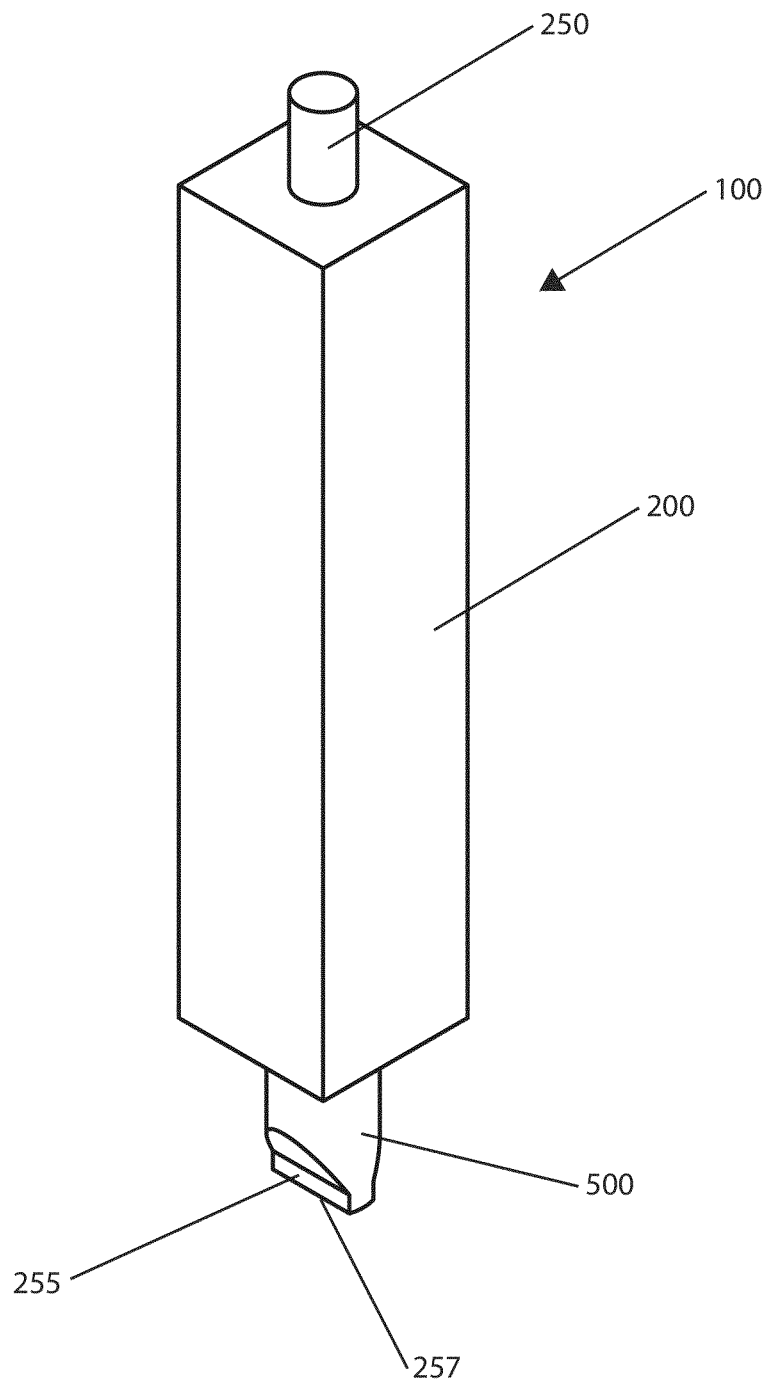

FIGS. 16, 17A and 17B show an embodiment incorporating a first valve located over the exit tube 212 of the cartridge 200. This embodiment is also applicable to that of FIGS. 4 to 6, in which the valve would be positioned over the outer cylindrical surface of the cartridge 200.

The first valve 500 comprises a first surface 252 configured to contact an outer surface 216 of the exit tube 212 in an interference or friction fit type manner. The first valve 500 further comprises a funnel portion comprising a second surface 251 that is frustoconical, so as to taper from the first surface 252 to an outlet portion 255. The funnel portion is configured to receive pellets from the screw section 240, and specifically from the screw thread 242 thereof. The outlet portion 255 comprises an outlet 257 that is configured to receive pellets from the frustoconical portion and dispensed these to a user. The outlet portion 255 and/or the outlet 257 may be elongated, as shown in FIG. 16, and the width of the outlet 257 (i.e., its smaller width, as shown in FIG. 17B) may be adapted to the size of the pellets to be dispensed. For example, this width may be less than 1.5 times the width or diameter of a pellet.

Figure 18:
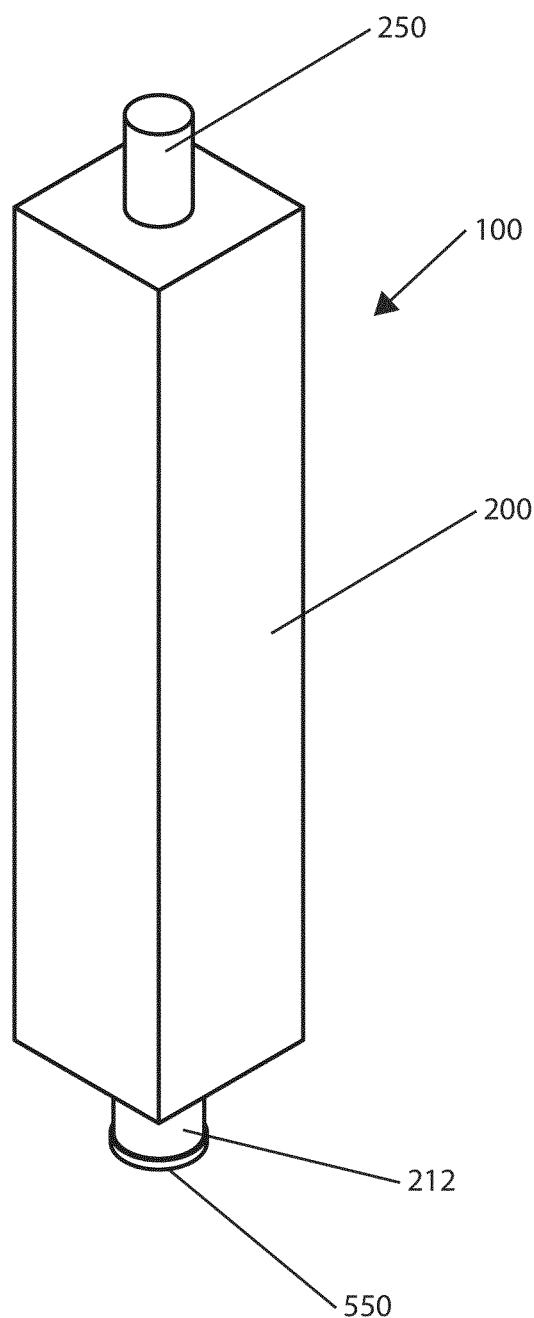
FIGS. 18 and 19A-19G show the embodiment of FIGS. 9-10 including various embodiments of a valve.
Figures 19A, 19B:
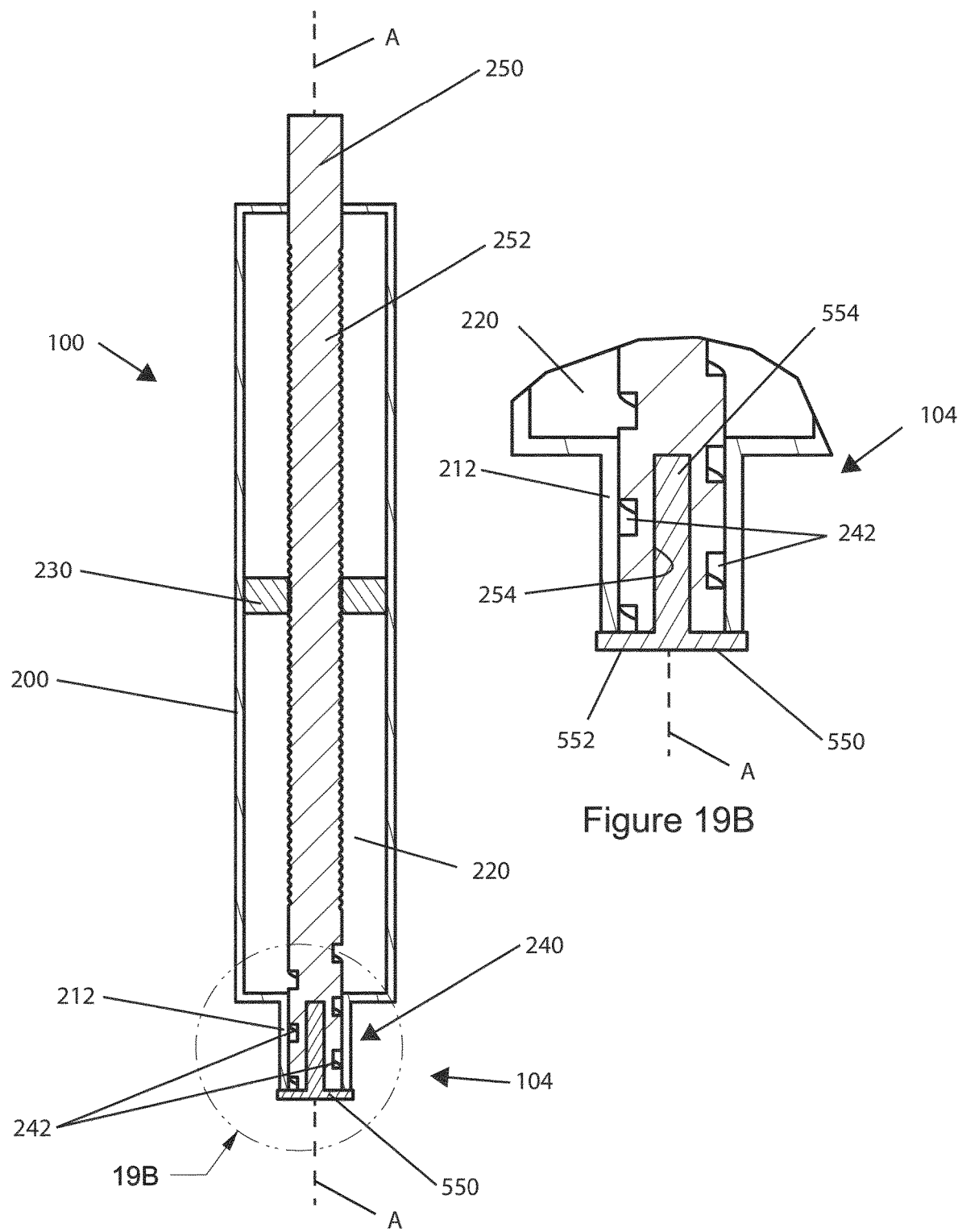

FIGS. 18, 19A and 19B show an embodiment incorporating a second valve 550 located over the exit tube 212 of the cartridge 200 in the form of a plug 550. The plug 550 may be configured to contact an end of the exit tube 212 facing away from the chamber 220. In various embodiments, the plug 550 is configured to insert into a cavity 254 formed at the second, dispensing end 104 of the rotating member 250 (i.e., comprising the screw portion 240). The plug 550 comprises a base portion 552 and an elongate portion 554 that extends from a center of the base portion 552 into the cavity 254 of the rotating member 250. The base portion 552 may be configured to provide a seal against the exit tube 212 to hermetically seal the pellets within the cartridge 200, for example prior to use or (in some embodiments) during use.

The plug 550 may be in the form of an "umbrella valve". That is, at least the base portion 552 of the plug 550 may be resilient, e.g., a rubber membrane, wherein the outer rim of the base portion 552 is configured to flex open as the pellets are pushed out of the screw pump in use, and then spring back when the screw pump is not turning, so as to stop pellets falling out and to help seal the cartridge 200. The elongate portion 554 of the plug 550 may not substantially move from its position within the cavity 254 of the rotating member 250.

Figure 19C:
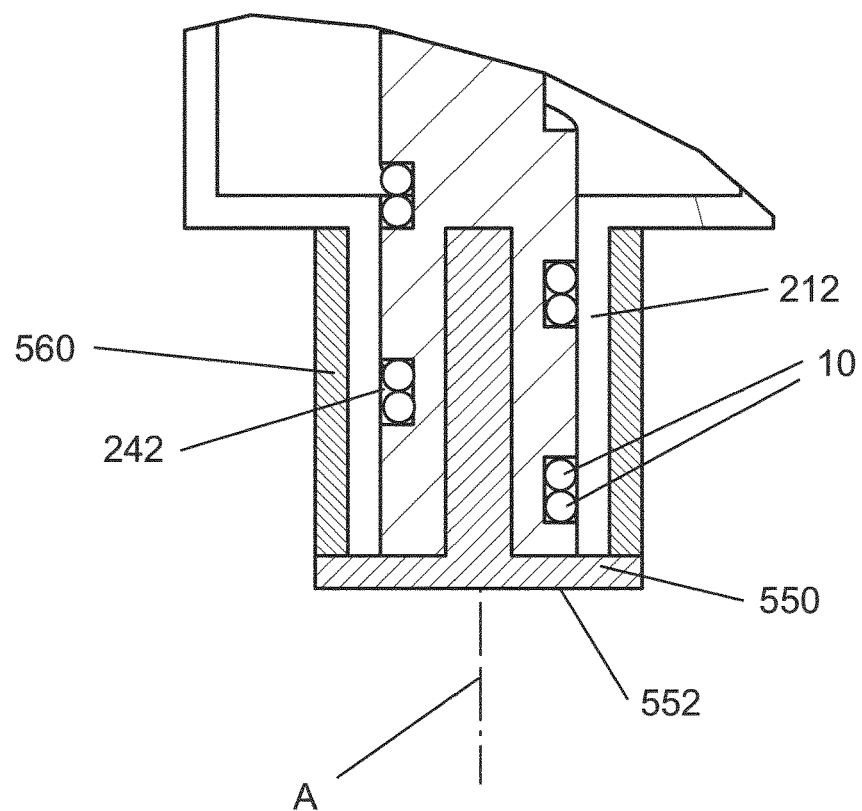
Figure 19D:
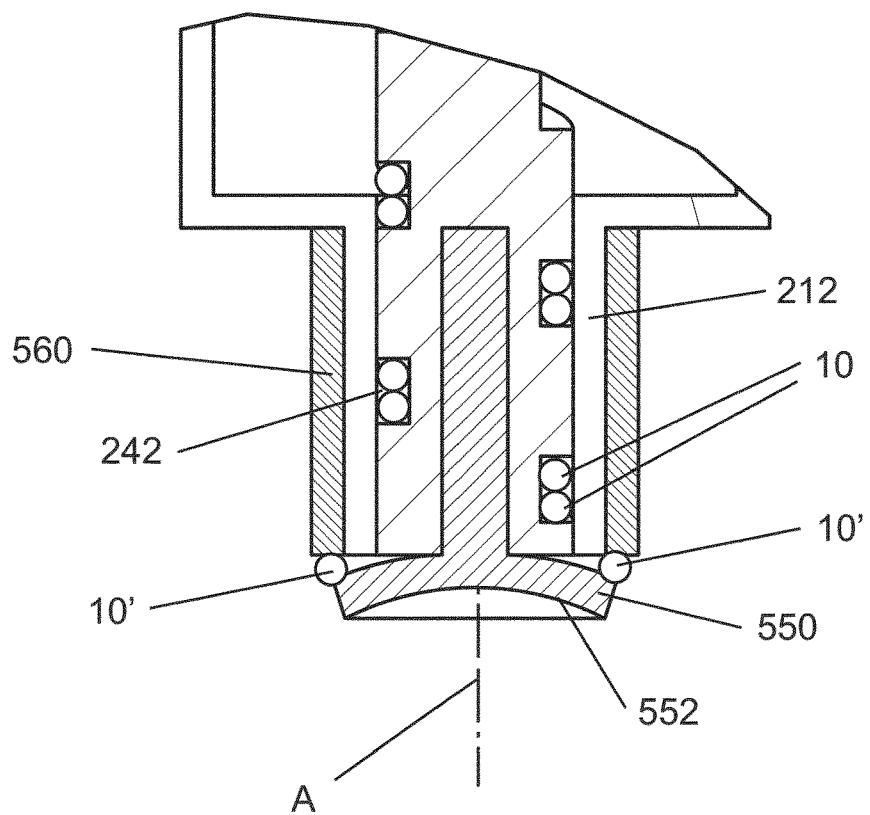
Figure 19E:
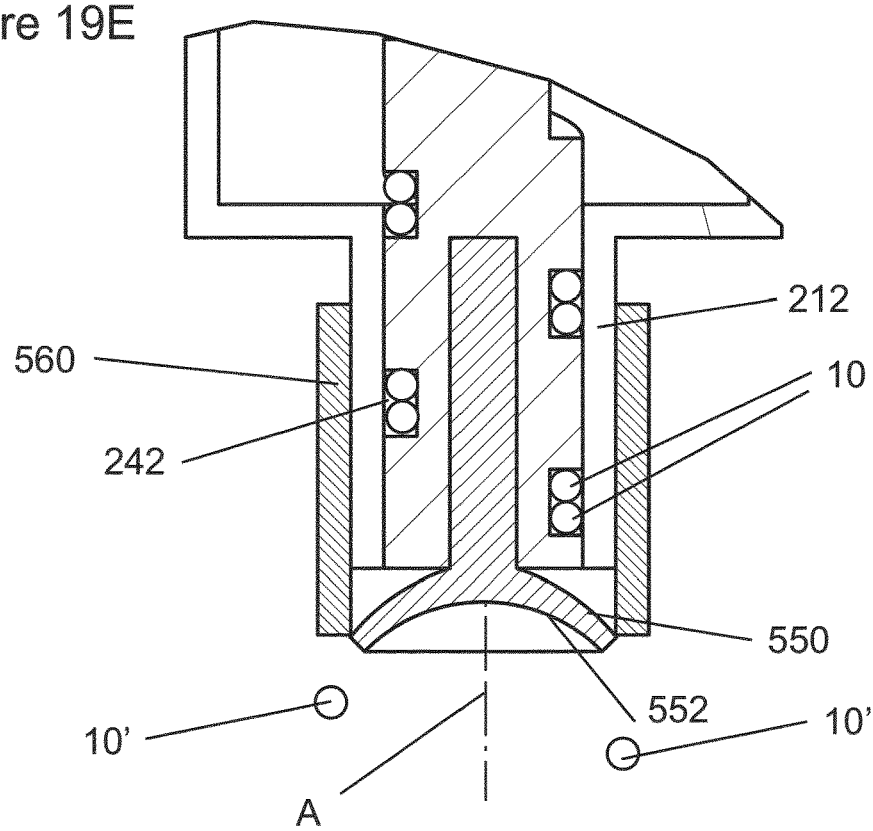

FIGS. 19C-E show a modification of the umbrella valve concept that may be applied to the embodiment shown in FIGS. 19A and 19B. In this embodiment, the device 100 comprises a sliding member 560 that is located concentrically around the exit tube 212 and configured to slide axially relative thereto (i.e., along axis A). The base portion 552 of the plug 550 extends in a radial direction (relative to axis A) passed the radial extent of the exit tube 212 and at least partially into the line of travel of the sliding member 560. This is shown in FIG. 19C.

Upon rotation of the rotating member 250 (i.e., comprising the screw portion 240 and screw thread 242) pellets 10 will be forced downwards through the screw thread 242 and at least some pellets 10' will become trapped between the base portion 552 of the resilient plug 550 and the end of the exit tube 212 or an end of the sliding member 560, as indicated schematically in FIG. 19D.

In order to dispense pellets from the device 100, a user may slide the sliding member 560 along the axis A, which causes the base portion 552 of the resilient plug 550 to flex such that the pellets 10' that were trapped between the base portion 552 of the plug 550 are released and dispensed from the device 100. This is indicated schematically in FIG. 19E.

Once pellets are dispensed from the device 100 a user may slide the sliding member 560 back into place, at which point the valve has returned to its original position (as shown in FIG. 19C), which prevents pellets from inadvertently being dispensed out of the exit tube 212. In various embodiments, the sliding member 560 may be biased towards this original position by the resilience of the base portion 552 of the plug 550. For example, a suitable resilient member may bias the sliding member 560 to this position, or an electromechanical device such as a solenoid, relay or other actuator.

It will be appreciated that during rotation of the rotating member 250 pellets will continuously be dispensed out of the exit tube 212, past the base portion 552 of the resilient plug 550. The purpose of the sliding member 560 is to remove any pellets that, after this dispensing operation, are left between the resilient plug 550 and either the base portion 552 of the plug 550 or an end of the sliding member 560 as described above. In this manner, the sliding member 560 is configured to end the dispensing operation and prevent stray pellets from falling out of the device 100 outside of any dispensing operation.

Figure 19F:
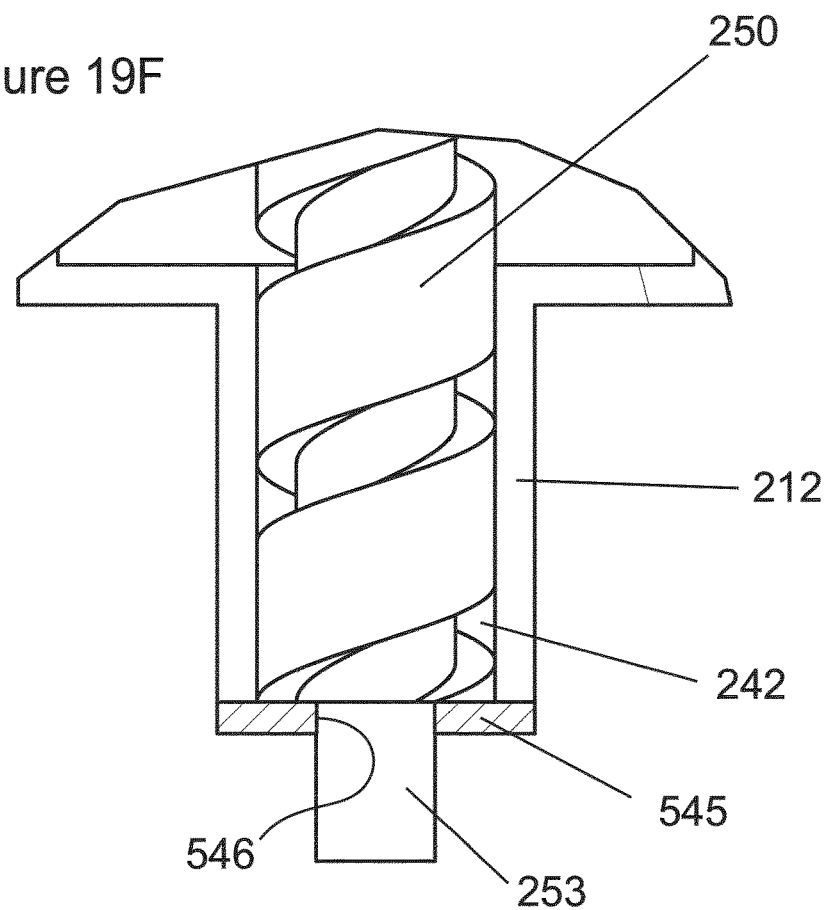
Figure 19G:
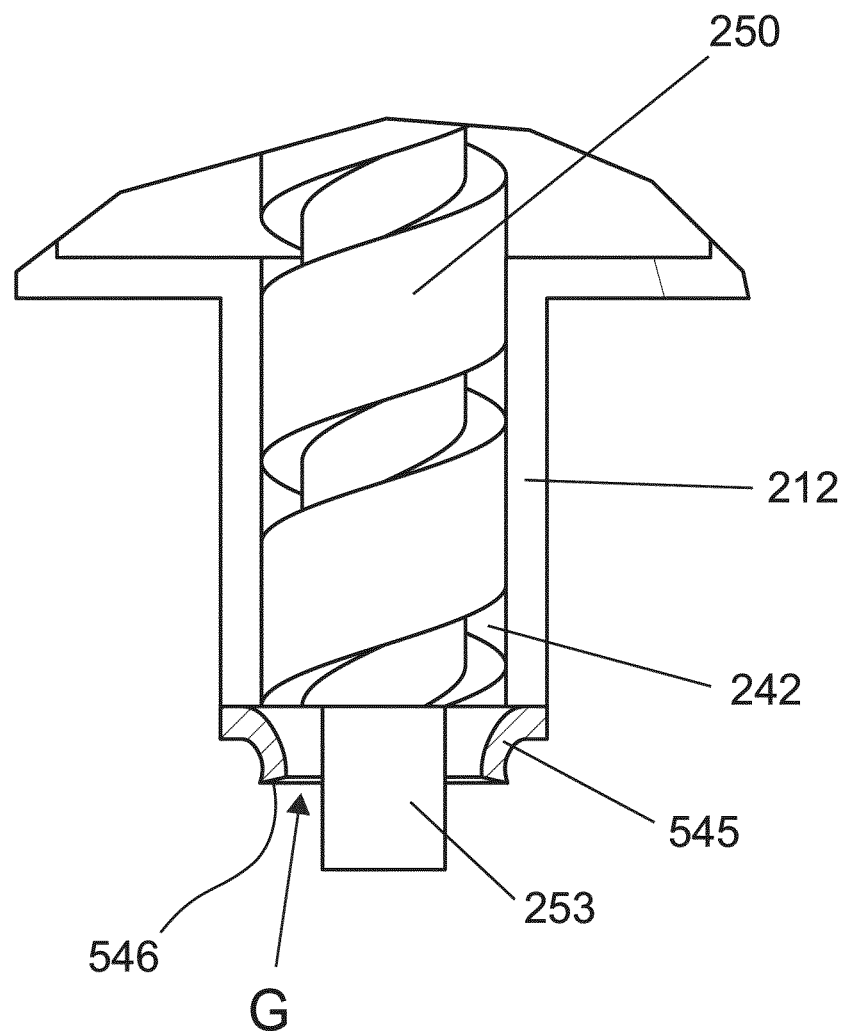
Figure 20:
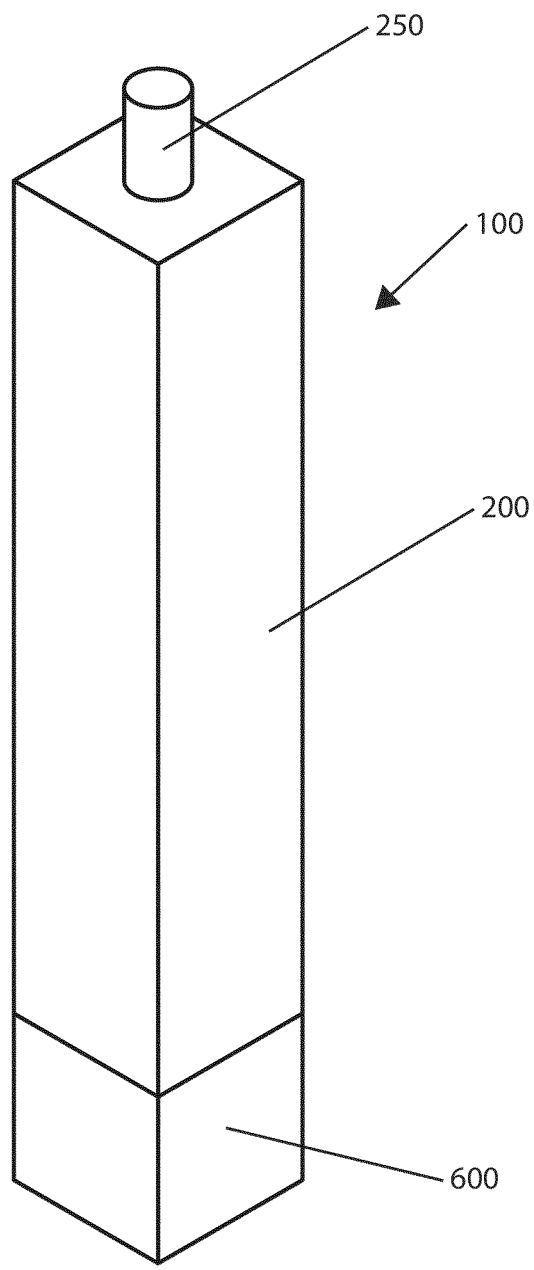
Figure 21:
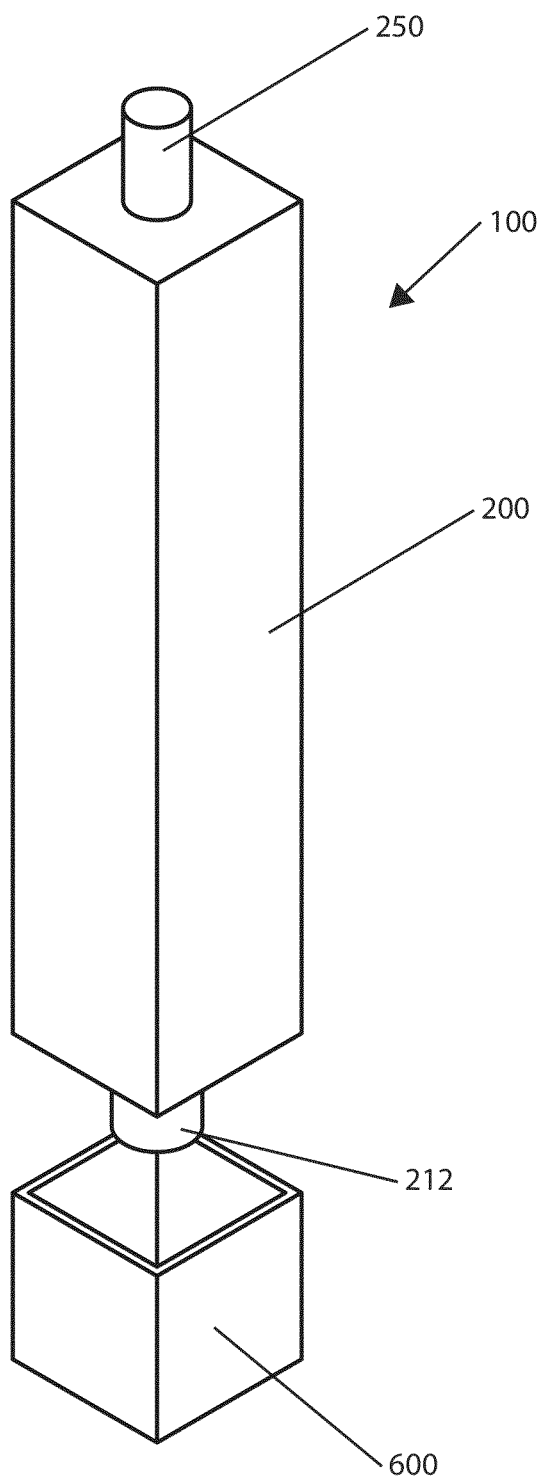
Figures 22A, 22B:
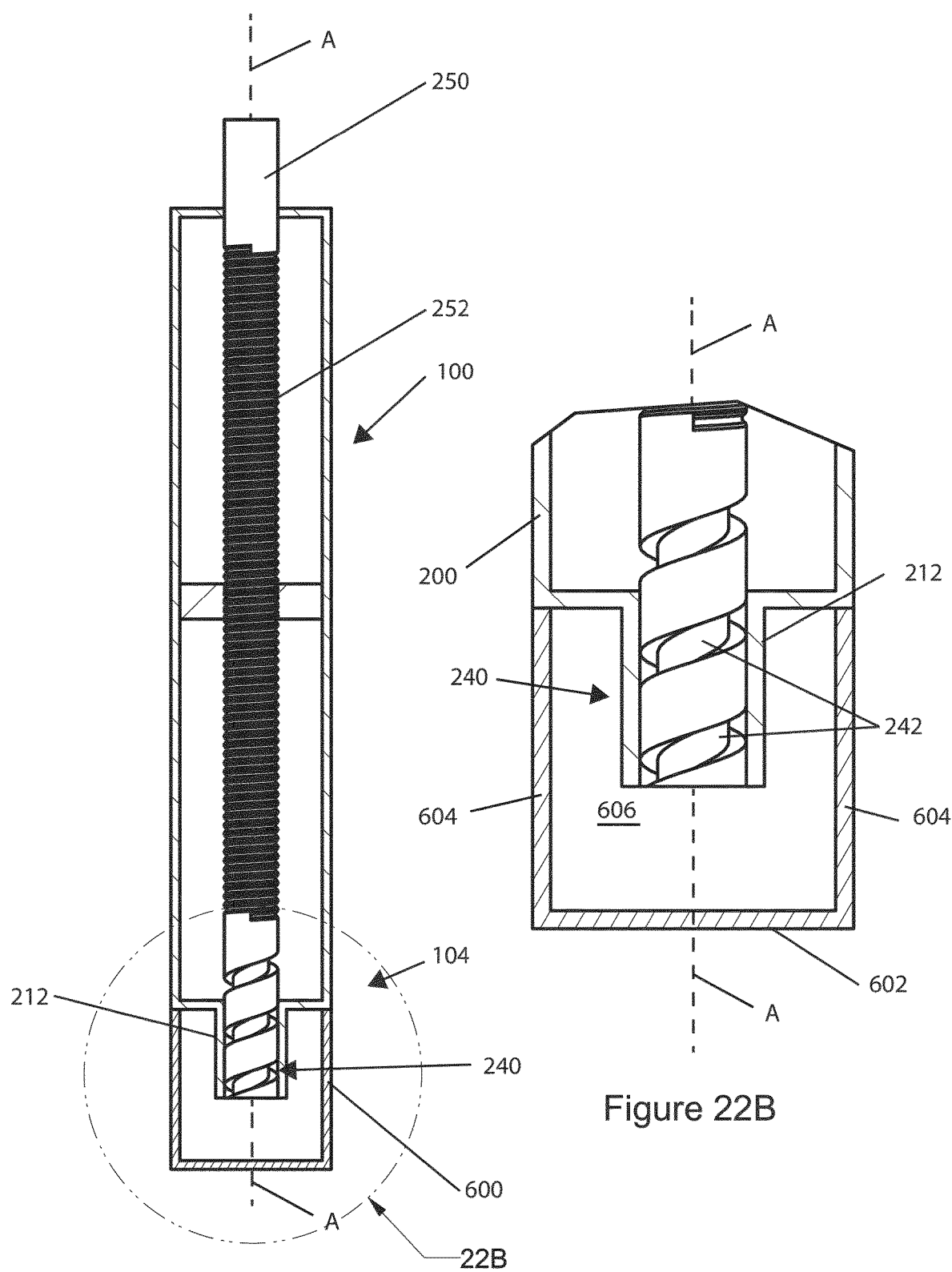

FIGS. 19F and 19G illustrate a further embodiment in which a valve in the form of a deformable material or membrane 545 is placed over the dispensing end of the exit tube 212. The deformable material 545 may be substantially resilient, and may comprise an aperture 546 through which a pin 253 extends, which pin 253 extends from an end of the rotating member 250. In the non-operational or resting position, as shown in FIG. 19F, the outer surface of the pin 253 contacts the inner surface of the aperture 546 to close the end of the exit tube 212 and prevent pellets from being dispensed.

In various embodiments the pin 253 may be about 1.5 mm in length (i.e., along the longitudinal axis of the rotating member 250) and have a diameter of about 2.5 mm, and the deformable material 545 may have a thickness of about 1 mm, with the aperture having a width or diameter of about 2 or 2.5 mm. The length of the deformable material 545 (in the direction of the longitudinal axis of the rotating member 250) is less than the length of the pin 253, and may be less than about 80% of the length of the pin 253. The deformable material 545 may comprise a thermoplastic elastomer ("TPE") or polybutylene terephthalate ("PBT") and/or may have a hardness of less than about 50 shore, and optionally between about 30 shore and about 50 shore. The pin 253 may be substantially rigid. The deformable material 545 may be attached to the exit tube 212 in any suitable manner, for example by adhesive.

Upon rotation of the rotating member 250 pellets will be urged towards the end of the exit tube 212 for dispensing from the device 100, and upon meeting the deformable material 545 in its resting position (as shown in FIG. 19F) the pellets will be forced against the deformable material 545 and cause it to deform, as shown in FIG. 19G, creating a gap G between the deformable material 545 and the pin 253, through which pellets can be dispensed. At the end of the dispensing operation, once the rotating member 250 has stopped rotating, pellets will no longer be urged against the deformable material 545 and the deformable material 545 will spring back into its resting position as shown in FIG. 19F in which the end of the exit tube 212 is closed.

Figure 31:
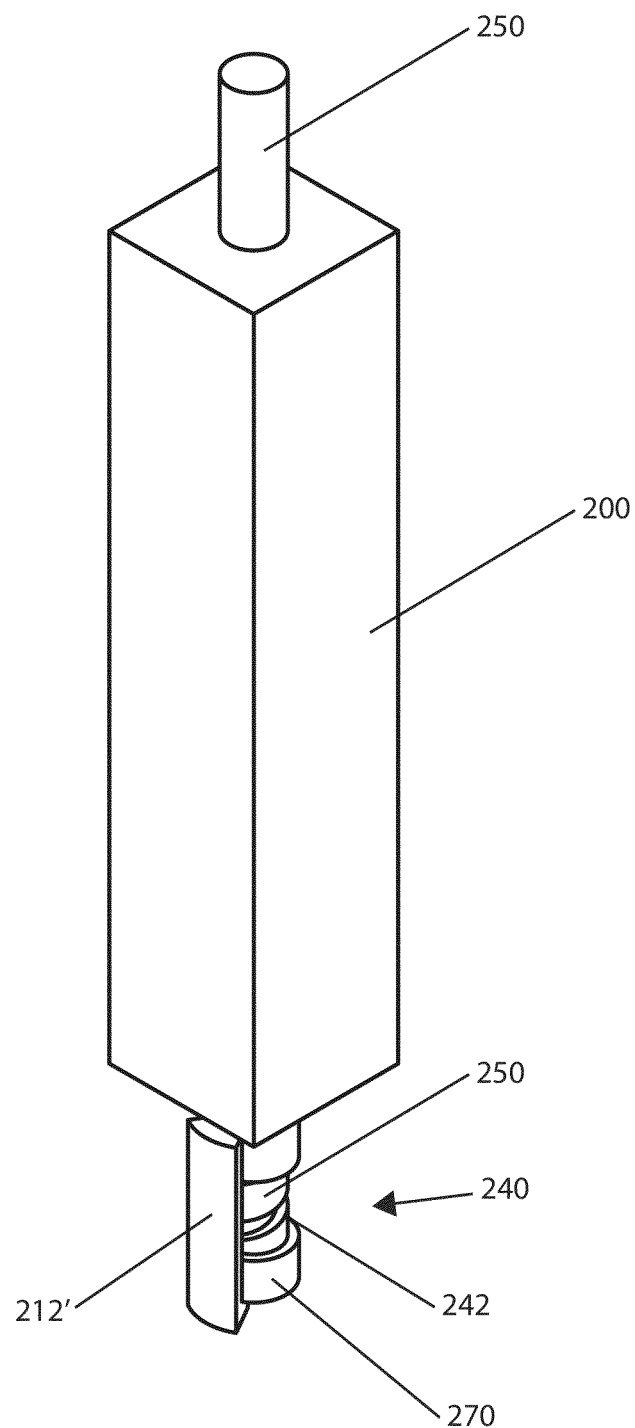
FIGS. 31 and 32A-32B show the embodiment of FIGS. 9-10 with a modified exit tube.
Figure 32A:
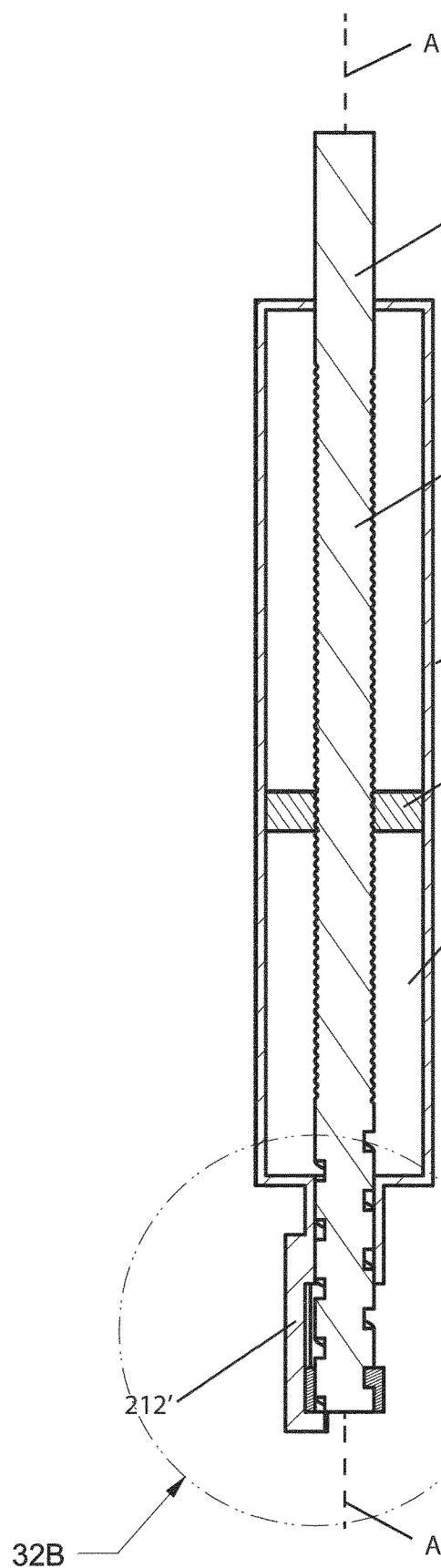
Figure 32B:
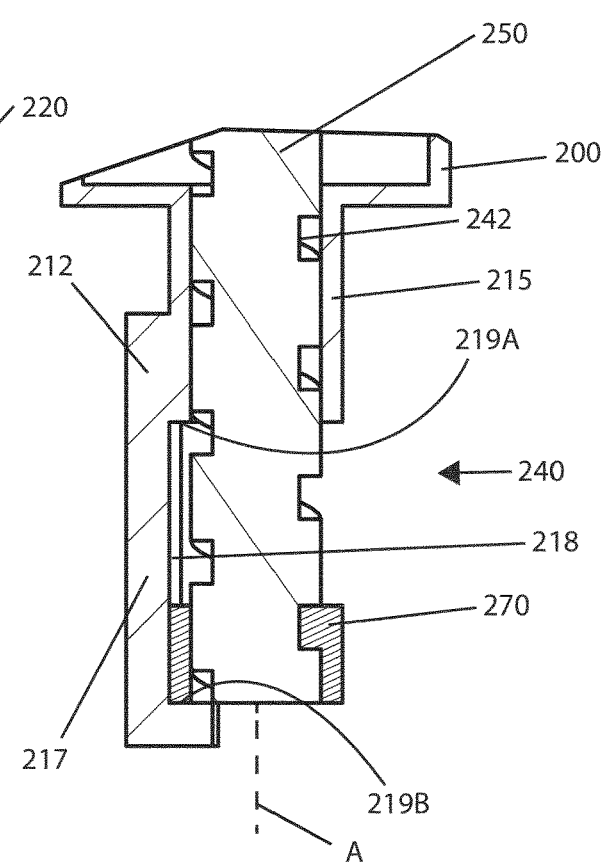

FIGS. 31, 32A and 32B show an embodiment incorporating a modified exit tube 212', the features of which may be incorporated into any of the other embodiments described herein involving an exit tube. In this embodiment, the exit tube 212' is modified so as to cooperate with a movable component that is configured to move between a first position, in which the movable component prevents pellets being dispensed or moving out of the screw pump, and a second position in which pellets are permitted to be dispensed from the screw pump.

More specifically, the movable component in the illustrated embodiment is in the form of a nut 270 that is configured to travel along the screw thread 242 of the screw section 240. The exit tube 212 comprises a substantially cylindrical portion 215 and a flange 217 extending from the cylindrical portion 215 in the direction of the longitudinal axis A of the rotating member 250. The flange 217 comprises a track 218 along which the nut 270 travels in use. The flange 217 further comprises opposed shoulder portions 219A, 219B located at either end of the track 218 and configured to provide a stop for the nut 270.

The nut 270 is configured to move along the longitudinal axis A of the rotating member 250 (which is also the axis of the screw thread 242) upon rotation of the rotating member (and screw section 240). The nut 270, by virtue of its association with the screw thread 242 is configured to block the screw thread and prevent pellets from moving down the screw thread 242 past its location thereon. Furthermore, when the nut 270 meets a first 219A of the shoulder portions, the nut 270 forms a seal against the cylindrical portion 215 of the exit tube 212, which means that no portion of the screw thread 242 is exposed. As such, pellets are unable to leave the screw thread 242 and be dispensed from the device.

Upon rotation of the rotating member 250 in a first rotational direction, the nut 270 is configured to move along the track 218 away from the first shoulder portion 219A, exposing the screw thread 242 so that pellets can move down the screw thread 242 and be dispensed from the cartridge 200. After a certain amount of rotation of the rotating member 250, the nut 270 will contact the second shoulder portion 219B, which prevents the nut 270 from moving any further (and also, conveniently, prevents further rotation of the rotating member 250). At this position (which is shown in FIG. 32B) the screw pump formed by the screw thread 242 and exit tube 212' will have dispensed a certain volume (e.g., a predetermined or predefined amount) of pellets.

Upon rotation of the rotating member 250 in a second rotational direction (which is opposite to the first rotational direction), the nut 270 is configured to move along the track 218 away from the second shoulder portion 219B and ultimately contact the first shoulder portion 219A so as to seal against the cylindrical portion 215 of the exit tube 212 and prevent pellets from being dispensed from the device.

The nut 270 may move linearly (and axially) along the longitudinal axis A of the screw thread 242. The nut 270 may be constrained rotationally (i.e., so that it does not rotate with the rotating member 250) through a friction fit between the nut 270 and the flange 217 that extends downwards from the cylindrical portion 215 of the exit tube 212'.

Upon delivery of the required dose (which may not correspond to the nut 270 travelling all the way along the track 218), the rotating member 250 may be rotated in the opposite direction as discussed above, which draws pellets left in the screw thread 242 back into the chamber 220 and simultaneously draws the nut 270 vertically until it is back in its resting position, in contact with the first shoulder portion 219A of the exit tube 212'. As discussed above this contact seals against the cylindrical portion 215 of the exit tube 212', preventing pellets from falling out.

Figure 33A:
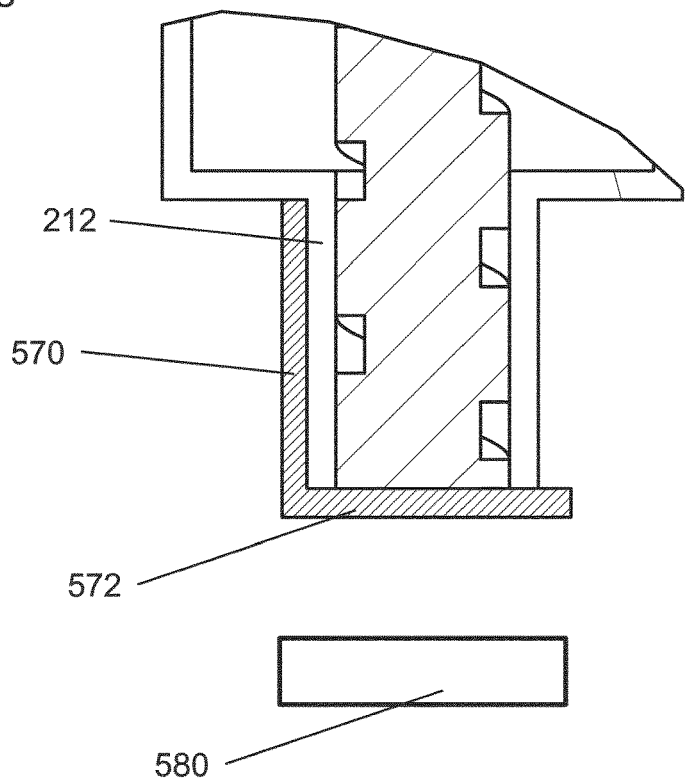
FIGS. 33A and 33B show the embodiment of FIGS. 9-10 with a movable component located over the exit tube of the cartridge.
Figure 33B:
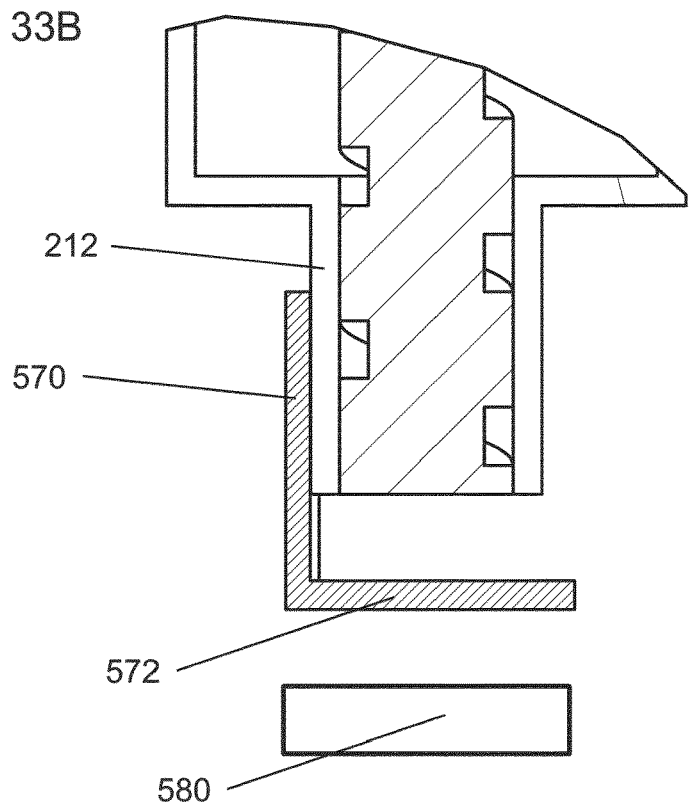

FIGS. 33A and 33B show an embodiment that includes a movable component 570 that may be located over an outlet end of the exit tube 212. The movable component 570 may be included in the embodiment shown in FIGS. 19A and 19B, and may be provided additionally to, or a replacement for the valve 550 (and optional sliding member 560) disclosed in connection with this embodiment.

In this embodiment the movable component 570 may comprise a spring-loaded plate 572 configured to enclose the outlet end of the exit tube 212. A suitable resilient member (not shown) may be configured to bias the movable component 570 to its position shown in FIG. 33A. This can assist in adding moisture protection and preventing pellets from falling out of the exit tube 212 inadvertently. In some embodiments the plate 572 may be configured to hermetically seal against the exit tube 212. The plate 572 may itself be made from a resilient material, for example the plate 572 may be made from an elastomer, or comprise an elastomer coating. This will further assist in sealing the exit tube 212 and preventing pellets from falling out thereof.

In one particular embodiment, the movable component 570 is combined with an electronic relay 580 comprising an electromagnet, which is shown schematically and is configured to move the movable component 570 from its resting position shown in FIG. 33A to its open position shown in FIG. 33B. In the resting position the electromagnet may be switched off so that the plate 572 is biased against the end of the exit tube 212 to seal it and prevent pellets from falling out. In the open position the electromagnet may be switched on so that the plate 572 is pulled towards the electronic relay 580, which allows pellets to be dispensed from the exit tube 212 during a dispensing operation. In this embodiment, the movable component 570 would need to comprise a magnetic component so that the electromagnet of the electronic relay 580 can adequately move it away from its resting position.

In various other embodiments, the movable component 570 may simply be spring-loaded against the action of a user. For example, an electronic relay 580 may not be provided, and the movable component 570 may be moved from its resting position to its open position by a user. Other types of electromechanical device may be used, such as a solenoid or other actuator.

Figure 34A:
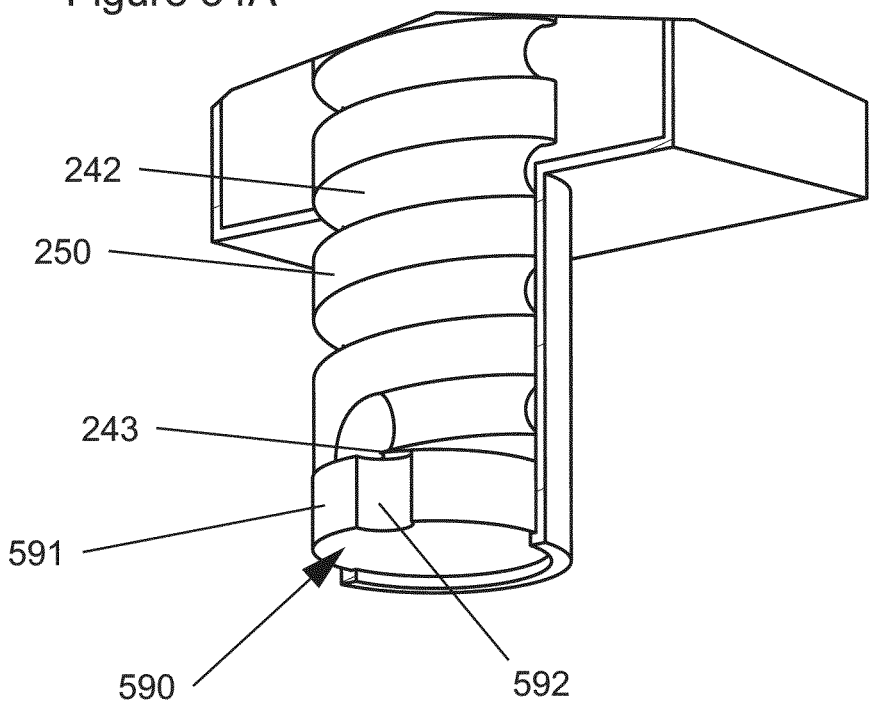
FIGS. 34A-C show the embodiment of FIGS. 9-10 with various embodiments of a disc-type valve located at the outlet of the exit tube of the cartridge.
Figure 34B:
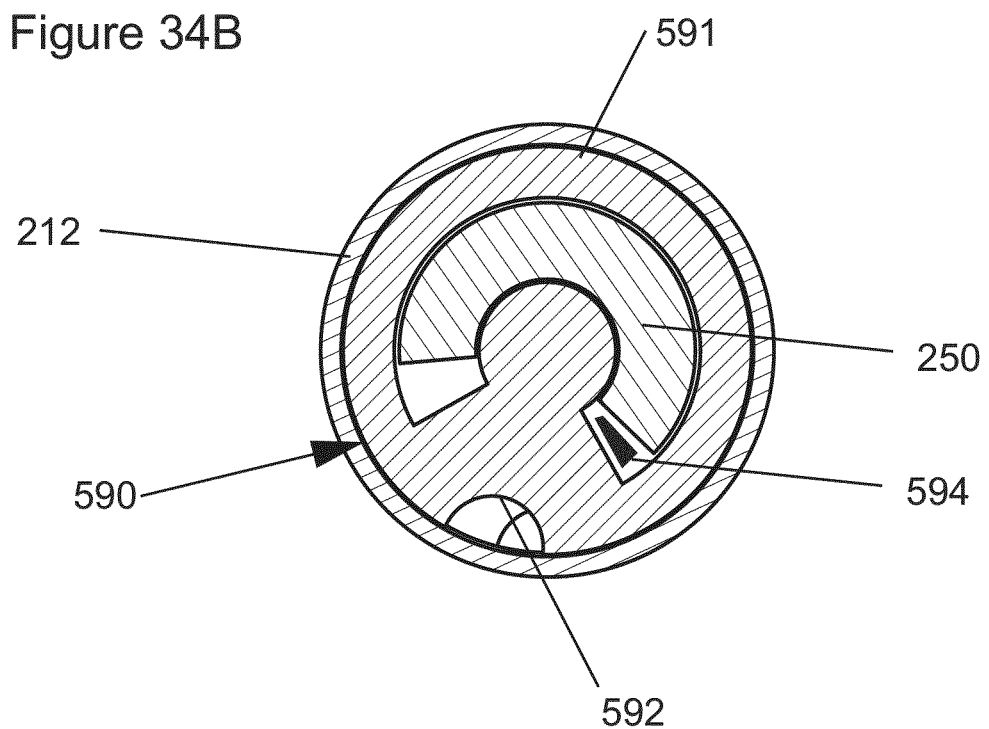

FIGS. 34A and 34B show an embodiment that is a modification of the embodiment of FIGS. 19A and 19B, namely where the valve 550 is replaced by a valve 590 that extends in a similar manner from the end of the rotating member 250. The valve 590 of this embodiment comprises a disc 591 having a notch 592 that is configured to align with an outlet 243 of the screw thread 242, wherein upon alignment of the notch 592 and the outlet 243 pellets are configured to be dispensed from the device 100. The disc 591 is rotatable between a first position in which the notch 592 is aligned with the outlet 243 (as shown in FIG. 34A) and a second position in which the notch 592 moves out of alignment with the outlet 243.

In various embodiments, as shown in FIG. 34B the valve 590 may comprise a resilient member 594 that is configured to bias the disc 591 towards its second position. The disc 591 may be configured to rotate with the rotating member 250 due to a friction fit between these two components. When the rotating member 250 starts to rotate to begin a dispensing operation, the disc 591 may rotate with it and move to its first position to align the notch 592 with the outlet 243 and permit dispensing of pellets. Once the rotating member 250 finishes rotating to end the dispensing operation, the resilient member 594 may bias and move the disc 591 back to its second, resting position.

Figure 34C:
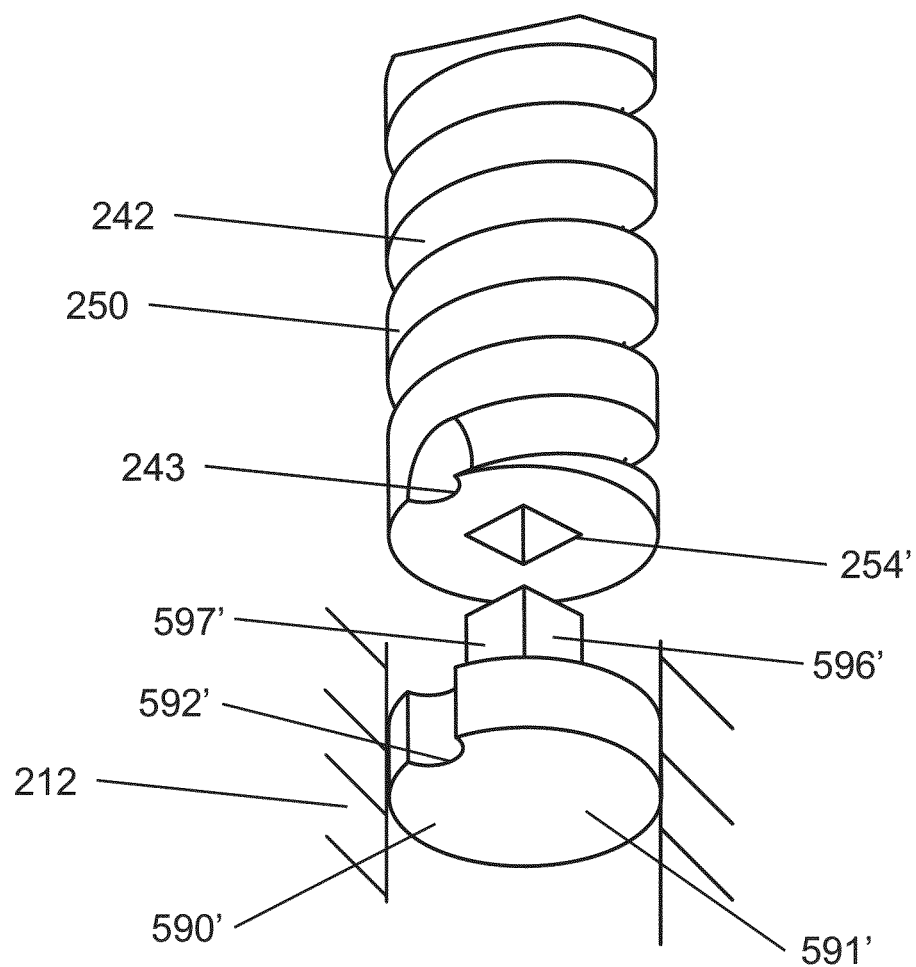

A slight modification of this type of valve is shown in FIG. 34C, which shows a valve 590' in the form of a resilient member (e.g., a rubber member). The resilient member 590' comprises a notch 592' that has the same function as that described in respect of FIGS. 34A and 34B, namely that the notch 592' is configured to align with an outlet 243 of the screw thread 242 to permit the dispensing of pellets during a dispensing operation. In this embodiment the resilient member 590' is a single piece and comprises a disc portion 591' having a projection 596' that extends from the disc portion 591' towards the rotating member 250 in use. The rotating member 250, in this embodiment, comprises an aperture 254' formed in an end thereof, wherein the projection 596' of the resilient member 590' is inserted into the aperture 254'. The projection 596' of the resilient member 590' (e.g., a crown 597' thereof) has a friction fit with an interior surface of the aperture 254'. The disc portion 591' may fit within and have a friction fit with the exit tube 212 (in this embodiment the exit tube 212 may extend past the resilient member 590').

During a dispensing operation, the rotating member 250 may be rotated and this will cause the rotating member 250 to rotate relative to the disc portion 591' of the resilient member 590' so as to align the notch 592' of the disc portion 591' with the outlet 243 of the screw thread 242. During this operation the projection 596' of the resilient member 590' will flex relative to the disc portion 591' until the notch 592' is aligned, and then the entire resilient member 590' will rotate with the rotating member 250 with the notch 592' remaining aligned to the outlet 243. When the dispensing operation finishes and the rotation ceases, the resilience of the resilient member 590' will cause the disc portion 591' to rotate relative to the rotating member 250 (and the projection 596') so that the notch 592' moves out of alignment with the outlet 243.

The first valve 500 and the second valve 550 (and the modified exit tube 212', and valves 590, 590') may be configured to help prevent pellets located within the screw thread 242 from falling out during use. The device 100 may be configured such that, in order to dispense pellets through the first valve 500 or the second valve 550, a user must rotate the rotating member 250 to force pellets along the screw thread 242 and provide a force against the first valve 500 or the second valve 550, such that pellets may be dispensed through either valve. In some situations a valve may not be necessary (but may still be included), for example the pellets themselves may be retained in the screw thread 242 by friction, or a cap or cover may be provided over the outlet of the cartridge (e.g., the exit tube).

Figure 35A:
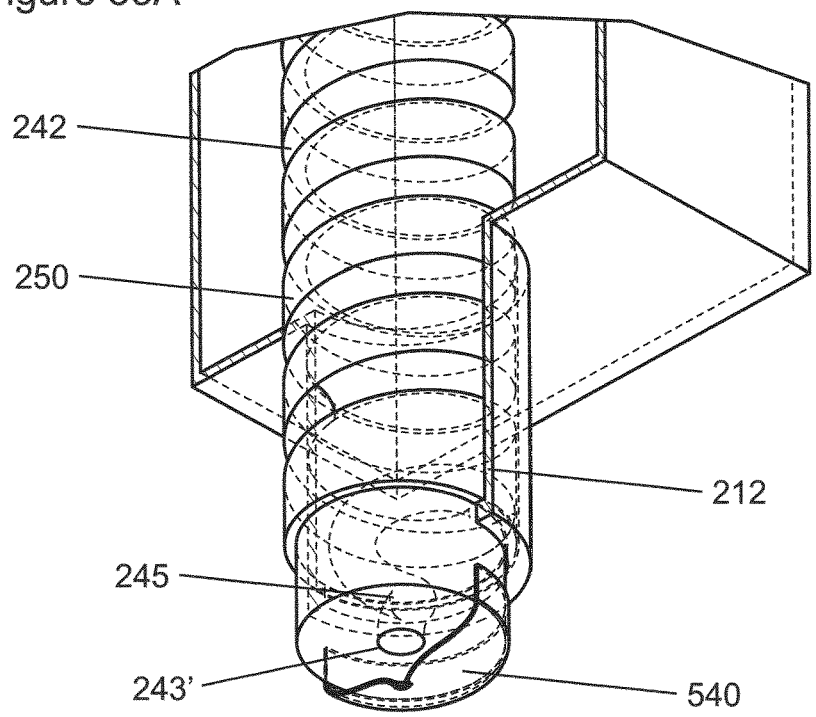
FIGS. 35A and 35B show the embodiment of FIGS. 9-10 with a slightly modified screw thread that communicates pellets to an internal passage of the rotating member that leads to an outlet at the base of the rotating member.
Figure 35B:
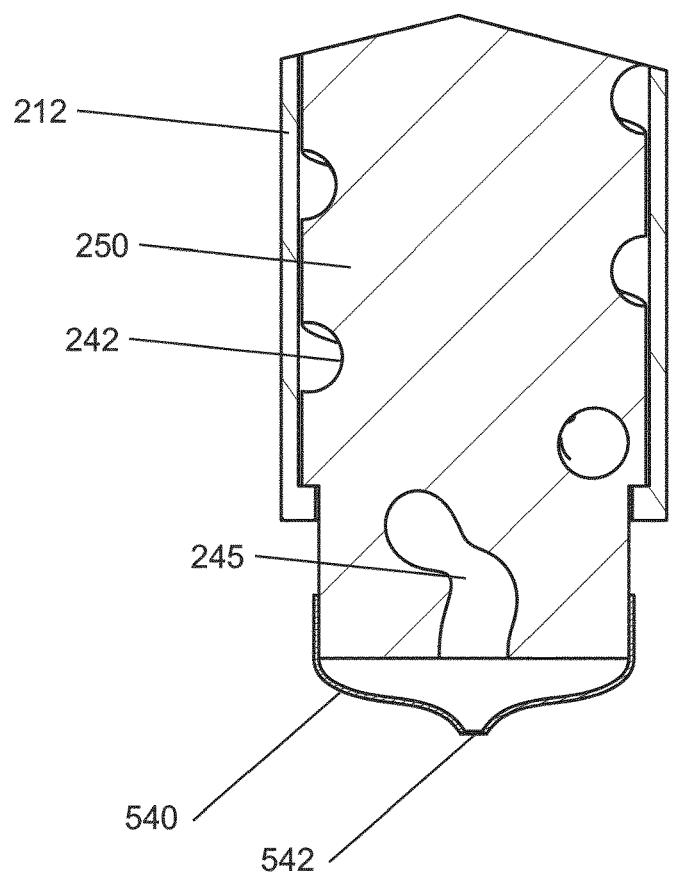

In various embodiments, as shown in FIG. 35A the rotating member 250 may be modified such that the screw thread 242 communicates with an internal passage 245 configured to receive pellets from the screw thread 242, which then travel through the passage for dispensing out of an outlet 243' located in a bottom surface of the rotating member 250. In a refinement, as shown in FIG. 35B, a resilient (e.g., rubber) cap 540 may be placed over the end of the rotating member 250 that is configured to prevent pellets from being dispensed when the device 100 is not operating. The cap 540 may comprise a resilient opening 542 that is aligned with the outlet 243', but is biased to a substantially closed position that prevents pellets from passing through. Upon rotating of the rotating member 250 pellets will be forced out of the outlet 243' and towards the opening 542, which is configured to open in an elastic manner as a result and permit dispensing of pellets.

FIGS. 20, 21, 22A and 22B show the device 100 comprising a cap 600 that is configured to connect to the cartridge 200 at the second, dispensing end 104 thereof so as to cover the exit tube 212. The cap 600 may be configured to connect to the cartridge 200 by any suitable manner, for example an interference fit, magnetic latch, clip fastener or screw connection. The cap 600 comprises a base portion 602 and one or more side portions 604 extending from either end of the base portion 602. Each of the side portions 604 connects to the cartridge 200 to optionally provide a hermetic seal between the cap 600 and the chamber 200. A chamber 606 may be formed between the cartridge 200 and the cap 600.

The cap 600 may be used to provide a collection cup for pellets (e.g., a dispensed dose may be held in chamber 606) and/or to provide a hermetic seal prior to and during use. The cap 600 may be combined with either the first valve 500 or second valve 550 described above.

Figure 23:
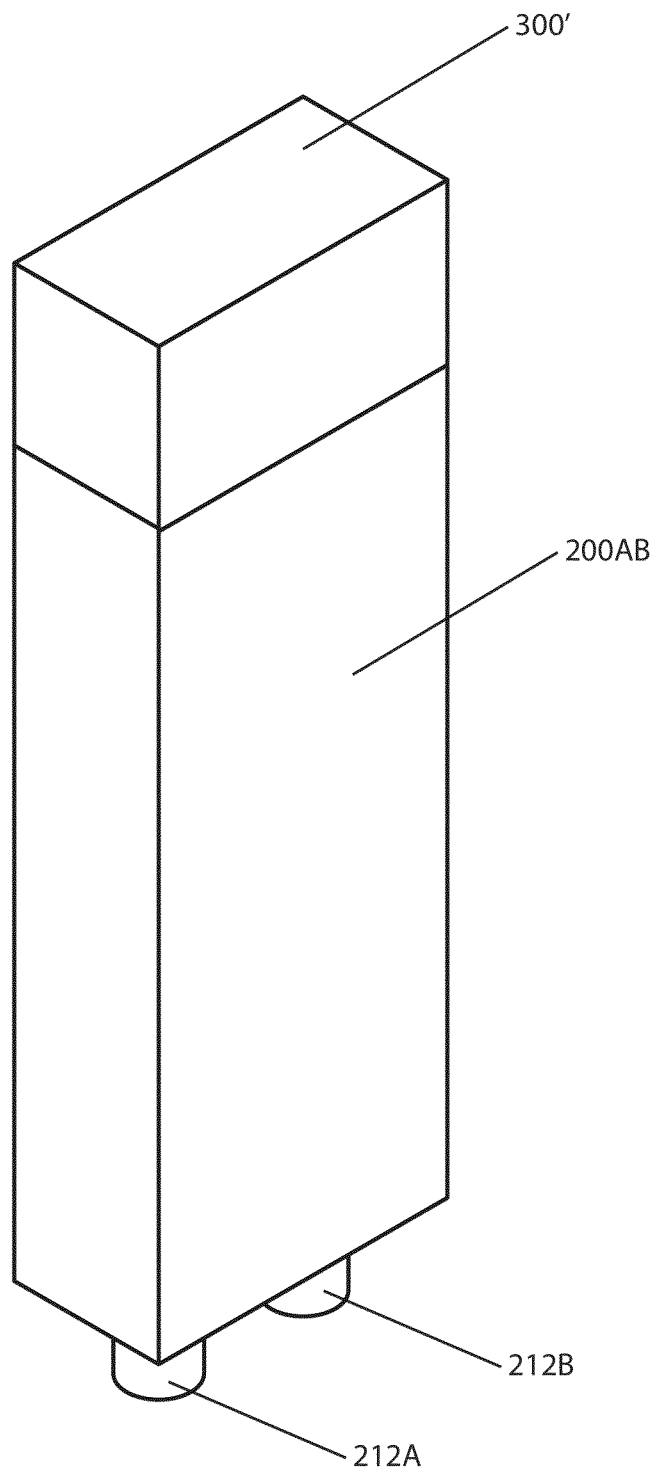
FIGS. 23-25 show an embodiment of a cartridge including two dispensing mechanisms.
Figure 24:
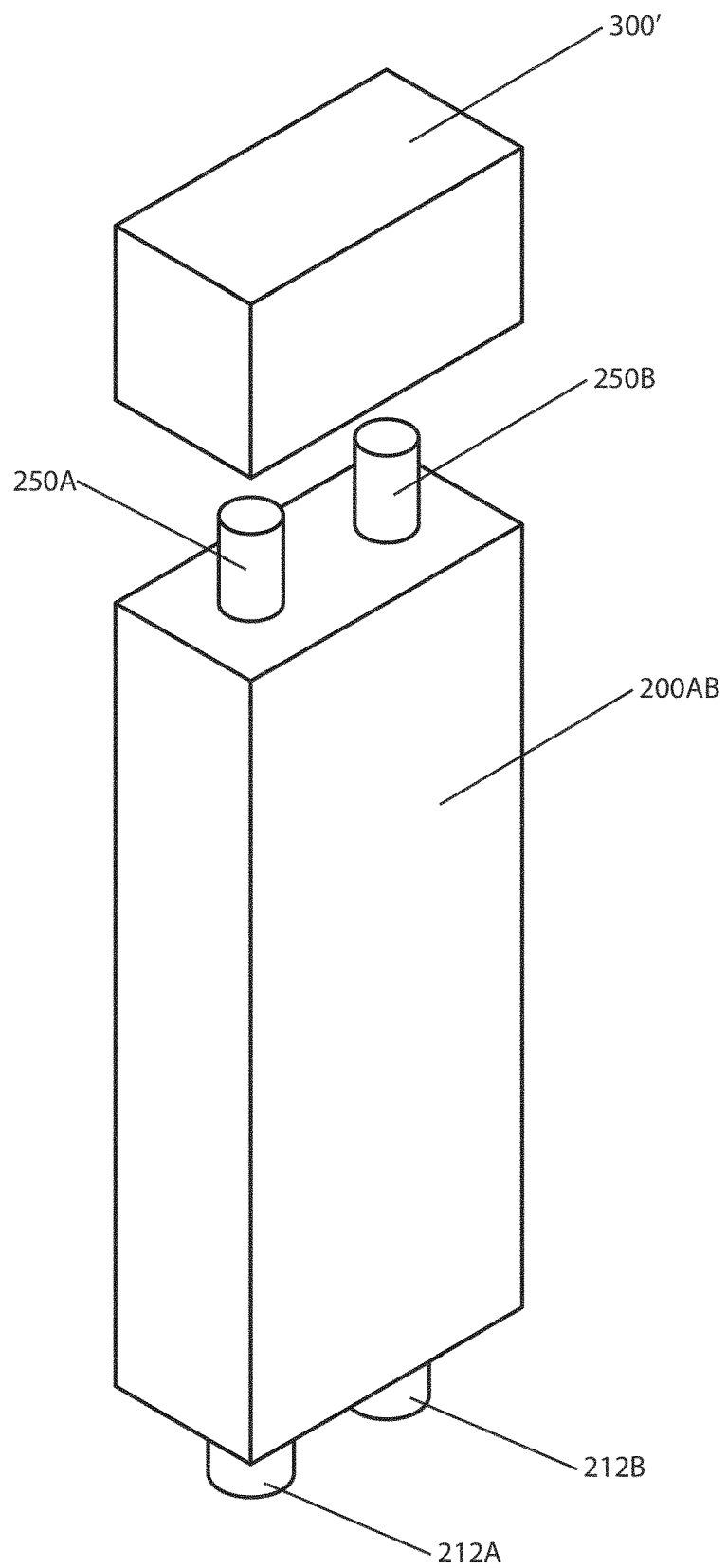
Figure 25:
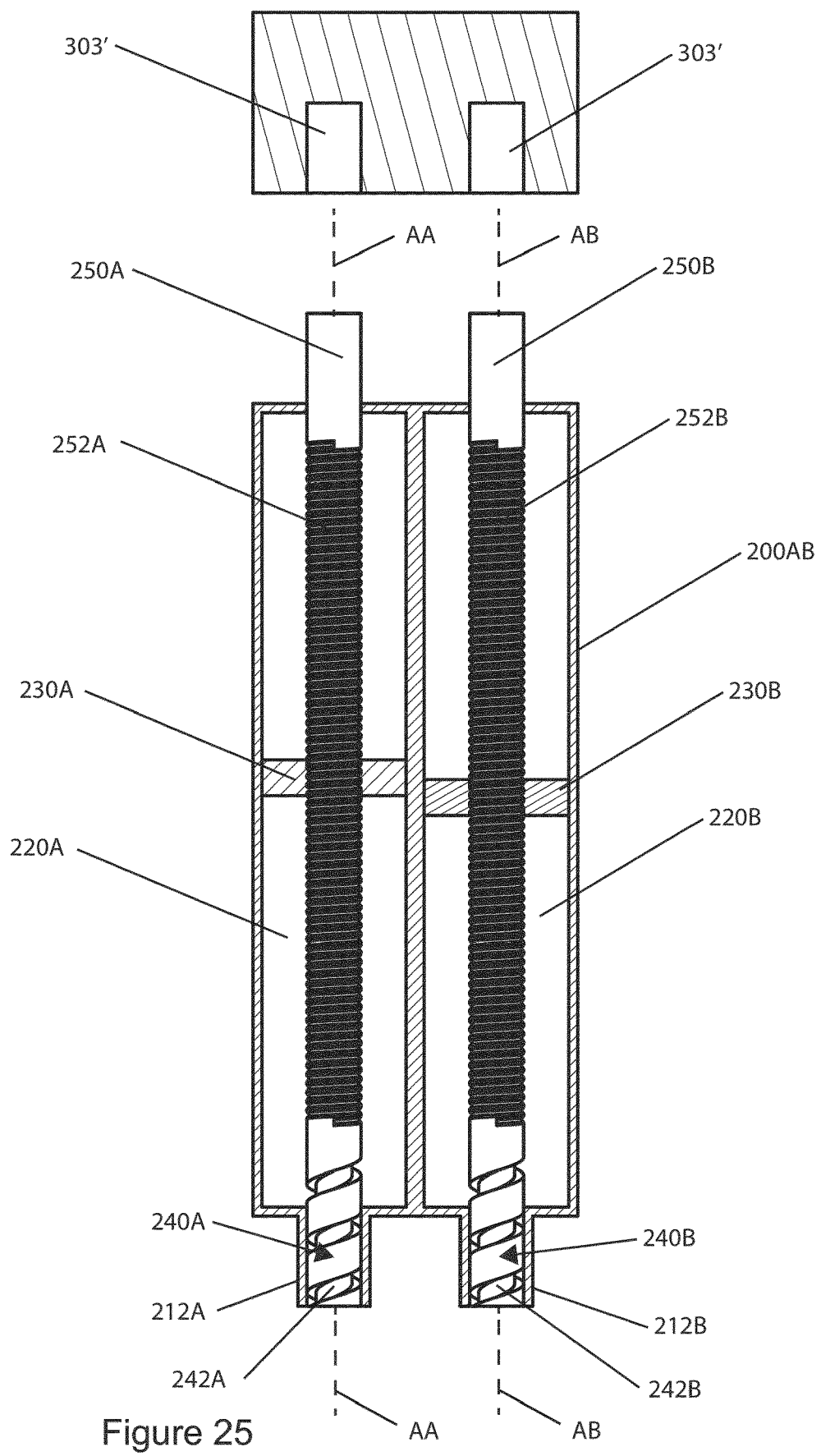
Figure 26:
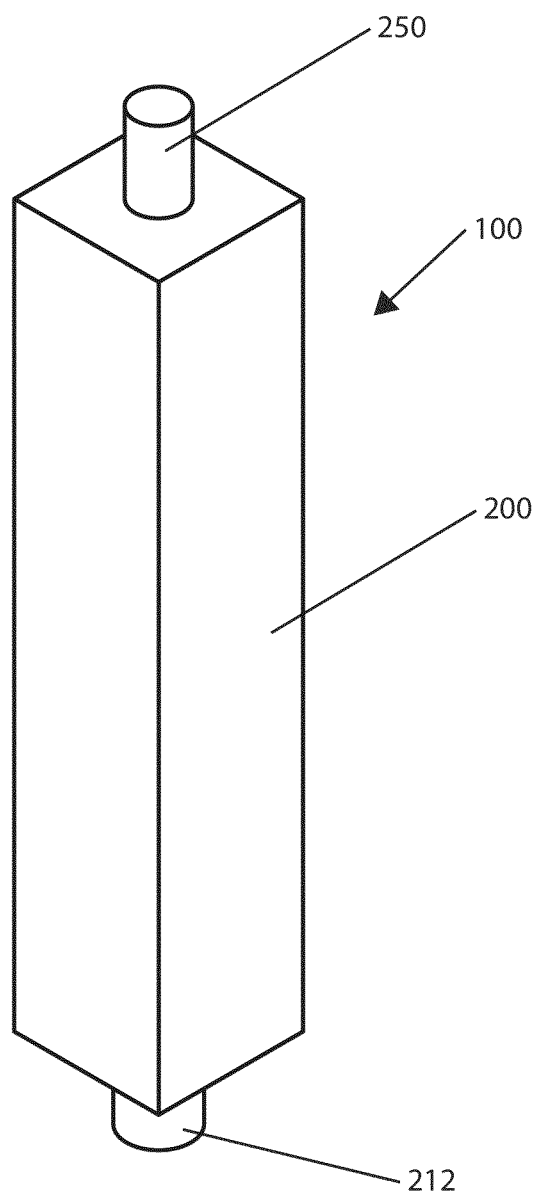
Figure 27:
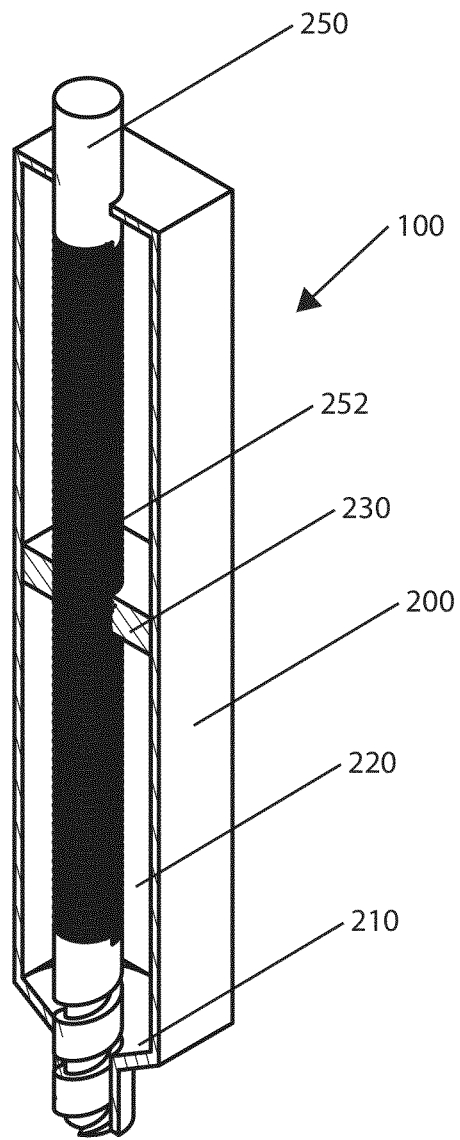

FIGS. 23 to 25 show an embodiment of an alternative cartridge 200AB that is similar to the dual cartridge embodiment of FIGS. 14 and 15, except that the two cartridges 200 are combined into a single unit.

The single cartridge 200AB comprises a first set of components including a first rotating member 250A extending through a first chamber 220A, the first rotating member 250A comprising a first screw thread 252A and a first screw portion 240A that extends into a first exit tube 212A, as well as a first plunger 230A that moves down the first screw thread 252A in use in a similar manner as described above in respect of the single cartridge 200.

The first screw portion 240A of the first set of components comprises a screw thread 242A that extends into the exit member 212A from the chamber 220A, such that, upon rotation of the first rotating member 250A pellets are dispensed out of the first exit tube 212A via the screw thread 242A in a similar manner as described above in respect of the single cartridge 200.

The single cartridge 200AB comprises a second set of components including a second rotating member 250B extending through a second chamber 220B, the second rotating member 250B comprising a screw thread 252B and a second screw portion 240B that extends into a second exit tube 212B, as well as a second plunger 230B that moves down the second screw thread 252B in use in a similar manner as described above in respect of the cartridge 200.

The second screw portion 240B of the second set of components comprises a screw thread 242B that extends into the exit member 212B from the chamber 220B, such that, upon rotation of the second rotating member 250B pellets are dispensed out of the second exit tube 212B via the screw thread 242B in a similar manner as described above in respect of the single cartridge 200.

The first set of components and the second set of components may be configured differently, such that, for example, the various screw threads 242A, 252A, 242B, 252B may be configured such that the first set of components is configured to dispense pellets at a faster rate than the second set of components. Also the different chambers 220A and 220B may be configured for use with pellets of different sizes. For example, the actuator 300' may be configured such that each separate rotating member 250A, 250B is driven by a different motor or mechanical control, wherein the different motors or mechanical controls are configured to run at different rotational speeds.

As shown in FIG. 25, the first rotating member 250A is configured to rotate about a first axis AA, and the second rotating member 250B is configured to rotate about a second axis AB. In various embodiments, the first axis AA and the second axis AB may be parallel with one another.

The two rotating members 250A and 250B may be operated by a common actuator 300'. The actuator 300' may be similar to that described above in respect of FIGS. 16 and 17, comprising dual connecting portions 303' with each connecting portion 303' being configured to drive a respective rotating member 250A, 250B, and in a similar manner to that described above in respect of the single-cartridge actuator 300.

FIGS. 26, 27, 28A and 28B show an embodiment of the cartridge 200 of FIGS. 9-10A, wherein the surface 210 of the cartridge 200 that opposes the radially extending surface 232 of the plunger 230 comprises a frustoconical or tapered portion 204 at the second, dispensing end 104 of the cartridge 200 in order to facilitate the delivery of pellets from the chamber 220 into the exit tube 212.

Figures 28A, 28B:
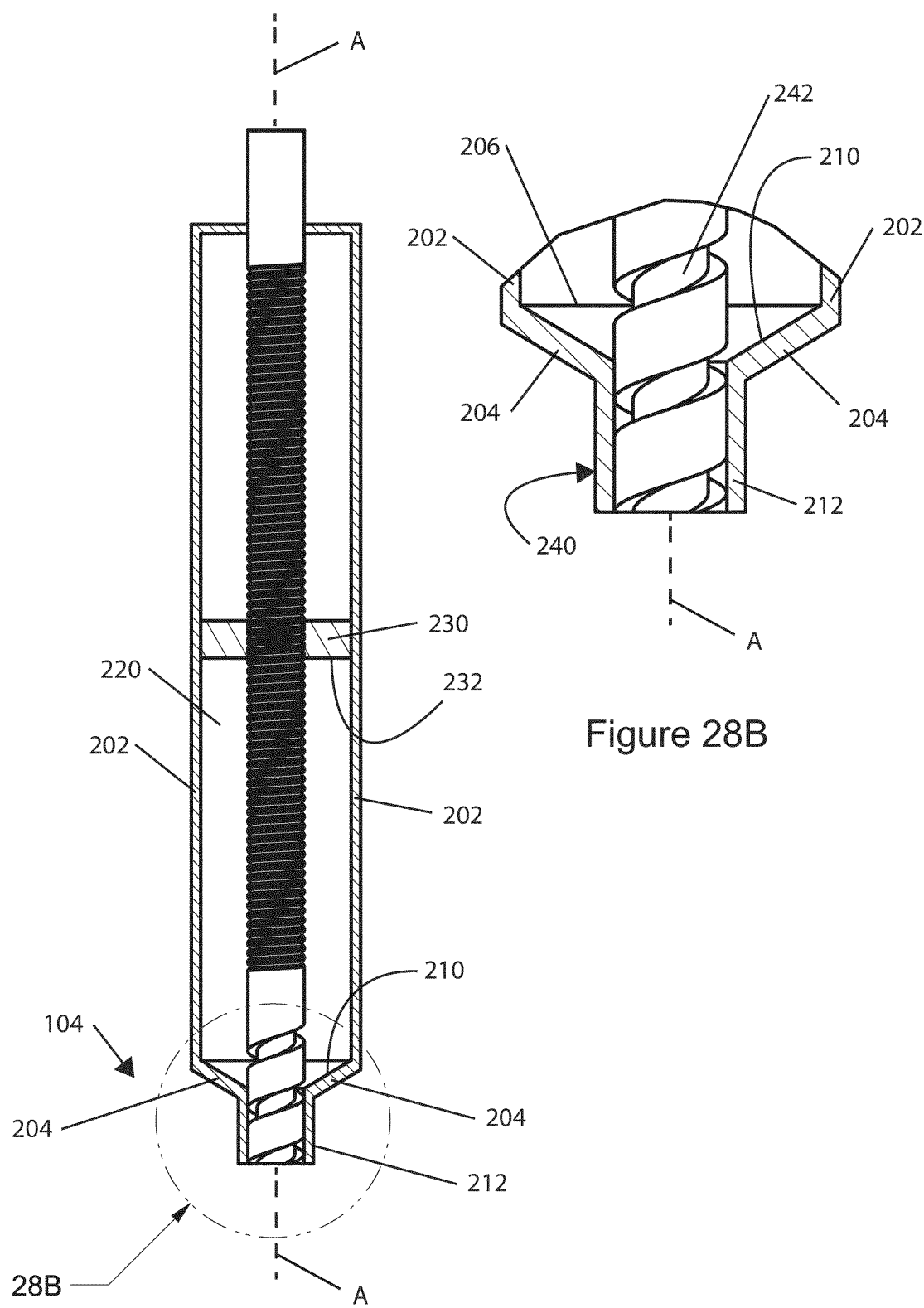

As shown in FIG. 28B, the cartridge 200 comprises one or more side portions 202 that connect to the tapered portion 204 at an axial position 206, from which the tapered portion 204 extends towards the exit tube 212. When the cartridge 200 is in its normal orientation, therefore, pellets will be caused to run down the frustoconical or tapered portion 204 (along the surface 210, which is now angled) and into the screw thread 242 of the screw portion 240.

Although not shown, the radially extending surface 232 of the plunger 230 could have a corresponding profile or shape that matches that of the surface 210 of the tapered portion 204, as described above. This can help to ensure that pellets are dispensed from the tapered portion 204.

Figure 29:
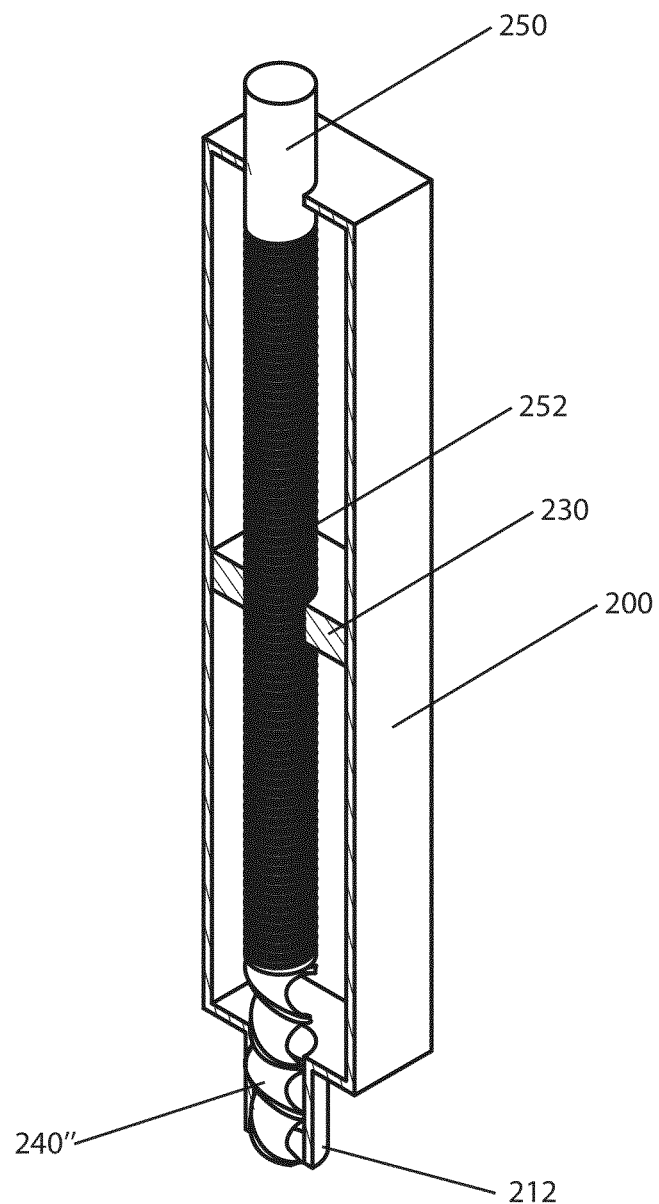
FIGS. 29 and 30A-30B show the embodiment of FIGS. 9-10 with a modified screw section.
Figures 30A, 30B:
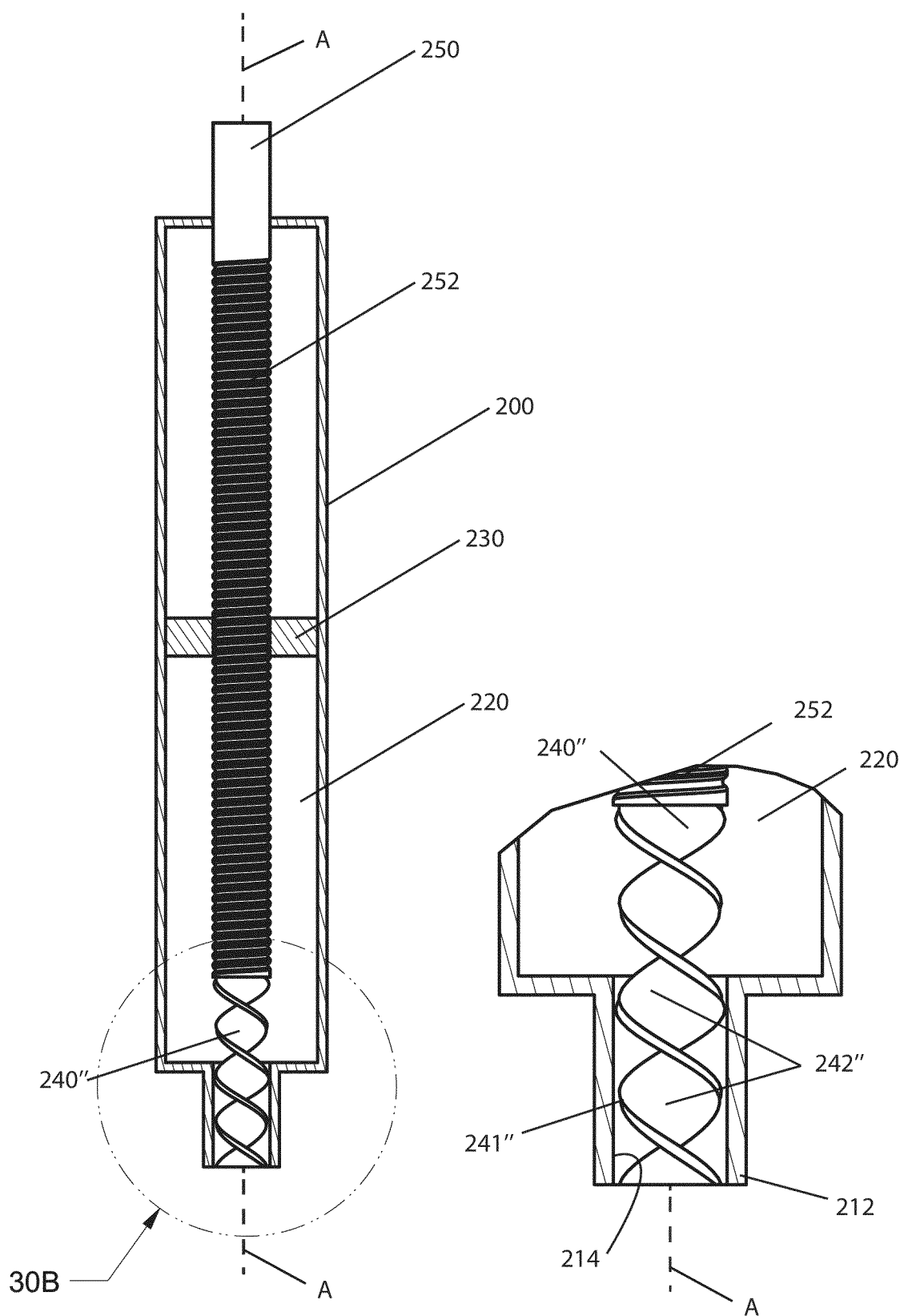

FIGS. 29, 30A and 30B show an embodiment of the cartridge 200 of FIGS. 9-10A, wherein the screw section 240 of the rotating member 250 is replaced by a screw section 240" in the form of a 'twisted plate' arrangement that maximizes the volume of the screw thread 242" thereof, and minimizes a friction impact of the screw section onto the pellets. The screw section 240" of this embodiment is formed by a plate that has been twisted multiple times to create directly opposing screw starts that extend along the entire length of the screw thread 242". This is in contrast to, for example, embodiments in which the screw thread is cut away from the circumferential surface of the rotating member, as shown in the previously described embodiments.

The screw section 240" may connect directly to the screw thread 252 of the rotating member 250, and extend from a position within the chamber 220 into the exit tube 212 in a similar manner to the screw section 240 of the previously described embodiments. The width of the screw section 240" as defined by its outer helical surface 241" may be substantially equal to the width of the inner cylindrical surface 214 of the exit tube 212. That is, the surfaces of the screw section 240" and the inner cylindrical surface 214 of the exit tube 212 may substantially contact each other or abut (e.g., continuously or intermittently), but not to the extent that they have an interference or friction fit relative to each other, to ensure that they can move smoothly past each another and ensure reliable dispensing.

Figure 37A:
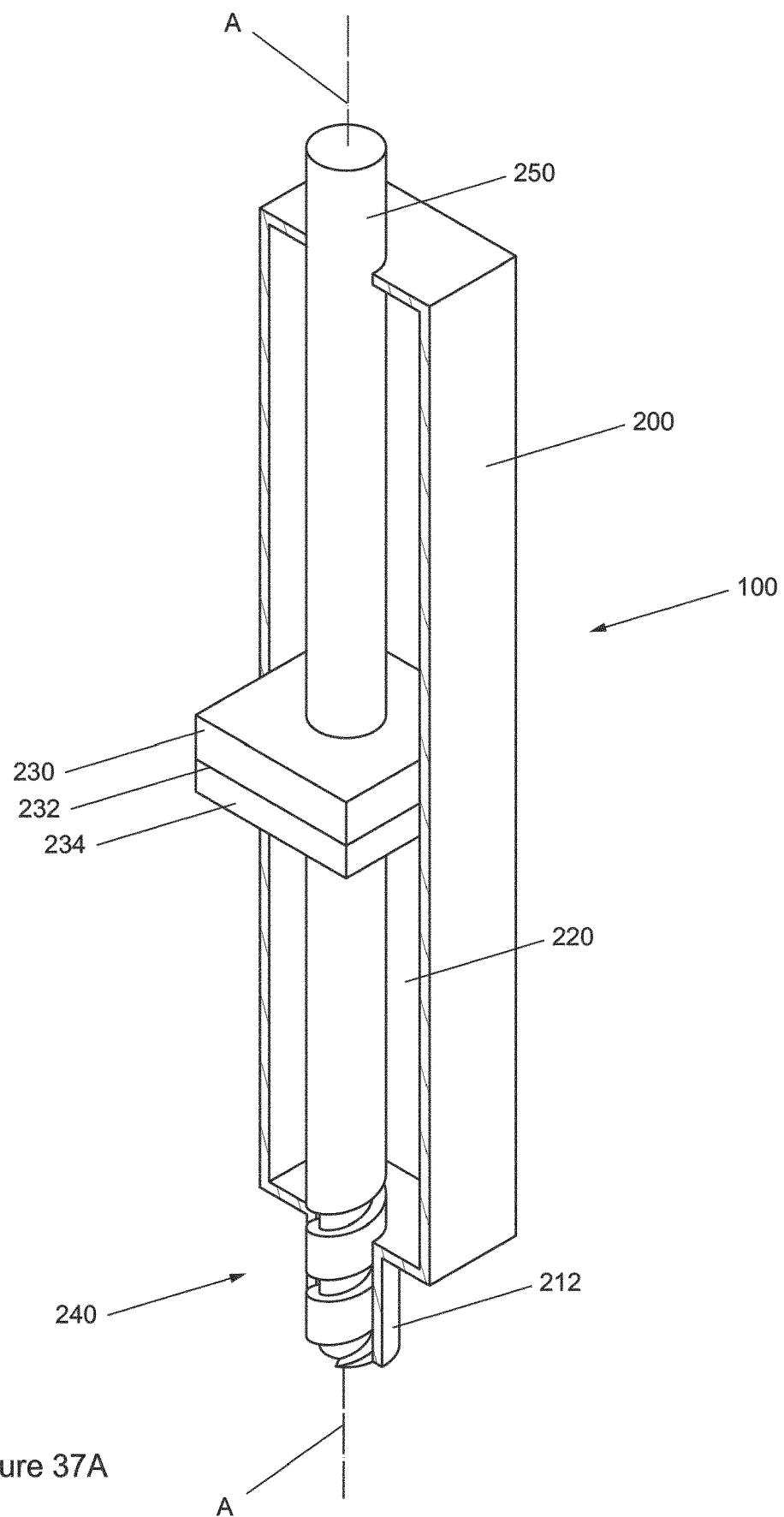
FIGS. 37A-C show an embodiment of a device as shown in FIG. 7, in which the plunger is accompanied by a deformable material.
Figure 37B:
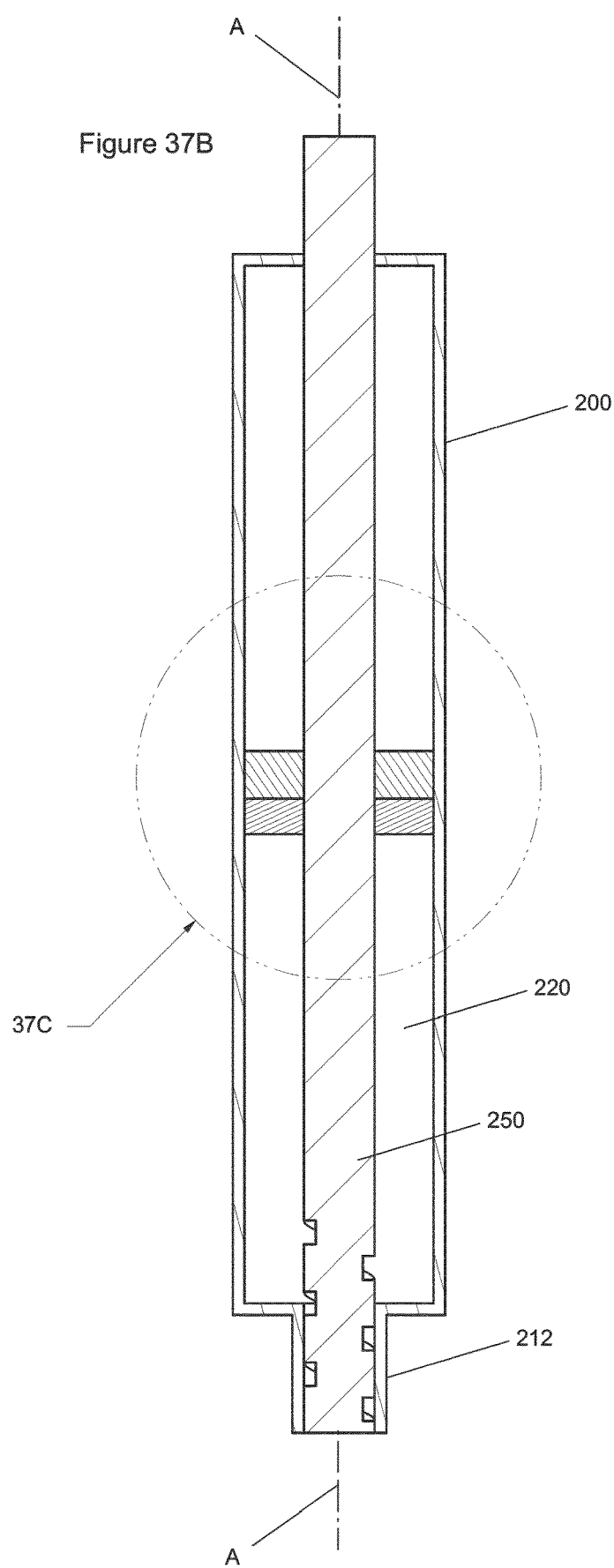
Figure 37C:
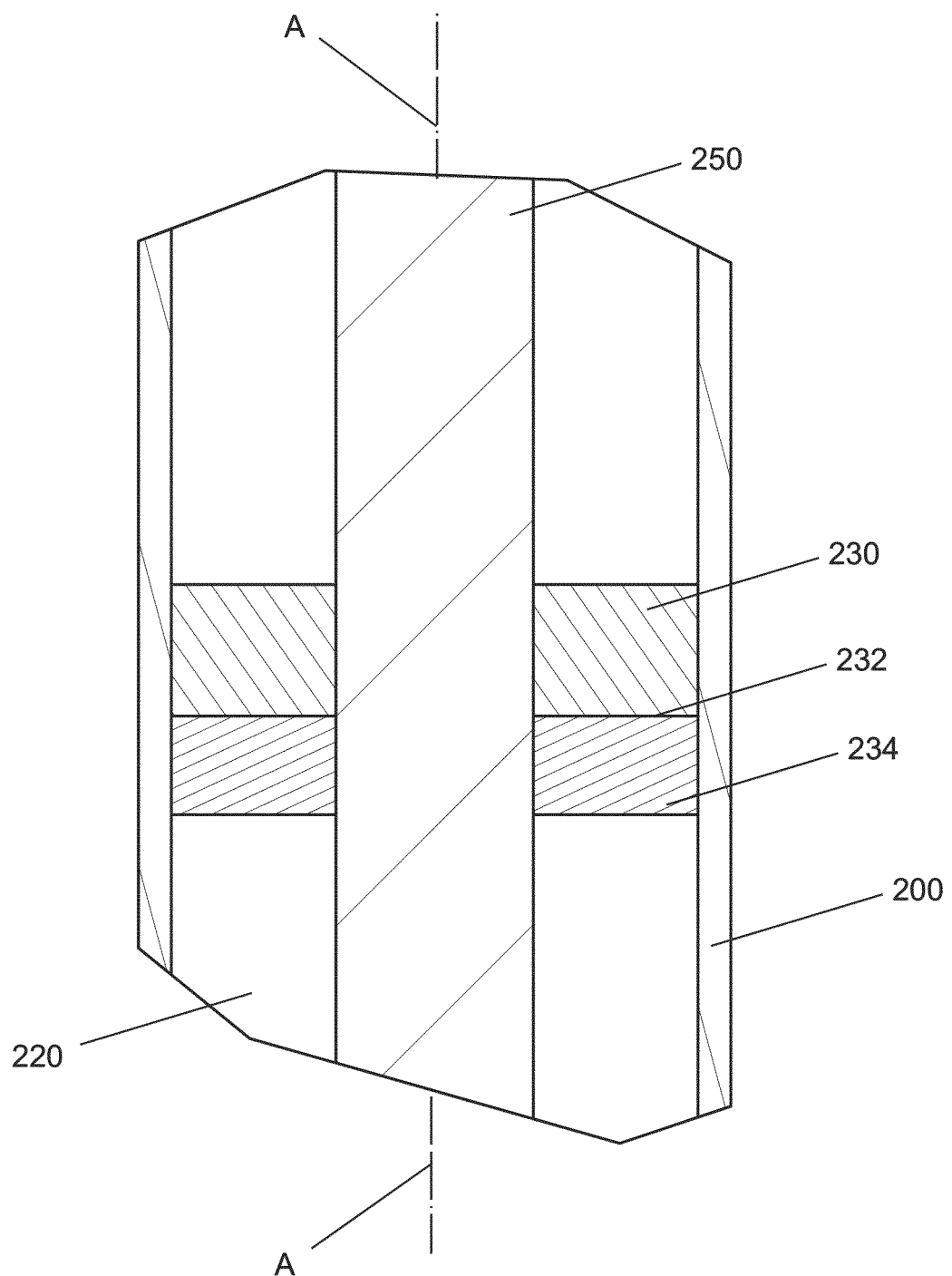

FIGS. 37A, 37B and 37C show an embodiment of a device 100 as shown in FIG. 7, in which the plunger 230 is accompanied by a deformable material 234 that is positioned on the radially extending surface 232 of the plunger 230. In various embodiments the deformable material 234 may be a foam or sponge. The function of the deformable material 234 is to assist in pressing pellets towards the dispensing end of the device 100 (i.e., into the screw section 240). In particular, the deformable material 234 may provide an efficient method in which to ensure the small pellets contained within the chamber 220 are moved towards the dispensing end, especially from the inner walls of the chamber 220.

In various embodiments the plunger 230 may extend radially (relative to axis A) to a distance that is slightly less than the radial distance to the inner walls of the chamber 220, to avoid friction between the plunger 230 and the walls of the cartridge 200. However, in these embodiments the deformable material 234 may extend radially to a distance that is equal to the radial distance to the inner walls of the chamber 220 so that the deformable material 234, rather than the plunger 230, ensures that pellets are moved from the inner walls of the chamber 220 towards the dispensing end and cannot pass between the plunger 230 and the walls of the cartridge 200. The deformable material 234 may be sized so that it is partially deformed upon being placed in position as shown in FIGS. 37A-C, which means that it will press against the walls of the cartridge 200 in use to maximize this effect.

The deformable material 234 may be press fitted between the rotating member 250 and the cartridge 200, and not attached to the plunger 230 (e.g., by adhesive). In use, the plunger will move along the axis A as described herein, contact the deformable material 234 and move it along the axis A as well. Alternatively, the deformable material 234 may be secured to the plunger 230 by any suitable means, for example adhesive.

The deformable material 234 may be included in any of the aspects or embodiments included herein that incorporate a plunger 230, and is not limited to the embodiment shown in FIG. 37A-C (which are merely provided to illustrate this feature). For example, the deformable material 234 could be provided in embodiments in which the plunger 230 moves along a screw thread 252, as shown in, e.g., FIG. 9, and in these embodiments and axial thickness of the deformable material 234 may be at least twice a pitch of the screw thread 252 in order to ensure that few or no pellets can move past the deformable material 234.

Figure 38A:
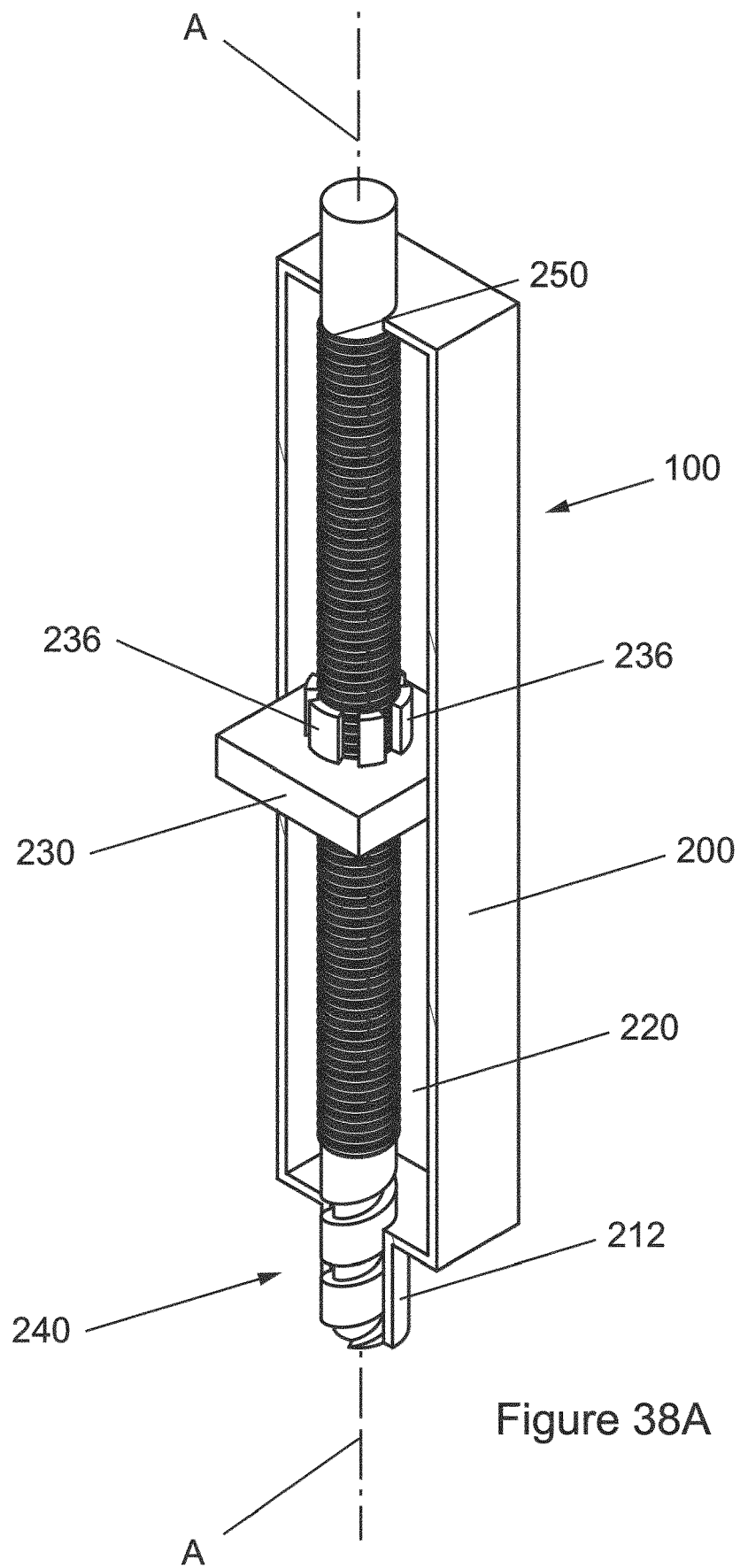
FIGS. 38A-C show an embodiment in which the plunger of the device as shown in FIG. 9 is provided with a plurality of axially extending teeth or projections.
Figure 38B:
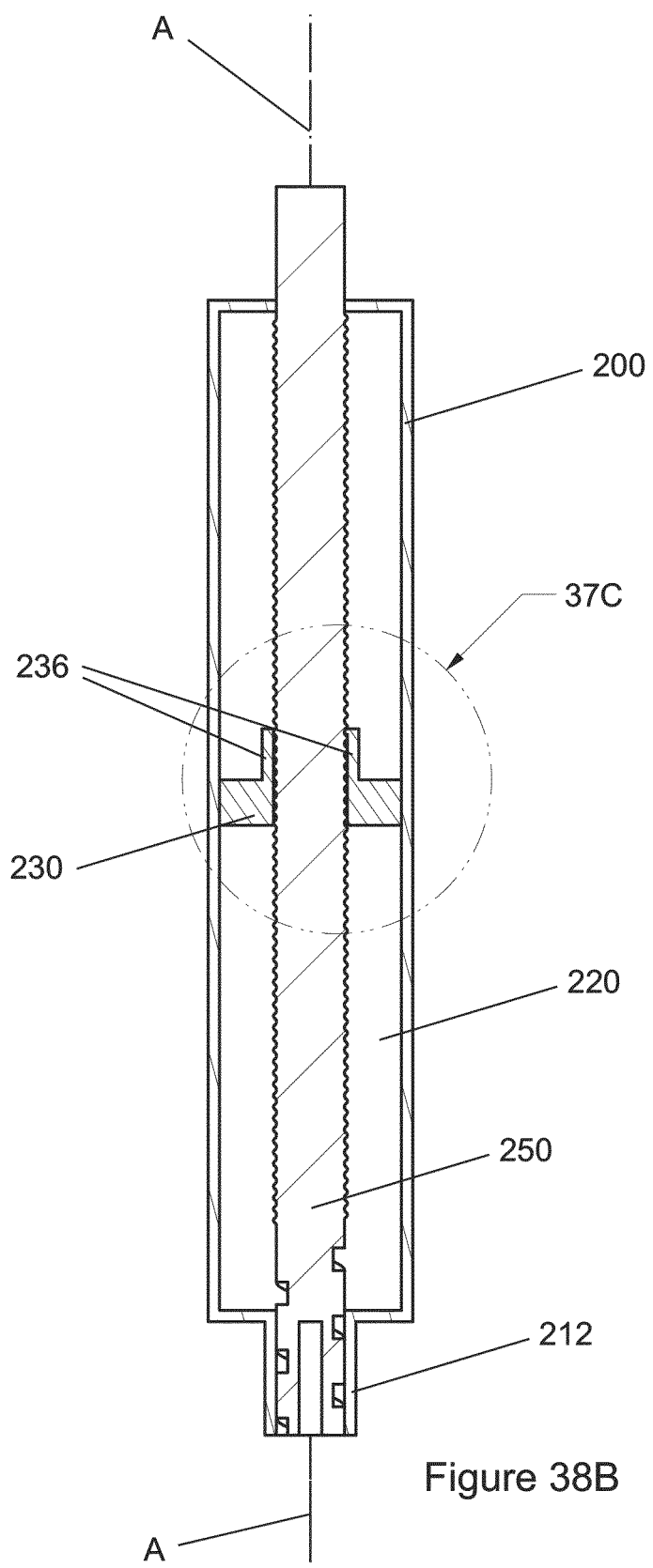
Figure 38C:
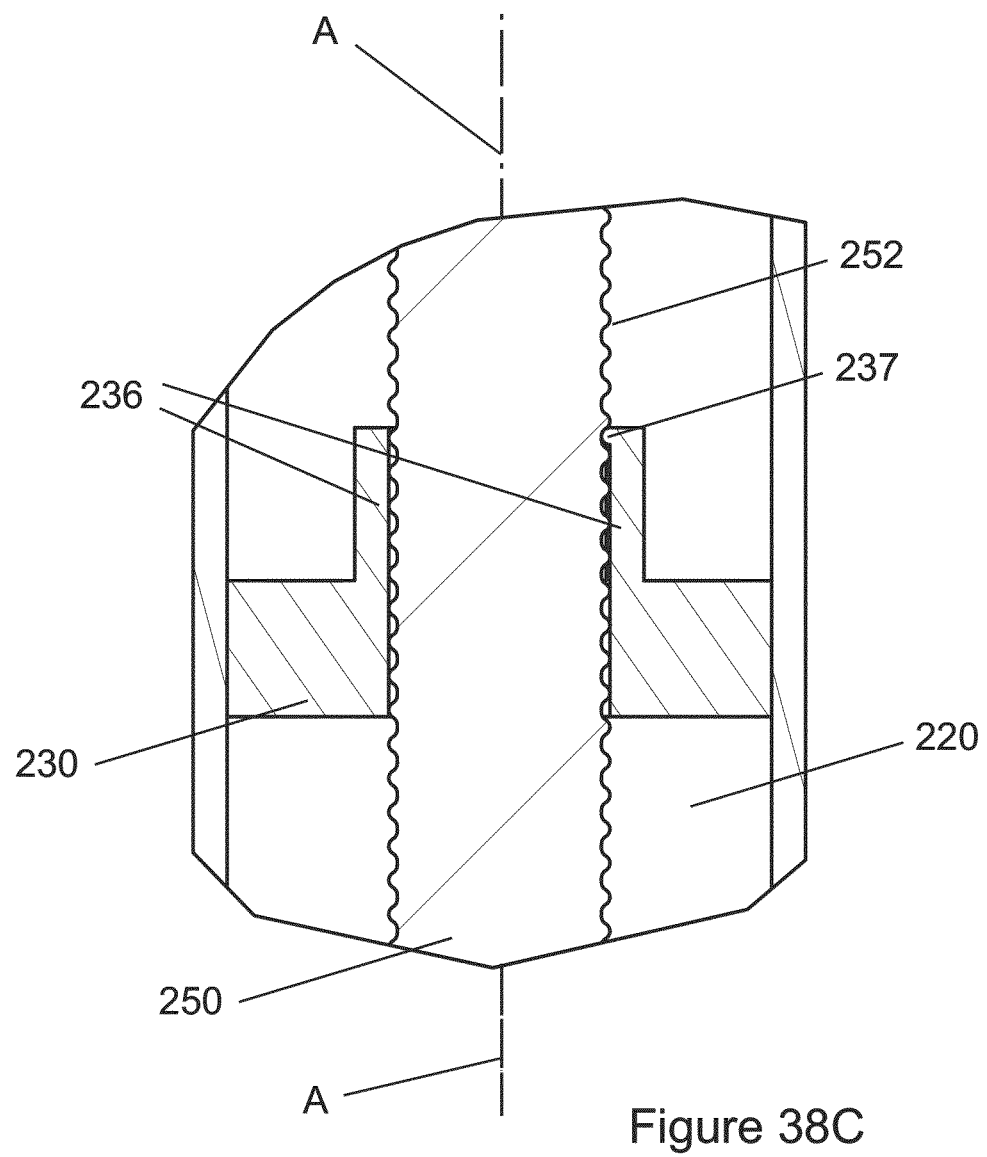

FIGS. 38A, 38B and 38C show an embodiment in which the plunger 230 of the device 100 as shown in FIG. 9 is provided with a plurality of axially extending teeth or projections 236. At least some (or all) of the teeth 236 comprise a rail 237 configured to ride along the screw thread 252 of the rotating member 250. In addition, the teeth 236 are configured to flex radially such that the rails 237 on the teeth 236 can move in and out of the screw thread 252. As the rotating member 250 rotates in use, the plunger 230 will move along the axis A as a result of the engagement of the rails 237 with the screw thread 252. Once the plunger 230 contacts the pellets contained within the chamber 220 (or reaches the bottom of the chamber 220) the plunger 230 may be restricted from further axial movement. At this point, the teeth 236 are configured to flex radially outward such that the rails 237 disengage with the screw thread 252 and the rotating member 250 continues to rotate without the plunger 230 moving along the axis A. As shown in the illustrated embodiment, the rails 237 are located at an axial end of the teeth 236 furthest from the main body of the plunger 230, to maximize the ability of the teeth 236 to flex radially outward as aforesaid.

Some of the teeth 236 may be provided as stabilizers, namely without a rail 237 that engages with the screw thread 252, and these may function to stabilize the plunger 230 as it moves along the axis A and also upon flexing of the other teeth 236 that do comprise a rail 237. The teeth 236 that function to stabilize the plunger 230 may be biased radially inward, so that they cling to the rotating member 250 as the plunger 230 moves along the axis A.

Any suitable number of teeth 236 may be provided, for example between 2 and 10, and in some embodiments a single tooth 236 may be provided. In the illustrated embodiment, the plunger 230 comprises six teeth 236, with three of these teeth having rails 237 and the other three functioning as stabilizers (i.e., without teeth 236).

The plunger 230 in any of the aspects and embodiments provided herewith may comprise teeth 236 as shown and described in respect of FIGS. 38A-C. The teeth 236 may comprise rails 237, or alternatively may be provided as stabilizers as discussed above. In such embodiments the plunger 230 would not typically comprise its own screw thread as shown in, e.g., FIG. 10B. In other words, the plunger 230 is moved along the axis A exclusively by the engagement of the rails 237 with the screw thread 252 of the rotating member 250.

Figure 39A:
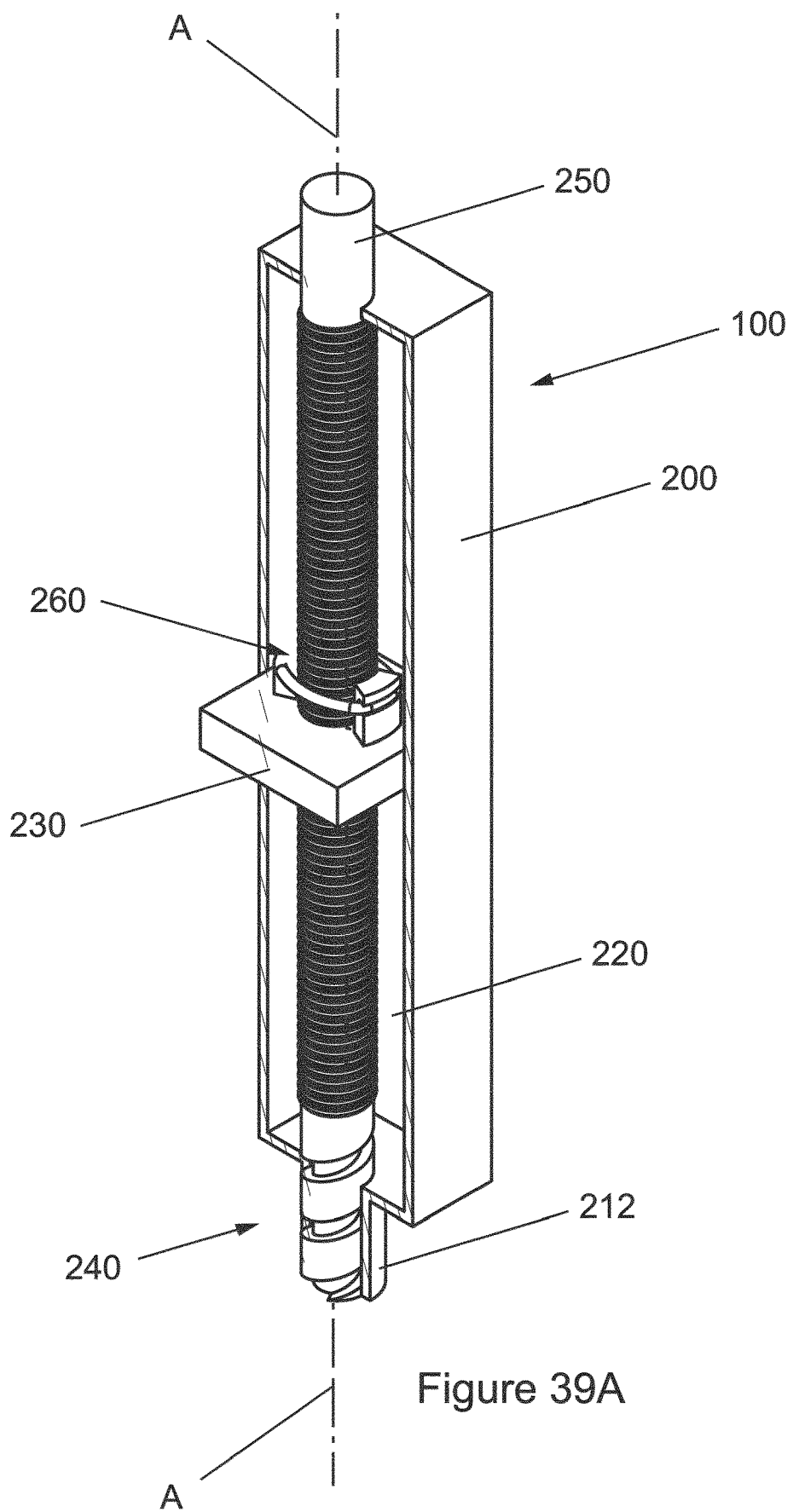
FIGS. 39A-C show an embodiment in which the plunger of the device as shown in FIG. 9 includes a resilient device.
Figure 39B:
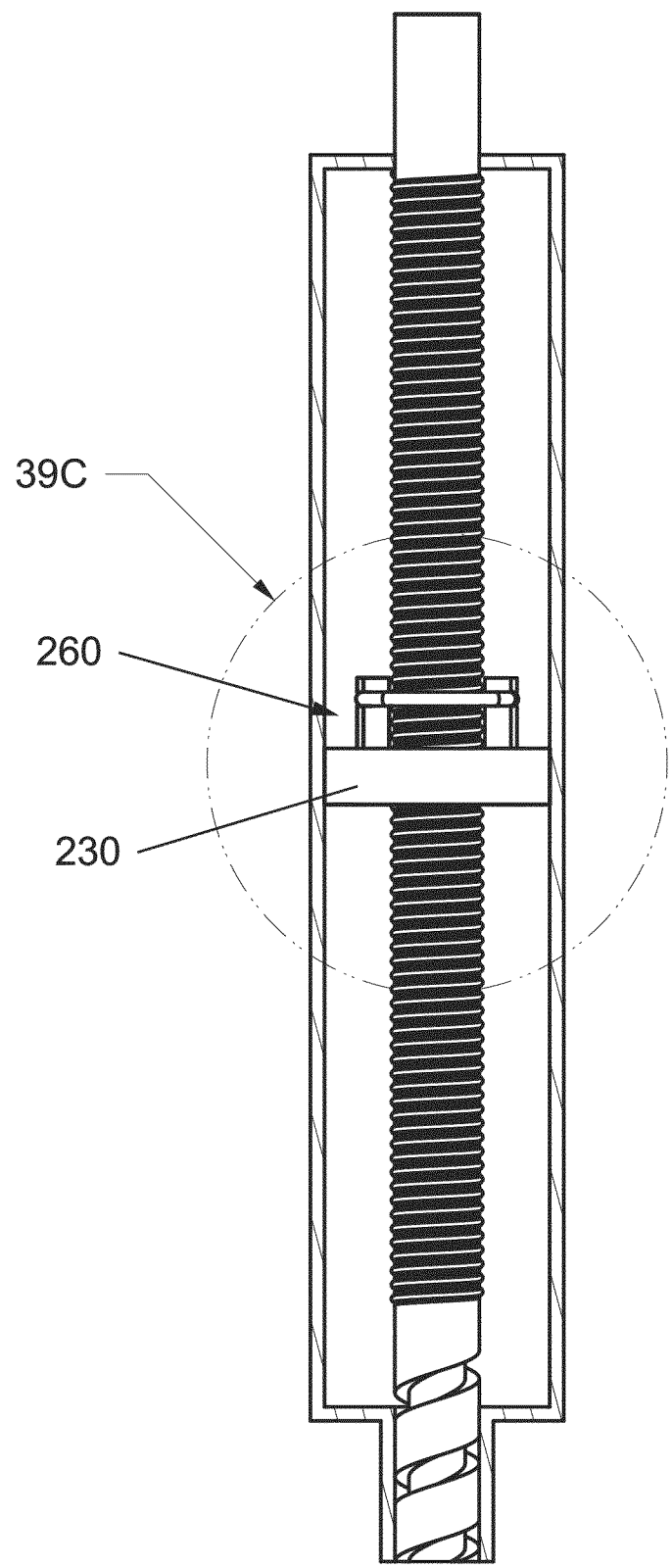
Figure 39C:
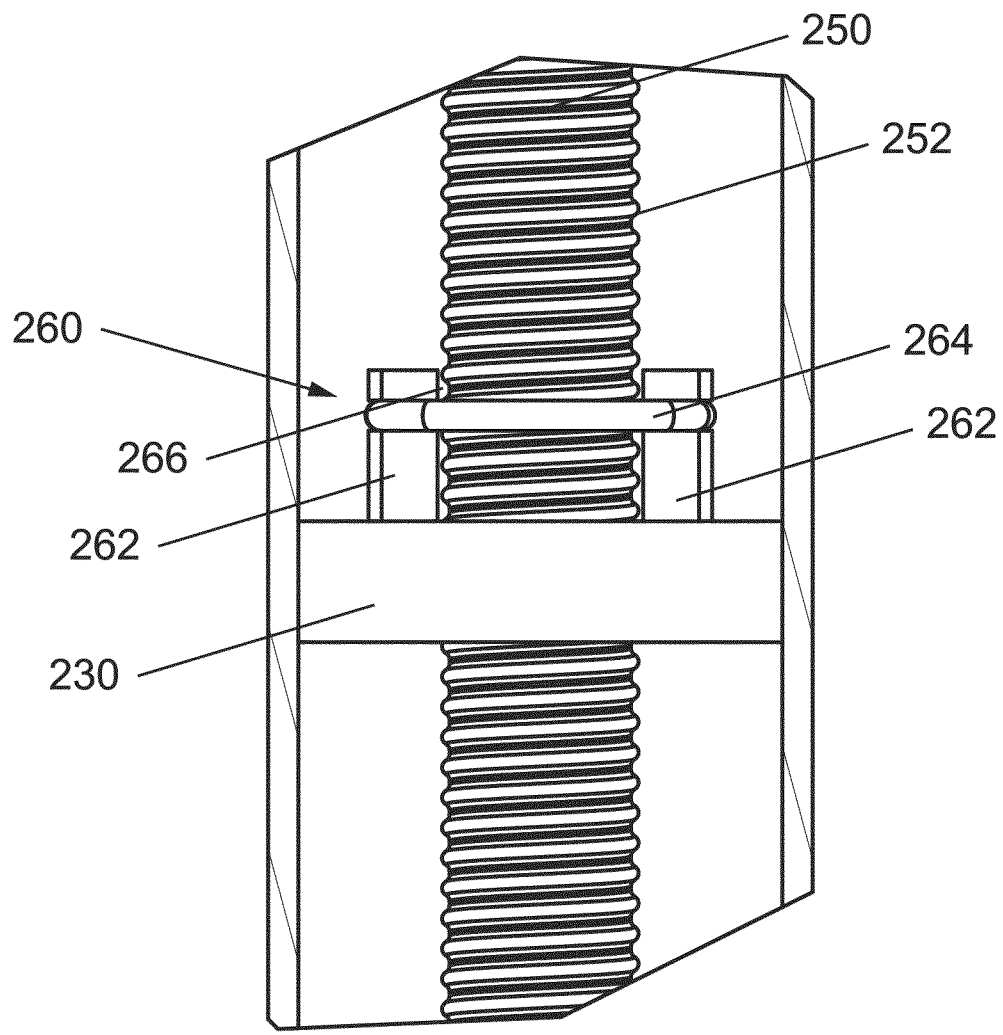

FIGS. 39A, 39B and 39C show an embodiment in which the plunger 230 of the device 100 as shown in FIG. 9 includes a resilient device 260 that has a similar function to the teeth 236 described above. The resilient device 260 comprises a plurality of projections 262 (two are shown in the illustrated embodiment) and a resilient member 264 configured to bias the projections 262 radially inwards. The projections 262 extend from the main body of the plunger 230, and may be formed integrally with the main body or provided as separate pieces and secured thereto by any suitable method. The projections 262 each comprise a rail 266 configured to engage the screw thread 252 on the rotating member 250. As shown in the illustrated embodiment, the rails 266 are located at an axial end of the projections 262 furthest from the main body of the plunger 230, to maximize the ability of the projections 262 to flex radially outward as discussed below. The resilient member 264 may be, for example, an elastic band.

As the rotating member 250 rotates in use, the plunger 230 will move along the axis A as a result of the engagement of the rails 266 with the screw thread 252. The resilient member 264 ensures that the rails 266 engage with the screw thread 252 during this rotation. Once the plunger 230 contacts the pellets contained within the chamber 220 (or reaches the bottom of the chamber 220) the plunger 230 may be restricted from further axial movement. At this point, the projections 262 are configured to flex radially outward against the action of the resilient member 264, such that the rails 266 disengage with the screw thread 252 and the rotating member 250 continues to rotate without the plunger 230 moving along the axis A.

The plunger 230 in any of the aspects and embodiments provided herewith may comprise a resilient device 260 as shown and described in respect of FIGS. 39A-C. In such embodiments the plunger 230 would not typically comprise its own screw thread as shown in, e.g., FIG. 10B. In other words, the plunger 230 is moved along the axis A exclusively by the engagement of the rails 266 with the screw thread 252 of the rotating member 250.

Figure 40A:
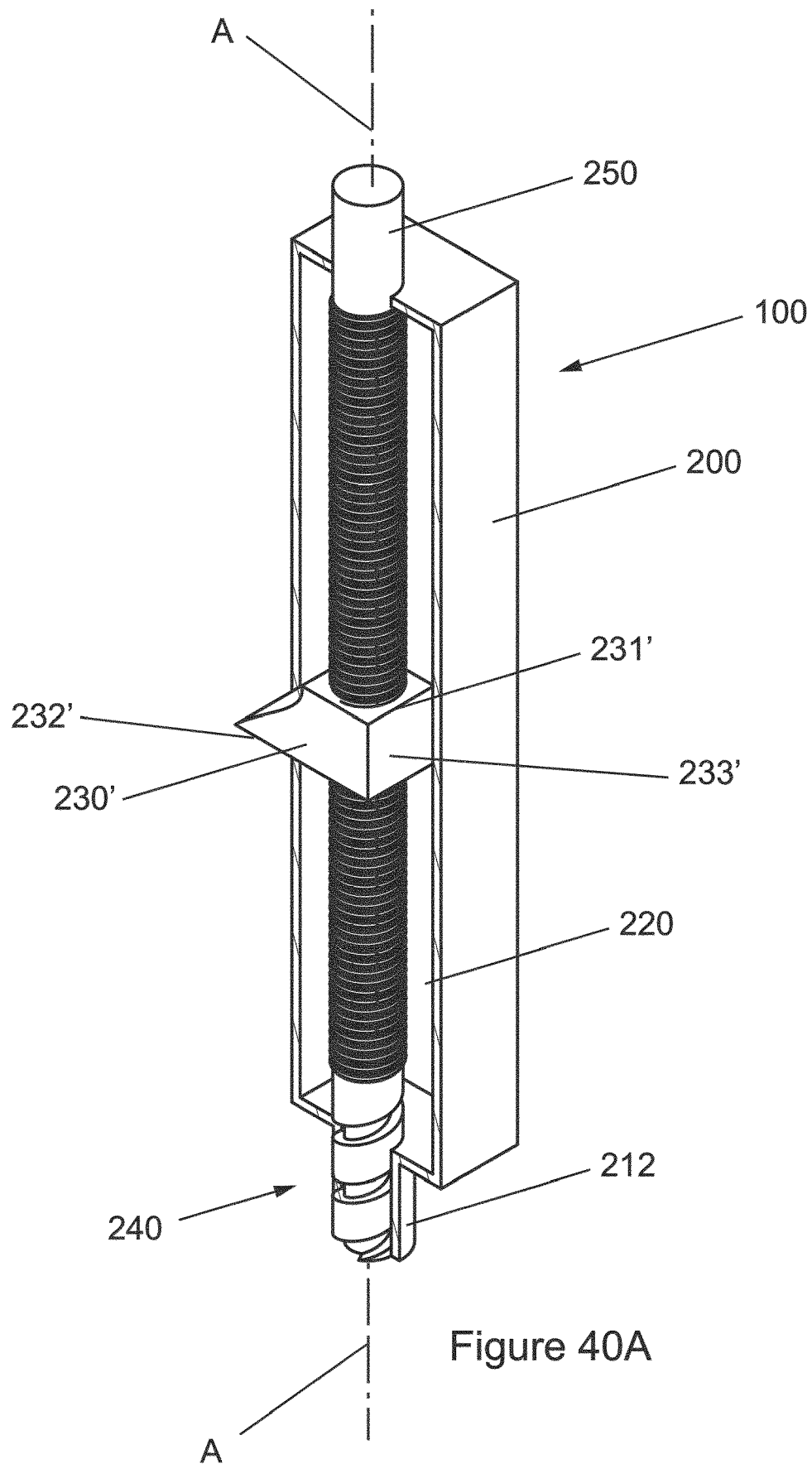
FIGS. 40A-C show an embodiment similar to that of FIG. 9, but with a modified plunger.
Figure 40B:
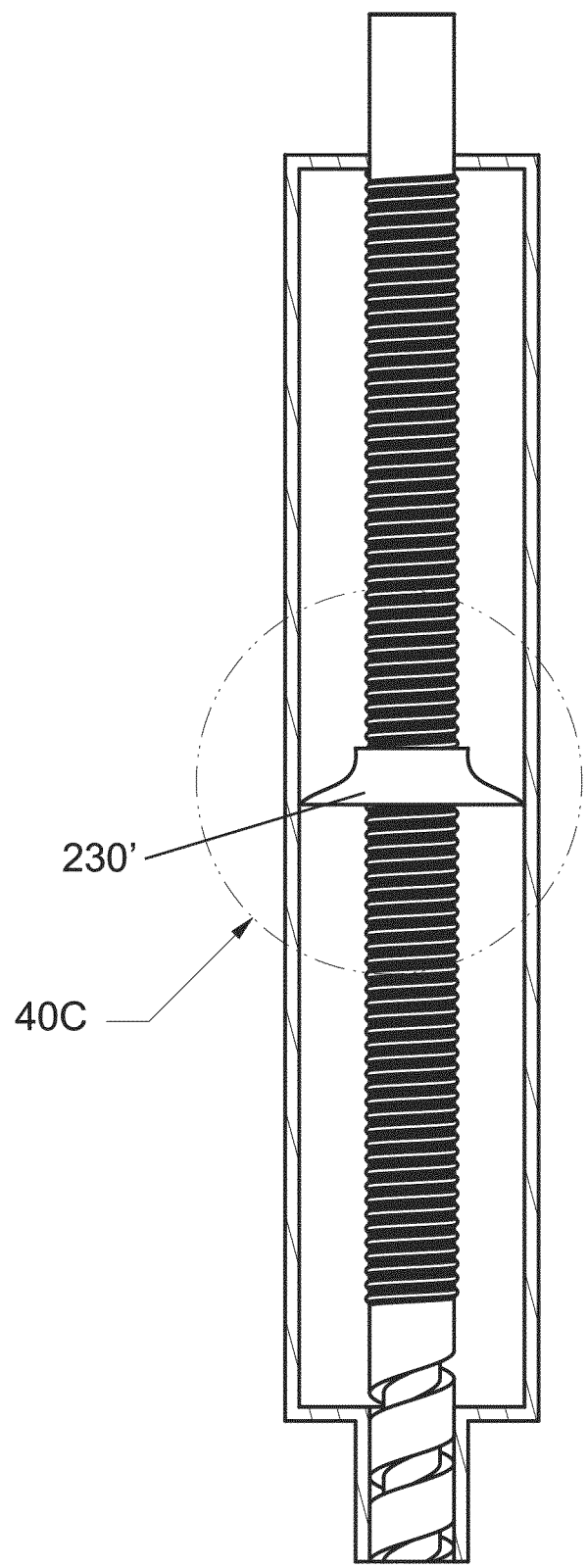
Figure 40C:
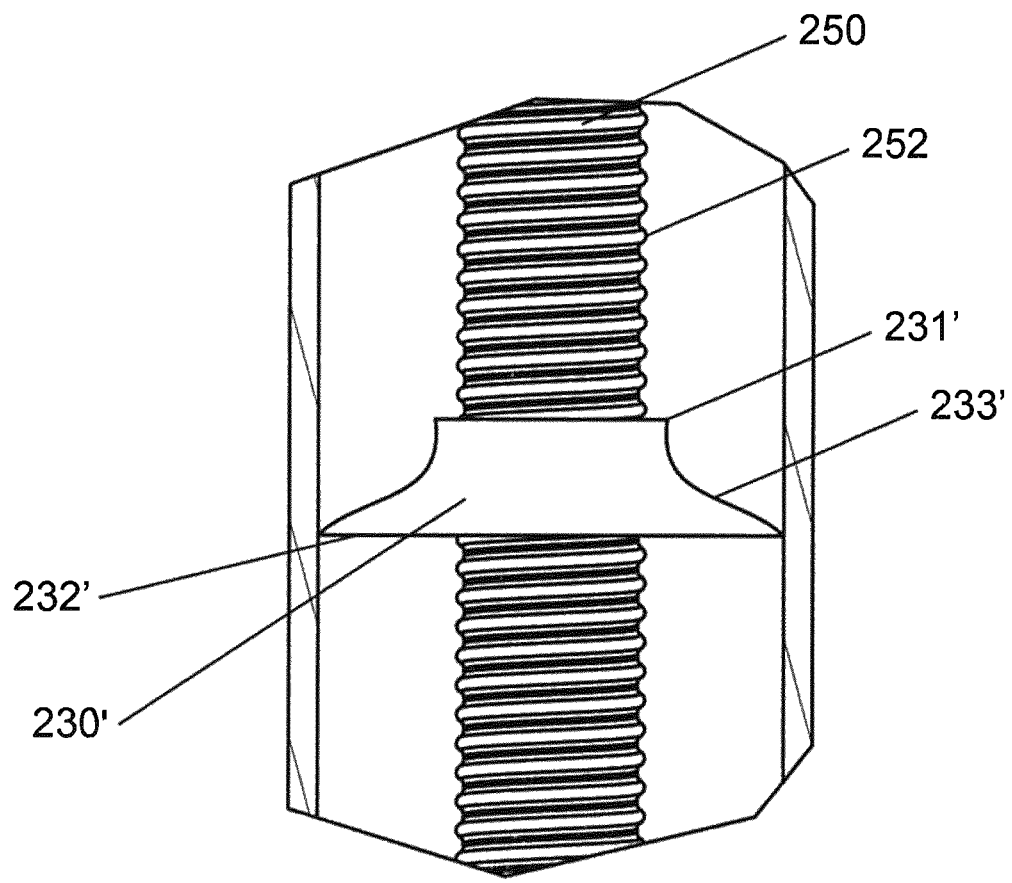

FIGS. 40A, 40B and 40C show an embodiment similar to that of FIG. 9, but with a modified plunger 230'. In this embodiment the plunger 230' comprises a unique shape that is configured to reduce the friction between the plunger and the walls of the cartridge 200. In particular, the plunger 230' tapers from a first thickness adjacent to the screw thread 252 of the rotating member 252 a second thickness at its perimeter and adjacent to the walls of the cartridge 200, wherein the second thickness is smaller than the first thickness.

More specifically, as shown in FIG. 40C, the plunger 230' may comprise a substantially flat lower surface 232' that comprises the perimeter of the plunger 230' configured to contact the walls of the cartridge 200. A tapered surface 233' may be provided that extends from the perimeter and radially inwards to an upper edge 231' that is located away from the walls of the cartridge 200 and adjacent the rotating member 250. By providing a reduced thickness portion closer to the walls of the cartridge 200, friction between the plunger 230' and the cartridge 200 may be reduced. In addition, using a tapered surface 233' as shown in the illustrated embodiment means that the perimeter of the plunger 230' may flex as the plunger 230' moves axially. In such embodiments, the plunger 230' may be made from an elastomeric material, such as rubber, to enhance the ability of the plunger 230' to flex in this manner.

In various embodiments of the plunger 230' may taper to a point edge at the periphery of the plunger 230'. The thickness of the plunger 230' at the periphery may be less than, e.g., about 2 mm or even about 1 mm. The plunger 230' may be made from a thermoplastic elastomer ("TPE") or polybutylene terephthalate ("PBT"). The plunger 230' may have a hardness of less than about 50 shore, which has been found to provide a plunger 230' that is able to flex adequately during movement along the axis A in use. The plunger 230' may be slightly oversized, in that the width of the plunger 230' (e.g., in isolation) is slightly larger than the dimensions of the cartridge 200 within which it fits. The plunger 230' may also be configured with a screw thread that is configured to cooperate with the screw thread 252 of the rotating member 250.

Although the present invention has been described with reference to preferred embodiments, it will be understood by those skilled in the art that various changes in form and detail may be made without departing from the scope of the invention as set forth in the accompanying claims.

The invention claimed is:

1. A handheld and portable medicament dispenser, comprising:
    a housing that includes an electromechanical actuator, and a battery configured to power the electromechanical actuator; and
    one or more replaceable medicament cartridges insertable into the housing, wherein each replaceable medicament cartridge comprises in one replaceable unit:
        a chamber containing a plurality of free flowing medicament pellets each having a largest dimension of between about 150 µm and about 1500 µm;
        a screw pump configured to receive pellets from the chamber and, upon rotation of the screw pump, transport the pellets from the chamber to be dispensed from the dispenser via the screw pump;
        a rotating member extending through the cartridge and configured to rotate the screw pump so as to dispense pellets therefrom;
        a valve connected to an outlet of the screw pump and configured to close the screw pump so as to prevent pellets from being dispensed from the screw pump outside of a dispensing operation when the screw pump is not being rotated, and to permit pellets to be dispensed from the screw pump during a dispensing operation upon rotation of the screw pump; and
        a plunger movable along the rotating member and driven so as to force the pellets contained within the chamber towards the screw pump as it moves along the rotating member, so as to pack them within the chamber towards the screw pump;
    wherein the replaceable unit of each cartridge, including at least the chamber, the screw pump, and the rotating member, is insertable into the housing and such that the rotating member of each cartridge physically connects to the electromechanical actuator when the replaceable unit of each cartridge, including at least the chamber, the screw pump, and the rotating member, is inserted into the housing, wherein upon such physical connection a rotary force can be transferred from the actuator to the rotating member during a dispensing operation to transport the pellets from the chamber to be dispensed from the dispenser via the screw pump as aforesaid;
    wherein the plunger is configured to press onto the medicament pellets within the chamber and force the medicament pellets towards the dispensing end of the cartridge to pack the medicament pellets tightly within the chamber as the rotating member rotates during each dispensing operation, and outside of a dispensing operation the valve prevents the medicament pellets that are packed tightly within the chamber from running through and leaking from the screw pump by providing a resistive force to the medicament pellets; and
    wherein the actuator is configured such that upon actuation thereof the actuator causes the rotating member to rotate by a predetermined amount, wherein by virtue of the pellets being tightly packed within the chamber as aforesaid the predetermined amount of rotation corresponds to a precise volume of the medicament pellets, and therefore a precise dose, to be dispensed.

2. The handheld and portable medicament dispenser as claimed in claim 1, wherein the valve flexes open to allow pellets to be dispensed as the screw pump rotates during each dispensing operation, and then flexes back when the screw pump is not rotating, so as to stop pellets falling out of the screw pump outside of a dispensing operation.

3. The handheld and portable medicament dispenser as claimed in claim 1, wherein the screw pump is configured to transport the pellets from the chamber to outside of the cartridge by rotation of the screw pump without linear translation of the rotating member.

4. The handheld and portable medicament dispenser as claimed in claim 1, wherein the valve comprises an outlet for dispensing the pellets therefrom, and the valve is configured such that pellets need to be forced out of the valve, through the outlet, upon rotation of the rotating member during a dispensing operation.

5. The handheld and portable medicament dispenser as claimed in claim 4, wherein a surface of the plunger forms one end of the chamber, such that as the plunger moves along the rotating member in use the volume of the chamber gradually decreases.

6. The handheld and portable medicament dispenser as claimed in claim 5, wherein each cartridge comprises a unitary piece having the same cross-section extending the entire length of the chamber, the interior of which forms the walls of the chamber.

7. The handheld and portable medicament dispenser as claimed in claim 1, wherein the replaceable unit includes at least all of the chamber, the screw pump, and the rotating member integrated as a single unit as the rotating member physically connects to the actuator upon insertion of the replaceable unit into the housing.

8. The handheld and portable medicament dispenser as claimed in claim 1, wherein the replaceable unit includes at least all of the chamber, the screw pump, and the rotating member integrated as a single unit during the insertion of the replaceable unit into the housing, including to physically connect the rotating member and the electromechanical actuator, as aforesaid.

9. The handheld and portable medicament dispenser as claimed in claim 1, wherein the chamber has a length, and wherein each cartridge comprises a unitary piece comprising a portion having a same cross-section extending at least the entire length of the chamber, the interior of which forms the walls of the chamber.

10. The handheld and portable medicament dispenser as claimed in claim 9, wherein the unitary piece extends from the portion having the same cross-section to an exit tube of reduced width that comprises a screw thread.

11. The handheld and portable medicament dispenser as claimed in claim 1, wherein the rotating member of each cartridge and the electromechanical actuator physically connect as aforesaid by virtue of a male connecting member interfacing with and mechanically connecting to a female connecting member.

12. The handheld and portable medicament dispenser as claimed in claim 1, wherein the valve comprises a resilient member that flexes open to allow pellets to be dispensed as the screw pump rotates during each dispensing operation, and then flexes back when the screw pump is not rotating, so as to stop pellets falling out of the screw pump outside of a dispensing operation.

13. The handheld and portable medicament dispenser as claimed in claim 12, wherein the pellets each have a largest dimension of between about 500 µm and about 1100 µm.

14. The handheld and portable medicament dispenser as claimed in claim 1, wherein the screw pump has a screw thread with a channel depth, and wherein the channel depth of the screw thread is between about 1.1 and about 4 times the largest dimension of the pellets.

15. The handheld and portable medicament dispenser as claimed in claim 1, wherein the screw pump has a screw thread with a flight width, and wherein the flight width of the screw thread, defined as the pitch minus the channel width, is less than about 10 times the largest dimension of the pellets.

16. The handheld and portable medicament dispenser as claimed in claim 13, wherein the screw pump has a screw thread with a channel depth, and wherein the channel depth of the screw thread is between about 1.1 and about 4 times a largest dimension of the pellets.

* * * * *